(12) United States Patent  
Kim et al.

(10) Patent No.: US 12,657,446 B2  
(45) Date of Patent: Jun. 16, 2026

(54) AI SYSTEM COMPRISING A PLURALITY OF AI MODULES WITH SCALABLE AI COMPUTATION POWER

(71) Applicant: DEEPX CO., LTD., Seongnam-si (KR)

(72) Inventors: Lok Won Kim, Yongin-si (KR); In Goo Kang, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/267,644

(22) Filed: Jul. 14, 2025

(65) Prior Publication Data

US 2026/0030492 A1 Jan. 29, 2026

(30) Foreign Application Priority Data

Jul. 26, 2024 (KR) ........................ 10-2024-0099779  
Jun. 30, 2025 (KR) ........................ 10-2025-0087378

(51) Int. Cl.  
*G06N 3/048* (2023.01)  
*G06N 3/063* (2023.01)

(52) U.S. Cl.  
CPC ..................................... *G06N 3/063* (2013.01)

(58) Field of Classification Search  
CPC ...................................................... G06N 3/063  
See application file for complete search history.

(56) References Cited

U.S. PATENT DOCUMENTS

| | | | | |
|---|---|---|---|---|
| 10,729,030 | B1 * | 7/2020 | Cousineau | G06F 13/409 |
| 11,551,675 | B2 * | 1/2023 | Indurthi | G10L 15/16 |
| 11,586,497 | B1 * | 2/2023 | Geist | B64G 1/223 |
| 2019/0236147 | A1 * | 8/2019 | Lee | G06F 40/47 |
| 2021/0303977 | A1 * | 9/2021 | Sun | G06F 9/3001 |
| 2022/0014588 | A1 * | 1/2022 | Guim Bernat | G06F 12/0828 |
| 2023/0156978 | A1 * | 5/2023 | Aal | H05K 7/20218 |
| | | | | 361/679.53 |
| 2023/0195519 | A1 * | 6/2023 | Krishnan | G06F 9/505 |
| | | | | 713/320 |
| 2024/0024028 | A1 * | 1/2024 | Barazani | A61B 34/10 |

FOREIGN PATENT DOCUMENTS

| | | | |
|---|---|---|---|
| KR | 10-2019-0055608 | A | 5/2019 |
| KR | 10-2019-0136431 | A | 12/2019 |
| KR | 10-2022-0149414 | A | 11/2022 |

OTHER PUBLICATIONS

Zhuoran Song et al. "Real-Time Video Recognition via Decoder-Assisted Neural Network Acceleration Framework". IEEE Transactions on Computer-Aided Design of Intergrated Circuits and Systems. (Oct. 27, 2022).  
Charlie Chen et al. "Accelerating Large Language Model Decoding with Speculative Sampling". arXiv:2302.01318v1. (Feb. 2, 2023).

* cited by examiner

*Primary Examiner* — Brandon S Cole  
(74) *Attorney, Agent, or Firm* — INVENSTONE PATENT, LLC

(57) ABSTRACT

A scalable AI system includes a plurality of slots on a main board, at least one AI module mounted in the slots to perform AI operations, and a main processor that controls the entire system. A user can flexibly scale the overall AI computation performance of the system by adjusting the number of AI modules as needed. Each AI module is equipped with a low-power NPU specialized for AI operations and adopts standard form factors (e.g., M.2, E1.S) to improve economy and scalability. This can solve the problems of high-power consumption and cost, which are limitations of GPU-based systems, and can efficiently support various AI applications.

18 Claims, 40 Drawing Sheets

1

1 npu is an AI accelerator ----→ NPU (100) ----→ yes, I am the AI accelerator

S11 — Obtain attention score for input data

S12 — Process attention score through Feed-Forward Neural Network

S13 — Generate final output token

| Operation | Energy(pj) |
|---|---|
| 8b INT Add | 0.03 |
| 16b INT Add | 0.05 |
| 32b INT Add | 0.1 |
| 16b FP Add | 0.4 |
| 32b FP Add | 0.9 |
| 8b INT Mult | 0.2 |
| 32b INT Mult | 3.1 |
| 16b FP Mult | 1.1 |
| 32b FP Mult | 3.7 |
| 32b S_MEM Read (SRAM) | 5 |
| 32b S_MEM Read (LPDDR RAM) | 640 |

S110 — Perform integer operation

S120 — Perform floating-point based special operation

S130 — Control processing core or special function unit according to operation state M.2 connector(11200)

11000

Printed Circuit Board(11100)

M.2 connector(11200)

11000

Printed Circuit Board(11100)

E1.S connector(11300)

11000

Printed Circuit Board(11100)

AI SYSTEM COMPRISING A PLURALITY OF AI MODULES WITH SCALABLE AI COMPUTATION POWER

CROSS-REFERENCE TO RELATED APPLICATIONS

Technical Field

This application claims the priority of Korean Patent Application No. 10-2024-0099779, filed on Jul. 26, 2024, and Korean Patent Application No. 10-2025-0087378, filed on Jun. 30, 2025, in the Korean Intellectual Property Office, the disclosure of which is incorporated herein by reference.

BACKGROUND OF THE DISCLOSURE

Technical Field

The present disclosure relates to an AI system comprising a plurality of AI modules with scalable AI computation power.

Background Art

Artificial intelligence (AI) is a technology that imitates intelligent human activities such as recognition, generation, classification, and reasoning. Just as the human brain processes information through numerous connections of neurons and synapses, AI operates based on an artificial neural network (ANN), which models this structure.

With recent advancements in neural network technology, AI inference services using big data are expanding into various fields. In particular, generative AI, such as large language models (LLMs) based on the transformer architecture, has shown innovative performance in text generation, translation, and summarization, and is being rapidly applied to real life. The transformer identifies contextual relationships in input data through an attention mechanism, which consists of complex matrix multiplications and nonlinear function operations.

As the performance and accuracy of these AI models increase, the model's parameter size, computational complexity, and memory bandwidth requirements are growing exponentially. Currently, these large-scale computations are primarily handled by graphics processing units (GPUs). However, GPUs face several fundamental limitations in the widespread commercialization of AI technology.

The first problem is the massive power consumption. According to the International Energy Agency (IEA), the power consumption of data centers worldwide is expected to more than double by 2026, reaching a level comparable to the electricity consumption of an entire country. The high-power consumption of GPUs, reaching up to 700 W per unit, exacerbates this problem, making it difficult to build AI data centers in regions with insufficient power infrastructure.

The second problem is the high cost and rigid scalability. High-performance GPUs are very expensive and occupy a large amount of physical space, increasing the initial construction cost of AI systems. This problem is a significant burden, especially for businesses providing AI services. In a situation where it is difficult to accurately predict service demand, introducing a GPU-based system that requires a huge initial investment entails considerable business risk. If demand falls short of expectations, losses from over-investment occur, while a surge in demand makes it difficult to expand the system quickly, leading to a decline in service quality. In other words, existing systems force large-scale investments, having an inherent limitation that makes it difficult to flexibly adjust the investment scale in line with service growth.

The third problem is architectural inefficiency. GPUs are designed as general-purpose parallel processors (SIMT: single instruction, multiple threads) for graphics rendering, with a structure where numerous processing cores exchange data with external high-bandwidth memory (HBM, GDDR, etc.). However, this general-purpose structure is not optimized for the structured dataflow of AI inference, where matrix operations and nonlinear functions are sequentially repeated. This causes bottlenecks in the data movement path and results in inefficiency where processing cores wait for data and enter an idle state. Consequently, it is difficult to fully utilize the theoretical performance (TOPS), and power efficiency is also degraded.

Therefore, to overcome the limitations of GPUs and commercialize AI technology more broadly, a new AI system architecture that is low-power, low-cost, miniaturized, and specialized for AI computation is urgently needed.

More specifically, the limitations of GPU-based systems are not just confined to issues of power, cost, and scalability, but can stem from a fundamental mismatch between the inherent characteristics of AI inference workloads and the GPU architecture. At the core of this inefficiency lies the "memory bottleneck" phenomenon. AI workloads can be divided into "compute-bound" tasks, where performance is limited by the computation capability itself, and "memory-bound" tasks, where performance is limited by the data transfer speed. According to recent research, the inference process of large language models (LLMs) still exhibits memory-bound characteristics even when the batch size is increased, and it has been revealed that the saturation of the GPU's external DRAM bandwidth is the main cause of performance degradation.

GPUs were originally designed as general-purpose parallel processors (SIMT: single instruction, multiple threads) for graphics rendering, optimized for thousands of processing cores to handle independent operations in parallel. However, the inference process of a neural network model is not merely a collection of random parallel operations but is characterized by a structured dataflow, where structured operations such as matrix multiplication, activation function application, and normalization are processed sequentially according to the layer order. The general-purpose architecture of a GPU is not optimized for this dataflow specific to AI inference, which can cause structural inefficiency.

This may be because the GPU architecture relies on continuous data exchange between numerous processing cores and off-chip high-bandwidth memory (HBM, GDDR). In the AI inference process, a bottleneck occurs in the data movement path when bringing massive amounts of data, such as weights and activations, from external memory to the processing cores. This can lead to the processing cores entering an idle state while waiting for data. Analysis of actual LLM inference workloads shows that GPU core occupancy often struggles to exceed 50%, and more than 50% of the execution cycles of the attention kernel are stalled due to data access latency.

Consequently, a large gap occurs between the theoretical peak performance (TOPS, tera operations per second) presented by the GPU and the effective performance achieved in a real AI inference environment. In other words, the high TOPS figure of a GPU exhibits an "illusion of TOPS"

phenomenon, where the structural limitation of the memory bottleneck prevents it from being fully realized as actual performance.

The inefficiency of the GPU architecture may be directly linked to massive power consumption and cost issues. The power consumption of the latest AI accelerator GPUs is increasing exponentially with each generation. For example, the thermal design power (TDP) of NVIDIA's Ampere A100 GPU was 400 W, but its successor, the Hopper H100, increased to 700 W, and the latest Blackwell B200 has a TDP of 1000 W, with some high-spec versions reaching up to 1200 W. The maximum power consumption of a single DGX B200 system equipped with eight B200 GPUs reaches about 14.3 kW.

This high-power consumption is a major cause of soaring data center operating costs. The International Energy Agency (IEA) has projected that the power consumption of data centers worldwide, currently at about 415 TWh as of 2024, will more than double by 2030 to exceed 945 TWh due to the spread of AI technology, a figure that surpasses the current total annual electricity consumption of Japan. AI is cited as the biggest cause of this increase in power demand.

In terms of cost, GPUs are also a major barrier to the popularization of AI systems. The market price of a single high-performance NVIDIA H100 GPU is about USD 31.000, which imposes a huge initial investment burden on companies looking to start AI services. Introducing such expensive equipment on a large scale in a situation of uncertain demand entails significant business risk, and it is difficult to flexibly adjust the investment scale in response to changes in demand.

That is, the development path of existing GPU-based systems is moving towards integrating more transistors and consuming higher power, which suggests that it is facing a sustainability limit in terms of energy and cost, exacerbating the global energy crisis and the economic viability of data centers. Therefore, there is a need to shift the existing paradigm through a low-power, low-cost, high-efficiency architecture specialized for AI inference operations, and the present disclosure aims to propose a new architecture to solve these problems.

SUMMARY OF THE DISCLOSURE

The present disclosure aims to present an alternative to mitigate the power and cost problems of GPU-based AI systems and to promote the commercialization of AI technology.

The first aspect of the present disclosure is to fundamentally solve the high-power consumption and cost problems of GPU systems based on a low-power, low-cost neural processing unit (NPU) specialized for AI computation.

The second aspect of the present disclosure is to solve the problem for AI service providers of predicting the initial investment cost, timing, and business scale, which are difficult to foresee. Since existing GPU-based systems are difficult to expand incrementally and require a huge initial investment, the business risk is high amid the uncertainty of service demand. Accordingly, the present disclosure seeks to resolve this investment uncertainty by providing a system that allows users to flexibly expand AI computation performance as much as they want and when they need it by combining standardized AI modules.

The third aspect of the present disclosure is to reduce manufacturing costs to accelerate the commercialization of AI technology. By applying industry-standard hardware specifications (form factors) such as M.2 and E1.S to AI modules, the present disclosure aims to achieve "economies of scale" through mass production, thereby lowering the barrier to entry for AI systems.

Ultimately, the issues to be addressed by the present disclosure is to implement a new AI system that flexibly expands low-power AI modules implemented with standardized form factors to provide the computational performance required by various AI applications economically and efficiently.

The aspects to be solved by the present disclosure are not limited to the above-mentioned content, and other unmentioned problems can be clearly understood by those skilled in the art from the following description.

An AI system according to an aspect of the present disclosure may include: a plurality of slots provided on a main board; at least one AI module mounted in at least one of the plurality of slots and performing AI (artificial intelligence) operations; and at least one main processor that controls the overall operation of the system including the AI module, wherein the total AI computation performance of the AI system is configured to be scalable based on the number of AI modules mounted in the plurality of slots.

Furthermore, an AI module according to another aspect of the present disclosure may include: a printed circuit board of a standard specification; a connector formed on one side of the printed circuit board and electrically connected to a slot provided on the main board of the AI system; and at least one NPU mounted on the printed circuit board and processing AI operations.

Furthermore, a neural processing unit (NPU) according to another aspect of the present disclosure may include: a processing core that processes matrix operations based on integer data in parallel; a special function unit SFU that processes special operations including nonlinear functions based on floating-point data; and a controller that controls the operation of the processing core and the special function unit based on compiled execution code.

Specific details of other examples are included in the detailed description and drawings.

According to the present disclosure, the following effects may be achieved.

First, flexible performance scalability may be provided. Users can start a system with as many AI modules as needed without a heavy initial cost burden, and can easily expand the total AI computation performance by simply adding modules as demand increases in the future. This can enable the construction of an economical and rational system.

Second, it is possible to build a low-power, high-efficiency AI system. By adopting an NPU specially designed for AI computation and low-power standard form factors such as M.2 and E1.S, the total power consumption of the system may be significantly lowered compared to GPU-based systems, even when multiple AI modules are installed. This can contribute to operating cost reduction and the implementation of eco-friendly data centers.

Third, high compatibility and rapid execution may be supported. The system of the present disclosure can support a compiler that converts neural network models developed with various AI frameworks such as TensorFlow and PyTorch into machine code optimized for the NPU. Since the compiled code is stored and reused, various AI applications can be executed quickly and stably on each AI module.

The effects according to the present disclosure are not limited by the contents exemplified above, and more diverse effects may be included within the present disclosure.

DETAILED DESCRIPTION OF THE EMBODIMENTS

Figure 1:
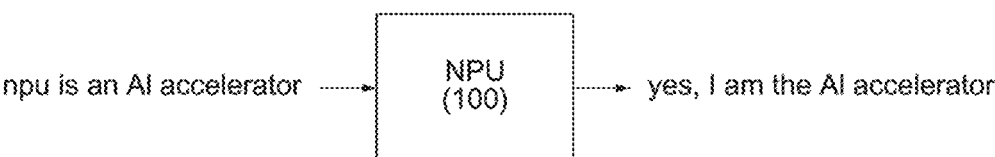
FIG. 1 is a diagram illustrating a computing system for processing a transformer-based generative artificial intelligence language model that may be applied to examples of the present disclosure.

The specific structural or functional descriptions for the examples according to the concept of the present disclosure disclosed herein are exemplified for the purpose of describing the examples according to the concept of the present disclosure.

Embodiments according to the concept of the present disclosure may be implemented in various forms. The present disclosure should not be construed as being limited to the embodiments described herein.

Embodiments according to the concept of the present disclosure may be subject to various modifications. The present disclosure may have various forms. Therefore, specific examples are illustrated in the drawings and will be described in detail in the present disclosure. However, this is not intended to limit the examples according to the concept of the present disclosure to a specific disclosed form. Therefore, it should be understood that all modifications, equivalents, or substitutes included in the spirit and technical scope of the present disclosure are included in the present disclosure.

Terms such as first and/or second may be used to describe various components. However, the present disclosure should not be limited by these terms.

These terms are only used to distinguish one component from another. For example, without departing from the scope of the rights of the concept of the present disclosure, a first component may be named a second component, and similarly, a second component may also be named a first component.

When a component is referred to as being "connected" or "coupled" to another component, it should be understood that it can be directly connected or coupled to the other component, but other components may also be present in between. On the other hand, when a component is referred to as being "directly connected" or "directly coupled" to another component, it should be understood that there are no other components in between.

Other expressions describing the relationships between components, such as "between" and "immediately between" or "adjacent to" and "directly adjacent to," should be interpreted in the same way.

In this document, expressions such as "A or B." "at least one of A or/and B," or "one or more of A or/and B" may include all possible combinations of the items listed together. For example, "A or B," "at least one of A and B," or "at least one of A or B" may refer to all of the following cases: (1) including at least one A, (2) including at least one B, or (3) including both at least one A and at least one B.

Expressions such as "first," "second," "primary," or "secondary" used in this disclosure may modify various components, regardless of order and/or importance. These expressions are used only to distinguish one component from another and do not limit the components. For example, a first user device and a second user device may represent different user devices, regardless of order or importance. For example, a first component may be named a second component, and similarly, a second component may also be renamed as a first component without departing from the scope of the rights described in this document.

The terms used in this disclosure are for the purpose of describing particular embodiments only and are not intended to be limiting of the scope of other examples.

A singular expression may include a plural expression unless the context clearly indicates otherwise. In this disclosure, terms such as "comprise" or "have" are intended to specify the presence of stated features, numbers, steps, operations, components, parts, or combinations thereof. Therefore, it should be understood that they do not preclude the presence or addition of one or more other features, numbers, steps, operations, components, parts, or combinations thereof.

Unless otherwise defined, all terms used herein, including technical or scientific terms, may have the same meaning as commonly understood by one of ordinary skill in the art to which this disclosure belongs.

Terms used in this disclosure, such as those defined in general dictionaries, may be interpreted as having a meaning that is the same as or similar to the meaning in the context of the related art. The terms used in this disclosure are not to be interpreted in an idealized or overly formal sense unless expressly so defined herein. In some cases, even terms defined in this document cannot be interpreted to exclude the embodiments of this document.

The terms used in this disclosure are for the purpose of describing particular embodiments only and are not intended to be limiting of the present disclosure.

A singular expression includes a plural expression unless the context clearly indicates otherwise. In this disclosure, terms such as "comprising" or "having" are intended to designate the presence of the described feature, number, step, operation, component, part, or a combination thereof. Therefore, it should be understood that they do not preclude the possibility of the presence or addition of one or more other features, numbers, steps, operations, components, parts, or combinations thereof.

Unless otherwise defined, all terms used herein, including technical or scientific terms, have the same meaning as commonly understood by one of ordinary skill in the art to which this disclosure belongs. Terms such as those defined in commonly used dictionaries should be interpreted as having a meaning consistent with the meaning in the context of the relevant art. Unless explicitly defined in this disclosure, they should not be interpreted in an idealized or overly formal sense.

The respective features of the various examples of the present disclosure can be partially or wholly combined or coupled with each other. The various examples of the present disclosure can be technically interlinked and driven in various ways, as can be fully understood by those skilled in the art. Each example of the present disclosure may be implemented independently of each other or may be implemented together in an associated relationship.

In describing each example, explanations of technical content that are well known in the technical field to which the present disclosure belongs and are not directly related to the present disclosure will be omitted. This is to deliver the gist of the present disclosure more clearly without obscuring it by omitting unnecessary explanations.

In the present disclosure, a "unit" may refer to a hardware module or a hardware circuit. For example, a "~ unit" may be a hardware circuit for performing a specific function. However, a "~ unit" does not necessarily mean a dedicated circuit physically separated from other circuits to perform only that function. A "~ unit" may be configured based on a plurality of circuits, and these circuits may exist in different locations and may interoperate under control signals to perform a specific function. For example, "A unit" and "B unit" may include at least some common electronic circuits.

In the present disclosure, an "artificial intelligence model" may include not only generative AI models but also traditional AI models that perform judgment, classification, prediction, etc. The artificial intelligence model may include a language model, a model that reads images or videos, etc., and any model that generates output data from input data using an artificial neural network can correspond to an artificial intelligence model. For example, an artificial intelligence model can generate output text from input text. An artificial intelligence model can classify input data or generate prediction data from input data. An artificial-g intelligence model can search for or track an object of interest from an image or video. An artificial intelligence model can perform situation judgment by analyzing an image or video. An artificial intelligence model can generate an image/video corresponding to the input text based on the input text. An artificial intelligence model can generate output text describing the input image/video from the input image/video. The input data and output data may be text, voice signals, images, videos, etc., respectively, and are not limited in type.

An artificial intelligence model may be implemented as an artificial neural network. Therefore, as a representative embodiment, the processing or operation for an "artificial intelligence model" means the processing or operation of an artificial neural network, and the parameters of the artificial intelligence model may include the weights of the artificial neural network, but are not limited thereto. For example, it should be understood that the processing or operation of an artificial intelligence model may include mathematical operations not included in the neural network structure, such as softmax.

"Transformer" is an artificial intelligence model implemented based on an attention mechanism, which may be used in language models (large language models, or LLMs, and small LLMs). Language models include BERT (bidirectional encoder representations from transformers), GPT (generative pre-trained transformer), RoBERTa (robustly optimized BERT pretraining approach), ALBERT (a lite BERT), ELECTRA (efficiently learning an encoder that classifies token replacements accurately), Transformer-XL (transformer with extra long context), XLNet (a model combining the advantages of GPT and BERT), BART (bidirectional and auto-regressive transformers), CTRL (conditional transformer language), T5 (text-to-text transfer transformer), LaMDA (language model for dialogue applications), Gopher (DeepMind's LLM), InstructGPT (a fine-tuned model based on GPT-3), PanGu (Huawei's Chinese model), PaLM (Pathways language model), OPT 175B (open pretrained transformer 175B), BLOOM (BigScience large open-science open-access multilingual model), Hyper-CLOVA (Naver's Korean super-giant model), etc. The language models may also include new language models that will appear in the future.

The transformer may be utilized not only in natural language processing (NLP) but also in computer vision, and representative transformer-based vision models include VIT (Vision transformer), Swin Transformer (sliding window-based transformer for Vision), etc.

Therefore, the transformer is one of the core techniques of various artificial intelligence models that utilize the attention mechanism. A transformer-based language model, for example, can output "yes you are an expert" when "npu is an ai accelerator" is input.

According to examples of the present disclosure, a device, method, system, and computer-readable medium that enable a generative artificial intelligence service to operate on the device itself (also called on-device) may be provided.

In general, a transformer-based generative artificial intelligence model receives a query as input and generates a response. For example, a language model receives a query in text form as input and generates a token. Subsequently, the query and the generated token are input back into the language model to generate the next token. This token generation operation may be repeated multiple times until the response to the query is complete. A token can correspond to a word or part of a word. The response generated by the language model may include a series of tokens that are further generated by passing the tokens generated as part of the response back through the language model.

Hereinafter, some embodiments will be clearly and in detail described with reference to the accompanying drawings so that those of ordinary skill in the art to which the present disclosure pertains (hereinafter, those of ordinary skill) can easily implement the present disclosure.

Figure 2:
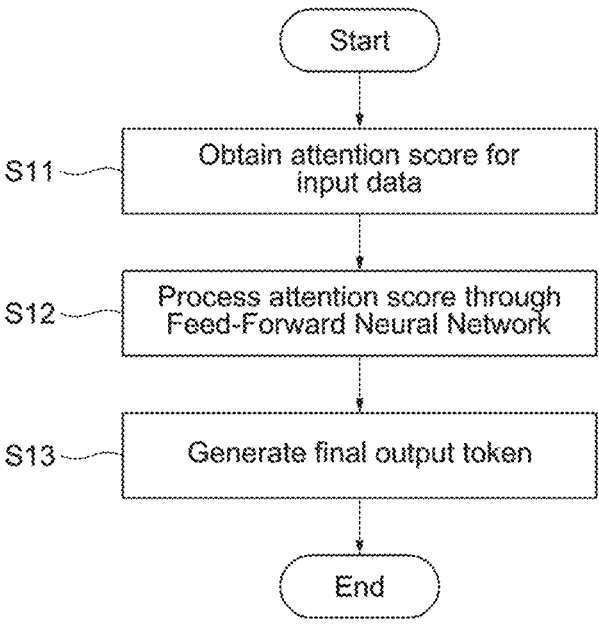
FIG. 2 is a flowchart illustrating a method in which a neural processing unit generates output data from input data using an artificial intelligence model, applicable to examples of the present disclosure.

FIG. 1 and FIG. 2 illustrate a process of inferring a transformer-based generative artificial intelligence language model on an NPU. A computing system according to the present disclosure operates on an edge device and can infer input text data through embedding, attention, feed-forward, softmax, etc., to output output tokens. This process may comprise numerous matrix multiplications and nonlinear operations, and the disclosed NPU can enable high-speed inference through the optimization of these operations.

FIG. 1 illustrates a computing system 1 for processing a language model that may be applied to examples of the present disclosure.

Referring to FIG. 1, the computing system 1 can receive input data and generate output data using integrated hardware and software components. The computing system 1 may include a neural processing unit (NPU) 100, which is optimized for performing artificial intelligence (AI) tasks, especially those involving deep learning models. In addition to the NPU, the computing system 1 may comprise general-purpose and specialized processing units, such as a central processing unit (CPU), a graphics processing unit (GPU), and various forms of memory. These components can collaborate to manage data preprocessing and neural network inference.

For instance, embedding conversion of input text into numerical representations (embedding vectors) may be handled by the CPU or GPU. Once the text data is converted into embeddings, these vectors are transmitted to the NPU 100, which is designed to perform inference operations efficiently using a transformer-based generative AI model. These models are commonly used in applications like language generation, translation, and content summarization.

The NPU 100, also referred to as an AI accelerator or AI hardware accelerator, specializes in accelerating complex AI computations. It is particularly suitable for running transformer models due to their computational intensity and reliance on parallel processing. The computing system 1 may represent various devices, collectively referred to as device 10000, which may include smartphones, robots, advanced driver assistance systems (ADAS), surveillance cameras, and more.

In a typical operation scenario, the NPU 100 receives input data—such as a string of text—and generates output data that could either be text, images, or even video frames. Input text is broken down into tokens, which are the smallest units of meaning (e.g., words or subwords). For example, if the input sequence comprises five tokens—'npu,' 'is,' 'an,' 'AI,' 'accelerator'—the NPU may perform a transformer-based artificial neural network operation to output text including six tokens—'yes,' 'I,' 'am,' 'the,' 'AI,' 'accelerator.' The text data is composed of at least one token.

Transformer-based artificial neural network (ANN) operations may be performed in an on-device manner. That is, the entire process can be executed in an on-device manner, meaning it is performed locally without the need for cloud computing resources. This is particularly advantageous for edge devices, such as smartphones, CCTVs, drones, and robots, which benefit from reduced latency, increased privacy, and independence from network connectivity. In other words, the computing system 1 may be included in and driven on such an edge device.

Additionally, transformer-based artificial neural network (ANN) operations may be performed based on an attention mechanism. Under the principle of attention mechanisms, when text input is received, it undergoes an embedding process to convert tokens into high-dimensional vectors. These vectors are then transformed into query (Q), key (K), and value (V) representations via matrix multiplication (MatMul) with corresponding weight matrices. The query weight matrix, key weight matrix, and value weight matrix are pre-trained parameters learned during the training phase of the model. Subsequently, the model computes the similarity between the query and key vectors Q and K to derive attention scores, which determine how much focus each word in the input should receive relative to others. These attention scores are then used to weight the value vector V, allowing the model to generate context-aware outputs based on the structure and meaning of the input sequence.

FIG. 2 illustrates a method by which a neural processing unit (NPU) applicable to examples of the present disclosure generates output data from input data using an artificial intelligence model. The method of FIG. 2 follows the operation of the NPU 100 for token generation using a transformer-based language model.

Referring to FIG. 2, the NPU 100 may obtain an attention score for input data (step S11).

Referring to FIG. 2, the neural processing unit 100 can obtain an attention score for the input data S11.

The input data may include a plurality of tokens, and each token can be represented as an embedding vector of a certain dimension ($d_{model}$). The number of dimensions of the embedding vector ($d_{model}$) may be, for example, 128, 256, 1024, 2048, or 4096. For convenience of explanation, it is assumed that $d_{model}$ is 4096. In this embodiment, one token in the computing system 1 may be represented as a 1×4096 dimension embedding vector.

For example, if a user has input "npu is an AI accelerator" composed of five tokens into the computing system 1000, the computing system 1000 can convert the corresponding input text into an embedding vector of size 5×4096 (i.e., five 1×4096), and the NPU 100 can receive the corresponding embedding vector. The NPU 100 can obtain a query vector Q by vector-matrix multiplying the embedding vector by a query weight matrix. The NPU 100 can obtain a key vector K by vector-matrix multiplying the embedding vector by a key weight matrix, and the NPU 100 can obtain a similarity through the inner product between the query vector Q and the key vector K. When the query vector Q and the key vector K are multiplied by inner product, a scalar value is obtained, and as a result, a vector $QK^T$ of a size (1×5) identical to the number of tokens of the input data is obtained. $QK^T$ represents the similarity of the current token to the key k (each of the five tokens). However, since the elements of the obtained vector $QK^T$ can be numerically very large, for numerical stability, the $QK^T$ may be divided by the square root of the size of the key vector K ($\sqrt{(dk)}$) and then a softmax operation may be applied to obtain a normalized final similarity. The following Equation 1 defines the formula for calculating the softmax-based similarity value (qk) for the current token key k. k may be one of 1, 2, . . . , N (N being the number of tokens included in the input data, a natural number of two or more). In this embodiment N=5.

$$QK = \text{softmax}\left(\frac{QK^T}{\sqrt{d_k}}\right) \qquad \text{Equation 1}$$

Here, the softmax operation is an operation that converts several numbers into probabilities between 0 and 1. The following Equation 2 represents a formula for performing a softmax operation on a vector $[z_1, z_2, \ldots, z_a]$.

$$\sigma(zi) = \frac{e^{zi}}{\sum_{j=1}^{n} e^{zi}} \qquad \text{Equation 2}$$

However, if a very large value exists in zi, a numerical instability problem may occur. To solve this, a more numerically stable calculation can be made possible by using a method of subtracting the maximum value, zmax (negative exponential trick). The following Equation 3 is a softmax operation formula modified using zmax calculated in Equation 2.

$$\sigma(zi) = \frac{e^{zi - zmax}}{\sum_{j=1}^{n} e^{zi - zmax}} \qquad \text{Equation 3}$$

Through Equation 1, the similarity may be obtained, for example, as a vector of size 1×5 of [0.007, 0.993, 0, 0, 0]. The similarity is a value expressed as a probability of similarity to other tokens with respect to the current query (e.g., 'npu').

According to an embodiment, the NPU 100 can assign a value to the similarity. The method for calculating the value vector may be similar to the method for calculating the key vector. The embedding vector can be converted into a value vector through vector-matrix multiplication with a pre-learned value weight matrix. An attention score can be obtained by vector-matrix multiplying the similarity obtained through Equation 1 by a value vector V. Accordingly, an attention score of size 5×4096, which is the same dimension as the input data, can be obtained by performing an operation such as Equation 4.

$$\text{Attention Score} = \text{softmax}\left(\frac{QK^T}{\sqrt{d_k}}\right) \times V \qquad \text{Equation 4}$$

In Equation 4, Q is the query matrix, $K^T$ is the transposed key matrix, $d_k$ is the dimension of the key vectors (used for scaling), and V is the value matrix. This computation yields an attention score matrix with the same dimensionality as the original input, for instance, 5×4096 if the input consists of five tokens and each token is represented by a 4096-dimensional vector. This dimensional consistency is crucial for residual connections and for maintaining uniformity across transformer layers.

The NPU 100 may perform the attention operation of Equation 4 repeatedly as part of a multi-head attention mechanism or across multiple transformer layers to generate increasingly abstract and meaningful representations of the input data. Each repetition involves a series of computationally intensive operations, including high-dimensional vector-matrix multiplication, scalar division, and element-wise multiplication. The ability of the NPU 100 to execute these operations rapidly and in parallel is essential for real-time or near-real-time inference tasks.

Additionally, according to another embodiment, the NPU 100 may implement residual connections and layer normalization to enhance the stability and performance of deep learning operations. These techniques are widely adopted in transformer models to address common training and inference challenges.

A residual connection helps to mitigate the issue of vanishing gradients, a problem that can arise in deep networks where gradient signals become too small to effectively update weights during training. The residual connection achieves this by adding the input vector to the output of a neural network layer, effectively preserving the original information and making the learning process more robust. In the context of the attention mechanism, this means that after the attention score is computed, the original input embedding vector is added back to the output, ensuring that core features are retained even after transformation.

Layer normalization, on the other hand, is used to stabilize the learning dynamics by normalizing the outputs of a layer based on their mean and variance. This technique counters the problem of internal covariate shift, which refers to changes in the distribution of inputs to a layer during training. By applying normalization, the NPU ensures that each output dimension maintains a consistent statistical distribution, thus promoting faster convergence and improved generalization during inference. In natural language processing tasks, layer normalization is applied after residual connection and before subsequent non-linear transformations.

As a result, the NPU 100 may execute transformer-based inference operations, including attention computation, residual connection, and layer normalization.

Next, after computing attention scores for each token based on contextual relationships the NPU 100 proceeds to process the previously computed attention scores through a feed-forward neural network (step S12).

The feed-forward neural network is for predicting nonlinear phenomena (nonlinear transformations) in order to discern complex relationships within the data. Specifically, the feed-forward neural network infers deeper contextual meanings-such as phrases, clauses, or syntactic patterns—by recombining the relational information encoded in the attention-weighted token representations. The network enables the model to go beyond surface-level token relationships and capture more abstract patterns relevant to language understanding.

In one embodiment, the feed-forward neural network may consist of two fully connected layers, each comprising 2.048 nodes. These layers are typically followed by activation functions (such as ReLU or GELU) to introduce nonlinearity. The network receives as input a vector of 4,096 dimensions—the same dimensionality as the model's hidden state—and outputs a vector of identical size (4,096 dimensions). This dimensional consistency ensures seamless integration with subsequent model components.

The feed-forward neural network is pre-trained and utilizes repeated vector-matrix multiplication operations to perform inference efficiently. The network's input is the result of the residual connection and layer normalization applied in the preceding step (step S11). The normalization techniques ensure numerical stability and preserve gradient flow during backpropagation. The same residual connection and normalization may also be additionally performed on the output of the hidden layer composed of two layers. This architecture contributes to the model's depth and robustness by allowing information to pass through multiple layers with minimal degradation.

Next, following the processing through the feed-forward network, the NPU 100 proceeds to generate a final output token (step S13).

For this, the 4,096-dimensional output vector from step S12 must be expanded to match the size of the entire token vocabulary supported by the language model, which may consist of, for example, 30,000 unique tokens. This is achieved through a final linear transformation, whereby the output vector is multiplied by a weight matrix of dimensions 4,096×30,000, yielding a logit vector of size 1×30,000. Each entry in this vector corresponds to a raw prediction score (logit) for a specific token in the vocabulary.

The size of the final output weight matrix for the final output is $d_{model}$×SIZE_DIC, where $d_{model}$ is the hidden size of the model (4,096 in this case), and SIZE_DIC is the total number of output tokens that can be output from the language model currently being inferred by the NPU 100 (30,000 in this embodiment).

Once the logit vector is obtained, a softmax operation is applied to convert the raw logits into normalized probability values ranging between 0 and 1. This operation ensures that the sum of all probabilities across the 30,000 tokens equals 1. The token with the highest probability is then selected as the next output token to be generated by the language model. For example, if the input sequence to the NPU 100 is the phrase "npu is an AI accelerator," the predicted next token may be "yes." Continuing the inference, if the sequence is extended to "npu is an AI accelerator yes you are an," the model may predict the next token to be "expert."

As described above with reference to FIG. 1 and FIG. 2, the neural processing unit repeatedly performs numerous matrix multiplication operations (MatMul), vector operations, scalar operations, etc., for inference operations of a transformer-based artificial neural network model, and the neural processing unit needs to be optimized for these operations. Hereinafter, the structure and operation of the NPU 100 will be described.

Figure 3:
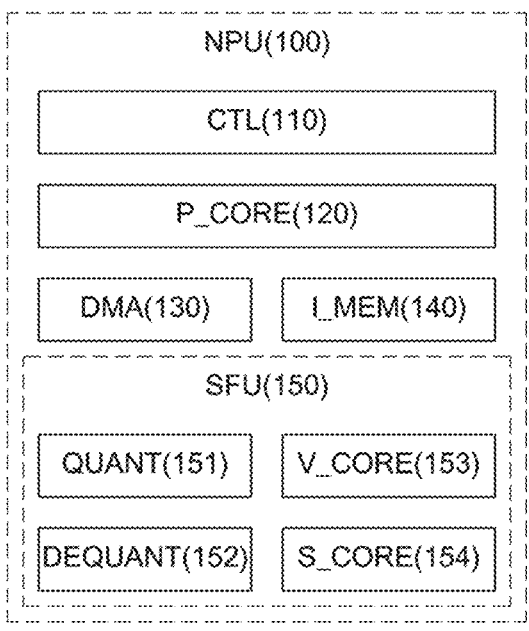
FIG. 3 is a block diagram illustrating a neural processing unit applicable to examples of the present disclosure.

FIG. 3 illustrates a neural processing unit (NPU) 100 applicable to examples of the present disclosure.

Hereinafter, the neural processing unit 100 will be described in detail with reference to FIG. 3.

The NPU 100 is a dedicated processor configured specifically for executing deep neural network (DNN) operations and operates independently of general-purpose processors such as central processing units (CPUs) or graphics processing units (GPUs). The NPU 100 may alternatively be referred to as a tensor processing unit (TPU), an artificial intelligence (AI) accelerator, a neural signal processor (NSP), a neural network processor (NNP), or the like.

The NPU 100 may be implemented as a semiconductor device comprising electrical and electronic circuitry. Each component of the NPU 100 may include integrated semiconductor circuitry formed from a plurality of electronic elements, such as transistors, capacitors, resistors, and interconnect wiring. Accordingly, certain functional or structural elements may not be readily distinguishable by visual inspection (the naked eye) and, instead, may be identifiable only through analysis of their operational behavior or electrical characteristics.

The NPU 100 is designed to accelerate computation for artificial neural network operations and may be referred to as artificial intelligence (AI) hardware acceleration. The NPU 100 may be configured to execute operations associated with transformer-based language models. However, its functionality is not restricted to language processing and may extend to other domains, such as computer vision, where it can be utilized for models including YOLO (you only look once), ResNet, and similar architectures. The NPU 100 may be integrated within a device 10000 to perform AI-driven computations and produce inference results. The device 10000 may further include one or more of a central processing unit, a graphics processing unit, an application processor (AP), or a microcontroller unit (MCU). The device 10000 may include various input components such as microphones, cameras, touchpads, and keyboards to receive input data, and may include output components such as displays or speakers for delivering results of neural inference, that is, to output the output data. The device 10000 may take the form of a smartphone, a smart assistant terminal located in a residential or office environment, a consumer appliance, a vehicular control unit (VCU), an advanced driver-assistance system (ADAS), a closed-circuit television (CCTV) system, a robot, or a mobility platform, among others.

The NPU 100 according to examples of the present disclosure is specifically designed to accelerate attention-related computations in transformer-based neural network architectures, and to do so with optimized (low) power consumption. While the architecture may be tailored to transformer-based models, the NPU 100 of the present disclosure may also support processing of other neural network architectures, including convolutional neural networks (CNNs), enabling flexibility across a variety of AI domains.

The neural processing unit 100 applicable to examples of the present disclosure may include a controller (CTL) 110, a processing core (P_CORE) 120, a direct memory access (DMA) 130, an internal memory (I_MEM) 140, and a special function unit (SFU) 150.

The processing core 120, vector core (V_CORE) 153, and scalar core (S_CORE) 154 within the NPU 100 may be implemented as arithmetic logic units that are optimized for performing computations associated with attention layers in neural network models. Each attention layer may obtain an attention score (Q, K, V), which is an operation value, using input values and parameters such as query Q, key K, and value V.

The processing core 120, vector core 153, and scalar core 154 may be designed to execute matrix multiplication, root mean square normalization, and softmax operations, which are typical of attention mechanisms. The tensor data to be processed in these operations may take the form of multi-dimensional matrices, two-dimensional matrices, one-dimensional arrays, or scalar values. One of the processing core 120, vector core 153, and scalar core 154 may be selected for operation according to the data type. That is, a processing unit may be selected dynamically based on the dimensional type of the tensor to achieve efficient computation. This architecture enables the NPU 100 to accelerate operations of generative AI models while maintaining low power consumption by allocating the appropriate core module to each computation.

That is, the processing core 120 may be configured to execute the mathematical computations necessary for performing neural network inference. The processing core 120 may include arithmetic logic units (ALUs), multiply-accumulate (MAC) units, adder trees, and other hardware blocks optimized for numerical operations in neural inference pipelines.

The controller 110 may be electrically connected to the processing core 120, the direct memory access unit 130, the internal memory 140, and the special function unit 150. The controller 110 may manage execution of neural network computations within the NPU 100. The controller 110 may coordinate the operation of the various internal components using execution code that is generated by a compiler (not shown). The compiler may be implemented as a hardware circuit or as a software module executing on a separate device from the NPU 100.

The compiler may be configured to compile a specific neural network model into execution code that is executable by the NPU 100. In particular, the compiler may generate code optimized for a particular neural processing unit based on its architectural characteristics, that is, code exclusively executed in a specific NPU having a specific performance. The execution code may also be referred to as machine code or binary code and may contain low-level instructions for coordinating data movement and computational operations. That is the compiler takes a neural network model written in a high-level AI framework such as TensorFlow or PyTorch as input and converts it into low-level machine code optimized for the NPU architecture of the present disclosure (e.g., integer operation core, special function unit).

The controller 110 may operate the processing core 120, direct memory access unit 130, internal memory 140, and special function unit 150 according to the instructions and scheduling logic encoded in the execution code. In generating the execution code, the compiler (not shown) may be provided with information including, but not limited to, performance metrics of the processing core 120, vector core 153, and scalar core 154, conversion performance of the quantization unit (QUANT) 151 and dequantization unit (DEQUANT) 152, capacity of the internal memory 140, and bandwidth constraints associated with external memory interfaces via a corresponding bus (not shown). The compiler may also have access to structural (hardware) characteristics of the neural network model, such as model topology, algorithm types, and information on the size of parameters (parameter dimensions).

Based on this information, the compiler may generate execution code that defines data read/write sequences, operation schedules for neural computations, and control logic for managing the operational states of the various modules within the NPU 100. The controller 110 may receive this execution code and operate the hardware in accordance with its instructions. A distinct execution code may be generated for each neural network model, and by processing at least one execution code, the NPU 100 may support concurrent or sequential execution of multiple such codes.

The processing core 120 may be further configured with circuitry specialized for matrix multiplication, which constitutes a computational bottleneck in most neural network models. The processing core 120 may include an array of processing elements (PEs) and may be implemented using an M×N matrix structure of PEs or an adder tree architecture, where M and N are integers. The processing core 120 may parallelize computation of matrix multiplication operations involving input data and associated model parameters (e.g., weights, kernels, query, key, and value tensors) by distributing workloads across an array of processing elements (not shown). To elaborate, a PE is configured with a MAC unit, which processes multiply and accumulate operations in one cycle, as its core, and functions as the basic unit of matrix operations.

For this, the processing elements (not shown) may each include a MAC (multiply and accumulate) operator. Accordingly, the processing core 120 can efficiently perform matrix multiplication or convolution operations by executing repetitive multiply-and-accumulate calculations required for neural network inference. The processing core 120 may be a circuit designed to simultaneously process M×N sized tensor data, enabling parallel computation across a matrix of input activations and corresponding weight parameters. Here, M and N may be integers representing the vertical and horizontal dimensions of the processing array, respectively. The number of processing cores 120 included in the NPU 100 may be at least one and may vary depending on the implementation requirements and chip area availability.

The processing core 120 may exchange data with other circuit modules within the NPU 100, including the vector core 153, scalar core 154, internal memory 140, and a main memory (not shown) interfaced through the special function unit 150. Such communication may be performed via internal buses or interconnect circuits that enable fast and low-latency data transfer. The processing core 120 may be configured to receive integer-type parameters as input and to output processed results in integer format as well. The input integer parameters may include input activation data and trained weight values. These input parameters may be configured to have a first bit width, and the weight parameters may be configured to have a second bit width, which may or may not be equal to the first. The output result generated by the processing core 120 may be configured to have a third bit width. The third bit width may be selected to be greater than either the first or second bit width to prevent information loss due to overflow during accumulation operations.

As the number of processing elements (not shown) included in the processing core 120 increases, the overall transistor count in the application-specific integrated circuit (ASIC) implementing the NPU 100 may also increase. This, in turn, may result in higher chip area usage and increased fabrication cost. To address this, if the processing core 120 is designed to operate primarily on integer data types instead of floating-point representations, a substantial reduction in the transistor count can be achieved. Specifically, the number of transistors required for processing floating-point arithmetic is typically about four times greater than that required for integer arithmetic. By limiting the operations of the processing core 120 to integer formats, the overall power consumption of the NPU 100 can be significantly reduced, and chip area utilization can be optimized.

The bit width of integer parameters that the processing core 120 can process may be determined based on the hardware design of the individual processing elements (not shown), including factors such as input buffer size, accumulator width, and output formatting logic. The specific bit widths may vary across different implementations and may be optimized for the desired trade-off between inference accuracy and power efficiency. Bit width configurations and design trade-offs will be further described later in reference to FIG. 4.

The number of processing elements (not shown) within the processing core 120 may range from hundreds to tens of thousands, depending on the level of parallelism and target inference throughput. To elaborate, as mentioned above, since a processing element designed to execute floating-point arithmetic requires roughly four times as many transistors as a comparable element designed for integer operations, in embodiments where the circuit of the processing core 120 within the NPU 100 is configured exclusively for integer arithmetic operations-excluding floating-point data types—there can be up to a 75% reduction in transistor count. As a result, more processing elements can be incorporated within the same semiconductor die area, providing higher parallelism and improved energy efficiency. Such architecture offers a significant advantage in reducing the physical chip size and enhancing inference throughput while maintaining low power consumption, making it particularly suitable for edge AI applications.

The special function unit 150 may refer to an aggregate of various circuit blocks configured to accelerate neural network operations that are not efficiently handled by the processing core 120. These may include non-linear or transcendental functions that are difficult to implement using basic ALU operations. The special function unit 150 may be optimized to accelerate special mathematical functions commonly required in neural network inference and training, such as exponential (exp), logarithmic (log, ln), square root (sqrt), reciprocal (1/x), inverse square root (1/sqrt(x)), and trigonometric functions (e.g., sin, cos, tan, arcsin, arccos). Such operations may be necessary for normalization layers, activation functions, or post-processing steps within a model.

To efficiently perform the above operations, the special function unit 150 may include a quantization unit 151 and a dequantization unit 152. These components may collectively serve as a number system conversion unit, facilitating conversion between different data representations, such as INT8 and FP16, to balance model performance and hardware resource usage. In addition, the special function unit 150 may include a vector core 153 configured to handle wide vector operations on tensor data, and a scalar core 154 designed to execute scalar arithmetic operations on control or meta-data elements. These components may cooperate with the processing core 120 and internal memory 140 to provide comprehensive support for a wide range of operations required during model inference.

The quantization unit 151 of the special function unit 150 may be configured to convert data represented in floating-point (FP) format to integer (INT) format. This operation is referred to as quantization and may be performed to reduce the computational complexity and power consumption of the NPU 100. Conversely, the dequantization unit 152 may be configured to perform the inverse operation, i.e., converting integer-format data back into floating-point format. This allows subsequent neural network layers that require floating-point precision to process the data. The quantization unit 151 and the dequantization unit 152 may be implemented as specialized hardware circuits capable of supporting various bit-widths and precision schemes, depending on inference requirements of an artificial intelligence model.

Figure 5:
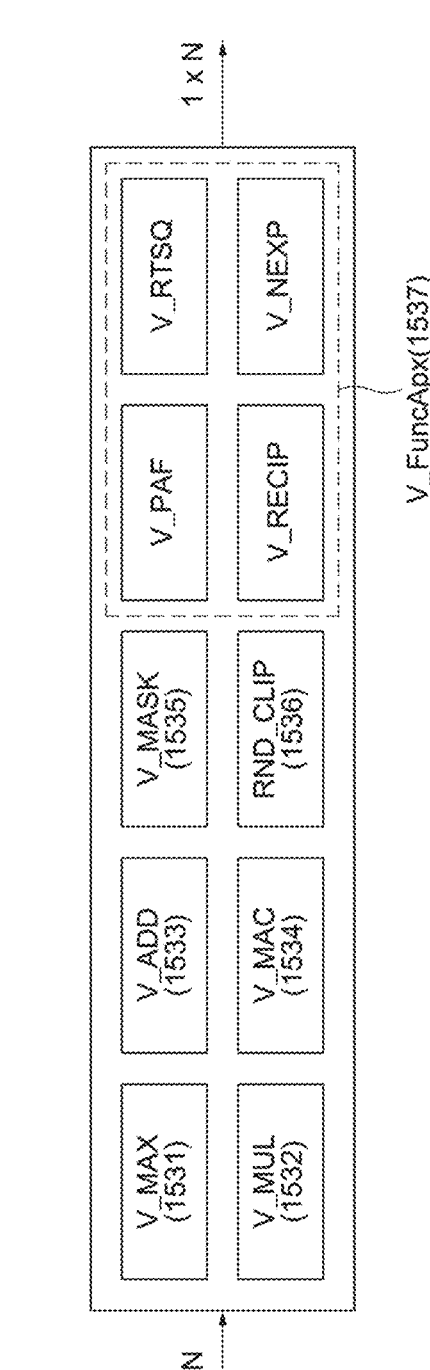
FIG. 5 is a block diagram illustrating a vector operation unit of a special function unit applicable to examples of the present disclosure.

The vector core 153 included in the special function unit 150 may comprise a plurality of hardware modules configured to perform vector-based arithmetic operations required in neural network inference, excluding matrix multiplication operations that are executed by the processing core 120. The vector core 153 may be implemented as an aggregation of parallel vector processing circuits, each tailored to specific vector functions. For instance, as shown in FIG. 5, the vector core 153 may include a vector maximum value computation unit (V_MAX) 1531, a vector multiplication unit (V_MUL) 1532, a vector addition unit (V_ADD) 1533, a vector multiply-and-accumulate (MAC) unit (V_MAC) 1534, a vector mask application unit (V_MASK) 1535, a vector rounding and clipping unit (RND_CLIP) 1536, and a vector function approximation unit (V_FuncApx) 1537. These specialized vector units may accelerate the computation of complex layer operations, such as those used in attention mechanisms or non-linear activation layers. The operation of each module of the vector core 153 will be further described later in reference to FIG. 5.

Figure 6:
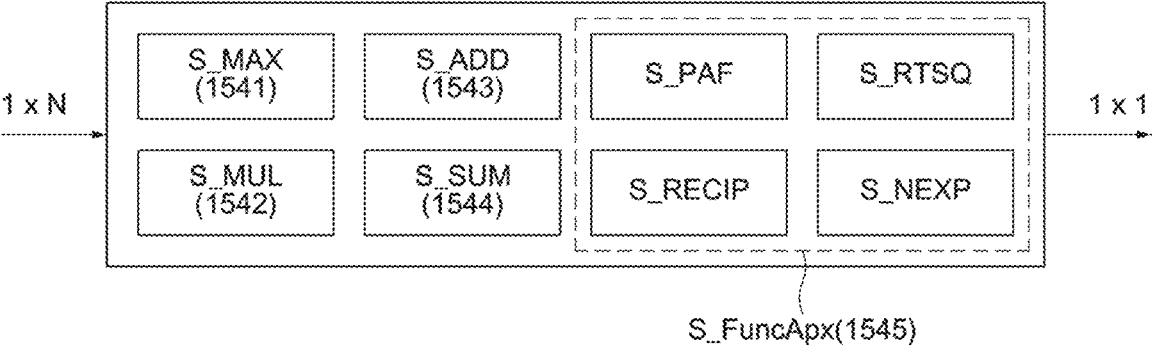
FIG. 6 is a block diagram illustrating a scalar operation unit of a special function unit applicable to examples of the present disclosure.

The scalar core 154 of the special function unit 150 may consist of a collection of hardware modules (set of circuits) designed to execute scalar operations associated with artificial intelligence models. These scalar operations may include arithmetic or functional computations that are not handled by the processing core 120 or the vector core 153. The scalar core 154 may include several dedicated arithmetic circuits configured for single-value (scalar) processing. For example, as shown in FIG. 6, the scalar core 154 may include a scalar maximum value operation unit (S_MAX) 1541, a scalar multiplication unit (S_MUL) 1542, a scalar addition unit (S_ADD) 1543, a scalar summation unit (S_SUM) 1544, and a scalar function approximation unit (S_FuncApx) 1545. These modules may support the execution of auxiliary or post-processing functions commonly required in machine learning inference, such as computing scalar normalization constants or scalar non-linearities. The operation of each module of the scalar core 154 will be further described later in reference to FIG. 6.

The direct memory access (DMA) unit 130 may be configured to perform data transmission and reception between the NPU 100 and at least one memory that is electrically connected to the NPU 100. The at least one memory (not shown) may include, but is not limited to, a main memory, a shared memory, a storage device, or any other memory device accessible by the NPU 100. The DMA unit 130 may enable the NPU 100 to transmit various types of data used in artificial intelligence operations-such as input feature maps, weight parameters, intermediate computation results, and output data—to external memory, or to retrieve such data from memory when needed for processing. The DMA unit 130 may be implemented as a dedicated hardware module designed to operate autonomously from the controller 110 and may perform memory access operations without requiring direct control by a central processor.

The DMA unit 130 may be configured to perform functions such as address configuration for an internal memory (I_MEM) 140, generation of read and write commands for external and internal memory, and scheduling of memory transactions to optimize bandwidth and minimize latency. The DMA unit 130 may include a register set or a configuration interface through which addresses, data lengths, and burst transfer modes can be defined. In some embodiments, the DMA unit 130 may support direct interfacing with one or more high-speed communication buses that connect the NPU 100 to the broader system memory hierarchy. Through these buses, the DMA unit 130 may manage communication between the NPU 100 and one or more memories, enabling the NPU 100 to maintain a high degree of data throughput for neural network inference workloads.

The internal memory (I_MEM) 140 may be implemented as a memory located within the on-chip region of the NPU 100 and may serve various functions, including caching intermediate data generated during neural network computations, temporarily storing operand values, and maintaining data required for controlling execution flows. In addition, the internal memory 140 may include a register file that stores low-level instructions used for executing a neural network model compiled for the specific architecture of the NPU 100. The register file may be integrated with or separately configured from other memory structures within the NPU 100, and in some implementations may also be incorporated as part of the controller 110.

For example, when the NPU 100 is connected to a main memory (not shown) or shared memory (not shown) via a system bus, the internal memory 140 may be configured to prefetch and temporarily store relevant data (e.g., input features, parameters, or intermediate results) required for processing. The internal memory 140 may be designed using one or more types of memory technologies, including but not limited to static random access memory (SRAM), register file memory, dynamic random access memory (DRAM), resistive RAM (ReRAM), magneto-resistive RAM (MRAM), phase-change RAM (PRAM), ferroelectric RAM (FeRAM), or flash memory. The internal memory 140 may be composed of a single memory type (i.e., a homogeneous memory architecture) or a combination of different memory types (i.e., a heterogeneous memory architecture), depending on the power, area, and latency trade-offs specific to the target application.

The internal memory 140 may consist of one or more discrete memory blocks or banks, each configured to support concurrent access by different processing modules within the NPU 100, such as the processing core 120, vector core 153, scalar core 154, and special function unit 150. In some embodiments, the total memory capacity of the internal memory 140 may range from a few megabytes to several tens of megabytes, but is not limited thereto.

The quantization unit 151 included within the special function unit 150 may be configured to contain a quantization circuit capable of converting data represented in a floating-point format into a corresponding integer format. Conversely, the dequantization unit 152 may be configured to include a dequantization circuit that performs the inverse operation, converting integer-form data back into floating-point form. These two components (the quantization unit 151 and the dequantization unit 152) may be collectively referred to as a number system conversion unit.

In one embodiment, the processing core 120 may be designed to receive and output data in an integer format, while the vector core 153 and scalar core 154 may be configured to operate on data in a floating-point format. Accordingly, when data is transmitted between these different cores within the NPU 100, a conversion in data type (or number system) may be required. The quantization unit 151 may include a quantization circuit that transforms floating-point data into integer data for compatibility with the processing core 120, while the dequantization unit 152 may include a dequantization circuit that converts integer-form data into floating-point data, enabling processing by the vector core 153 or scalar core 154.

According to examples of the present disclosure, the floating point is not limited to the IEEE standard 754, and for the operation efficiency of the neural processing unit 100, reduction of memory usage, reduction of power consumption, etc., Brain Floating Point, Dynamic Floating-Point, Variable Precision Floating-Point (VPFP), Custom Floating-Point (CFP), or Flexible Floating-Point (FFP) may be applied. VPFP is a floating-point format that allows the bit widths of the exponent and mantissa to be dynamically set or adjusted. Using VPFP allows for flexible precision levels based on specific calculations, optimizing power and performance. Dynamic floating-point formats, used interchangeably with variable precision, allow the mantissa and exponent sizes to be adjusted on the fly during runtime, enabling response to data characteristics in real time. CFP refers to an application-specific format where the bit allocation for the mantissa and exponent is tailored to the needs of a specific use case. This may be useful for implementing a neural processing unit 100 that selects the exact bit width to optimize hardware resources and data accuracy. FFP refers to a floating-point format that allows for adjustable bit allocation between the exponent and mantissa. FFP may be implemented in the neural processing unit 100 to provide an optimal balance between range and precision. The bit width of the floating point according to examples of the present disclosure may be between 4 bits and 32 bits. The bit width of the integer according to examples of the present disclosure may be between 4 bits and 32 bits.

The NPU 100 may provide at least one of a power gating function, a clock gating function, and a register retention function to allow the NPU 100 to operate at low power. That is, the NPU 100 of the present disclosure may support one or more low-power operation techniques, including but not limited to power gating, clock gating, and register retention. These techniques are designed to reduce power consumption during periods of inactivity or partial utilization, thereby improving overall energy efficiency of the NPU 100, to adaptively manage power based on workload demand.

The power gating function may be implemented as a technique to eliminate leakage power by completely disconnecting power supply lines to circuit blocks that are idle or not in use. This may be achieved through the use of dedicated power switches placed between the power rail and the circuit block. In configurations where power gating is applied, a specific subcomponent or block within the NPU 100 can be electrically isolated from the power source using such a switch. As a result, both dynamic power (associated with switching activity) and static leakage power (associated with idle circuits) can be eliminated in the powered-down block, thereby enabling deep power-saving modes and efficient power management across the NPU architecture.

The clock gating function may be employed to reduce dynamic power consumption by disabling the clock signal to certain circuit blocks that are temporarily inactive. Rather than cutting off power entirely, this technique operates by halting the propagation of the clock signal using dedicated clock control logic. When applied to a circuit block within the NPU 100, clock gating prevents unnecessary signal transitions (switching activity), thereby suppressing dynamic power usage while maintaining the block's power supply. Since power is maintained, the circuit state is preserved, allowing rapid resumption of operation upon reactivation of the clock signal. This feature is advantageous in scenarios where short bursts of processing are followed by brief idle periods, after which operation is resumed by reactivating the clock.

The register retention function may be configured to enable certain registers within the NPU 100 to preserve their stored values even during low-power or sleep modes in which main power is turned off. Registers equipped with this feature may consume minimal retention power sufficient to maintain their logic state. As a result, when the NPU 100 enters a power-saving mode, essential data stored in the registers can be preserved without requiring reinitialization upon wake-up. This capability enhances energy efficiency while supporting fast recovery from power-down states, and contributes to maintaining operational continuity of the neural network inference process when transitioning between active and idle conditions.

The hardware operation between each component of the NPU 100 of FIG. 3 will be described in detail below based on FIG. 8.

Figure 4:
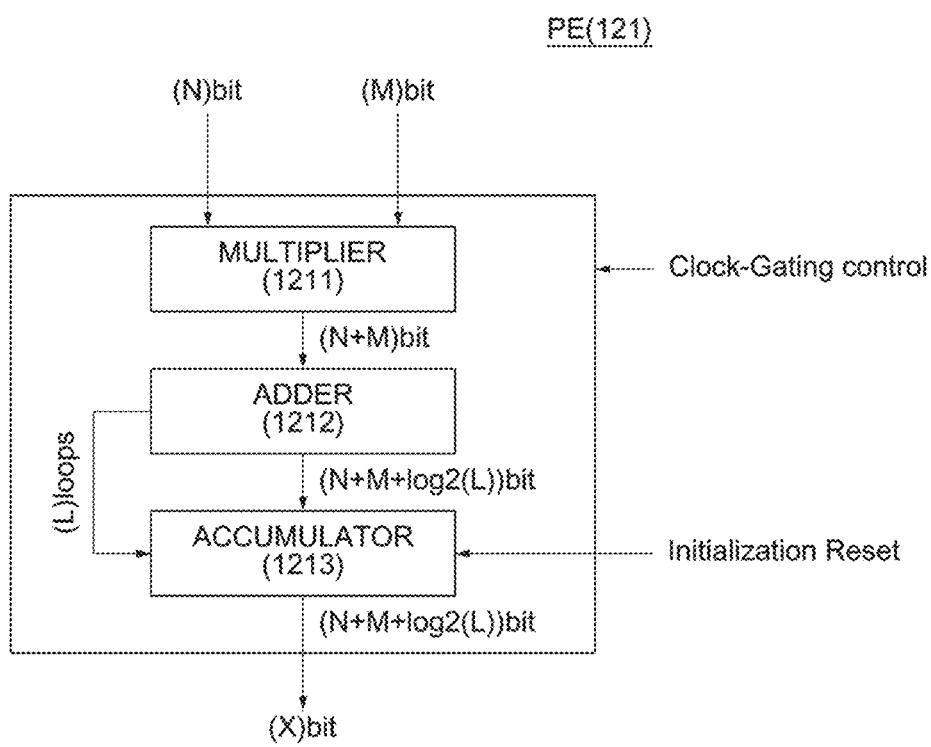
FIG. 4 is a block diagram illustrating a processing element applicable to examples of the present disclosure.

FIG. 4 illustrates a processing element applicable to examples of the present disclosure.

Referring to FIG. 4, the processing element 121 may be configured to include a multiplier 1211, an adder 1212, and an accumulator 1213. The processing element 121 of FIG. 4 may be one of the plurality of processing elements included in the processing core 120 of FIG. 3, and hereinafter, the processing element 121 may be referred to as representing each processing element.

The multiplier 1211 multiplies the received (N) bit data and Mbit data. The operation value of the multiplier 1211 is output as (N+M) bit data. Here, N and M are integers greater than 0. The first input unit may be configured to receive (N) bit data. The second input unit may be configured to receive Mbit data. For example, the first input unit may be configured to receive input parameters, and the second input unit may be configured to receive weight parameters.

The bit width of the parameters input to the first input unit and the second input unit of the processing element 121 may be determined when the execution code is obtained by compiling the current neural network model processed by the neural processing unit 100. That is, the bit width of the input parameters and the bit width of the weight parameters of the neural network model may be determined in the compilation stage by the compiler. For example, the bit width of the input parameters and the weight parameters may be quantized to be the same, and the bit width may be 32 bits, 16 bits, 8 bits, 4 bits, etc., but the present disclosure is not limited thereto. For example, the bit width of the input parameters and the bit width of the weight parameters may be determined differently from each other, and the parameters may be quantized based on each bit width. For example, the bit width of the input parameters and the bit width of the weight parameters may be quantized to 16 bits and 8 bits, respectively. For example, the bit width of the input parameters and the bit width of the weight parameters may be quantized to 8 bits and 4 bits, respectively. That is, the bit width of the parameters input to each input unit of the processing element 121 may be different from each other. The quantization information of the data input to each input unit of the processing element 121 may be included in the execution code.

The accumulator 1213 accumulates the operation value of the multiplier 1211 and the operation value of the accumulator 1213 using the adder 1212 for (L) loops times. Therefore, the bit width of the data at the output and input of the accumulator 1213 may be output as $(N+M+\log 2(L))$ bit. Here, L is an integer greater than 0. When the accumulation is finished, an initialization reset signal may be input to initialize the data stored inside the accumulator 1213 to 0. The accumulator 1213 of the processing element 121 is configured to maintain the accumulated value when zero skipping is activated. Based on the maximum value that may be accumulated in the accumulator 1213, the output data (X) bit may be set to a bit width that does not cause an overflow of the output data (X) bit. For example, (X) bit may be 16 bits to 64 bits.

To elaborate, the quantization unit 151 of the special function unit 150 can convert the integer parameters output from the processing core 120 into floating point and transmit them to the vector core 153, the scalar core 154, and/or the internal memory 140. The quantization unit 151 may be controlled under the control signal of the controller 110.

Figure 7:
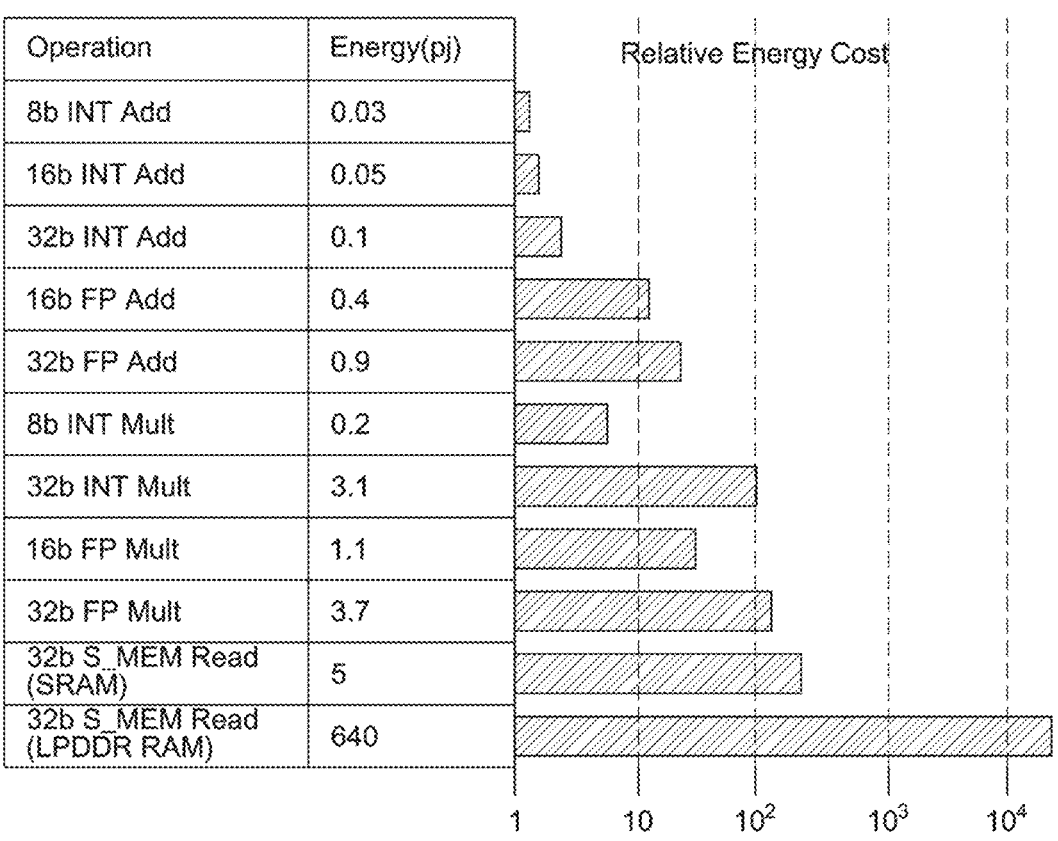
FIG. 7 is a diagram illustrating the energy consumption per unit operation of a neural processing unit applicable to examples of the present disclosure.

The controller 110 can restrict the operation of the multiplier 1211 (e.g., zero skipping operation) so that it does not perform an operation when 0 is input to one of the first input unit and the second input unit of the multiplier 1211, based on the fact that the operation result becomes 0) even if no operation is performed. For example, when 0 is input to one of the first input unit and the second input unit of the multiplier 1211 of the processing element 121, the multiplier 1211 can operate in a zero skipping manner. For zero skipping, each processing element 121 included in the processing core 120 may be activated or deactivated, respectively. The controller 110 can provide an activation or deactivation signal (clock-gating control) to each processing element 121 on a clock pulse-by-clock pulse basis. When the processing element 121 is deactivated, the multiplier 1211 is deactivated. Accordingly, the power consumed for the operation of the multiplier 1211 may be reduced. An example of the power consumption of the multiplier 1211 is shown in FIG. 7.

The processing element 121 may be designed to receive a control signal (clock-gating control) for zero skipping operation control (i.e., activation or deactivation) from the controller 110. Specifically, the multiplier 1211 of the processing element 121 may be designed to receive a respective control signal (clock-gating control) for zero skipping operation control from the controller 110. Alternatively, the adder 1212 of the processing element 121 may be modified to be designed to receive a control signal (clock-gating control) for zero skipping operation control from the controller 110. Alternatively, each of the multiplier 1211 and the adder 1212 of the processing element 121 may be modified to be designed to simultaneously receive a respective control signal (clock-gating control) for zero skipping operation control from the controller 110.

Before the softmax operation is performed, the controller 110 can optimize the operation path by pre-reflecting the multiplication operation (FpMul) based on the normalization coefficient included in the weights of the neural network model at compile time and integrating it into the weights, and omitting the corresponding multiplication operation at runtime. This corresponds to a static optimization method for reducing computational efficiency and power consumption by eliminating unnecessary runtime multiplication operations.

In addition, the controller 110 can selectively control whether to execute the multiplication operation between the query vector and the key vector according to the type of operation request (e.g., attention operation, feedforward operation, etc.) or the operation timing (e.g., decoding stage, learning stage, etc.). This configuration may be implemented by controlling the clock supply of the processing element 121 including the multiplier 1211 or by bypassing the operation path itself to omit the operation.

This control may be processed inside the NPU 100, or may be performed through an integrated controller in a system on chip (SoC) architecture including a plurality of operation units. In this case, the controller 110 may include clock gating or power control signals for each unit, and may be configured to dynamically adjust whether to activate the operation for each operation unit.

FIG. 5 illustrates a vector core of a special function unit applicable to examples of the present disclosure.

The vector core 153 may refer to a set of circuits that process a part of the operations of the artificial intelligence model, excluding the matrix multiplication processed in the processing core 120. The vector core 153 is different from the processing core 120 in that it may comprise floating-point arithmetic circuits. That is, the vector core 153 may be configured to receive floating-point parameters and output floating-point parameters. The vector core 153 may be designed to be pipelined with the processing core 120 and the scalar core 154 for operational efficiency with the processing core 120 and the scalar core 154. Therefore, by having the processing core, vector core, and scalar core process different data simultaneously like a conveyor belt, the overall operation throughput can be maximized and idle time can be minimized. To elaborate, the vector core 153 is configured to exchange data with the processing core 120, the scalar core 154, the internal memory 140, and the main memory (not shown). To elaborate, the vector core 153 may be specially designed to efficiently process a part of the attention operation of a Transformer-based neural network model. That is, the vector core 153 may include a plurality of specialized vector operation circuits.

For example, the vector core 153 may be designed to include a vector maximum value operation unit (V_MAX) 1531, a vector multiplication unit (V_MUL) 1532, a vector addition unit (V_ADD) 1533, a MAC operation unit (V_MAC) 1534, a mask unit (V_MASK) 1535, a rounding clipping unit (RND_CLIP) 1536, and a vector function approximation unit V_FuncApx 1537. The vector maximum value operation unit 1531 is configured to include a circuit that processes the maximum value operation of the input tensor data. The vector multiplication unit 1532 is configured to include a circuit that processes the multiplication operation of the input tensor data. The vector addition unit 1533 is configured to include a circuit that processes the addition operation of the input tensor data. The MAC operation unit 1534 is configured to include a circuit that processes the multiply and accumulate (MAC) operation of the input tensor data. The mask unit 1535 is configured to include a circuit that processes the masking operation of the input tensor data. The rounding clipping unit 1536 is configured to include a circuit that processes the rounding operation and clipping operation of the input tensor data. The vector function approximation unit 1537 is configured to include a circuit that processes the approximation operation of various functions, and may be applied to the exponential function operation performed during the softmax operation or the vector-wise weighted sum operation. In particular, the vector core 153 may be configured to generate an input vector for the softmax operation by multiplying the dot product result between the query vector and the key vector by a normalization coefficient, create a stabilized softmax distribution by subtracting the maximum value from each element of this generated input vector, and output the final attention result by multiplying the softmax operation result with the value vector. Here, the normalization coefficient may be a constant value calculated at compile time and stored in memory. This operation flow may be implemented mainly with circuits such as the vector maximum value operation unit 1531, the vector multiplication unit 1532, the vector addition unit 1533, and the vector function approximation unit 1537, and may be configured in a pipelined and parallel processing manner considering operational efficiency. If necessary, a MAC operation unit 1534 for multiply-and-accumulate operations, a mask unit 1535 for masking processing, or a rounding clipping unit 1536 for output precision correction may be further included to extend the configuration to the auxiliary operation flow before and after the softmax operation.

Hereinafter, the vector function approximation (V_FuncApx) unit 1537 of the vector core 153 will be described in more detail.

In one embodiment, the vector core 153 may be implemented as a dedicated circuit configured to perform parallel processing of tensor data having a shape of M×1. That is, the vector core 153 may be designed to receive tensor data of M×1 dimensions as input and to output result data of the same dimensionality, namely, M×1. In this context, the variable M may correspond to the number of rows of an M×N tensor input to the processing core 120, thereby allowing a dimensionally aligned pipeline architecture between the processing core 120 and the vector core 153. Such an alignment enables seamless data transfer and processing across pipeline stages. For instance, the vector core 153 may incorporate a register file optimized for storing one-dimensional array data, allowing efficient handling of vectorized input received from the processing core 120. By processing tensor data along a specific axis or dimension, the vector core 153 can enhance overall operation throughput and reduce latency in execution. Since the vector core 153 is implemented as a floating-point arithmetic unit specifically designed to perform functional operations (e.g., exponentiation, logarithmic approximation, or trigonometric functions), its architecture prioritizes precision and flexibility in mathematical computations. However, designing the vector core 153 to handle the same M×N-sized tensors as the processing core 120 could significantly increase both the die area of the NPU 100 and its power consumption. To address this, the vector core 153 is intentionally configured to process only M×1-sized tensors (or other manageable vector lengths) in order to balance computational capabilities with power and area efficiency. Additionally, this dimensional reduction helps mitigate bottlenecks in neural network workloads by enabling pipelined operation with the processing core 120. In alternative configurations, the vector core 153 may also be capable of handling tensor inputs shaped as L×1, where L is selected as a power-of-two value that falls within a predefined range relative to M. For example, if M is set to 64, the value of L may be 8, 16, 32, 64, 128, or 256. This flexible configuration allows the vector core 153 to support variable-width input data while maintaining compatibility with downstream hardware.

FIG. 6 illustrates a scalar core of a special function unit applicable to examples of the present disclosure.

The scalar core 154 may refer to a set of circuits that process a part of the operations of the neural network model, excluding the operations processed in the processing core 120 and the vector core 153. The scalar core 154 is different from the processing core 120 in that it may comprise floating-point arithmetic circuits. That is, the scalar core 154 may be configured to receive floating-point parameters and output floating-point parameters. The scalar core 154 may be designed to be pipelined with the processing core 120 and the vector core 153 for operational efficiency with the processing core 120 and the vector core 154. To elaborate, the scalar core 154 is configured to exchange data with the processing core 120, the vector core 153, the internal memory 140, and the main memory (not shown). To elaborate, the scalar core 154 may be specially designed to efficiently process a part of the attention operation of a Transformer-based neural network model. That is, the scalar core 154 may include a plurality of specialized scalar operation circuits.

For example, as previously described, the scalar core 154 may be designed to include a scalar maximum value operation unit 1541, a scalar multiplication unit 1542, a scalar addition unit (S_ADD) 1543, a scalar summation unit (S_SUM) 1544, and a scalar function approximation unit S_FuncApx 1545. The scalar maximum value operation unit 1541 is configured to include a circuit that processes the maximum value operation of the input tensor data. The scalar multiplication unit 1542 is configured to include a circuit that processes the multiplication operation of the input tensor data. The scalar addition unit 1543 is configured to include a circuit that processes the addition operation of the input tensor data. The scalar summation unit 1544 is configured to include a circuit that accumulates a plurality of input scalar values or performs an aggregation operation according to a certain range or condition. The scalar function approximation unit 1545 is configured to include a circuit that processes the approximation operation of various functions. This function approximation operation may be applied to the approximate calculation of the exponential function used in the softmax operation and the calculation of correction coefficients such as the reciprocal operation for the total sum. In other words, the scalar core 154 may be configured to calculate the maximum value among the results of the multiplication operation between the normalized query vector and the key vector, calculate the total sum of the exponential function, and then find the reciprocal to calculate the correction coefficient for the softmax operation.

Hereinafter, the scalar function approximation (S_FuncApx) unit 1545 of the scalar core 154 will be described in more detail.

The scalar core 154 may be implemented as a specialized circuit configured to process tensor data having a shape of M×1, where M denotes the number of individual elements in the tensor input. In one embodiment, the scalar core 154 may receive M×1-sized tensor data as input and produce output data in a reduced 1×1 scalar format. That is, the scalar core 154 is capable of aggregating or computing over the M elements to yield a single scalar result. In this architecture, the input dimensionality M×1 received by the scalar core 154 may be aligned with the M×1 input format processed by the vector core 153. This dimensional consistency enables pipeline compatibility between the vector core 153 and the scalar core 154, facilitating an efficient hardware pipeline structure where intermediate results can flow seamlessly from one stage to the next.

More specifically, the scalar core 154 may include a register file optimized to hold and operate on one-dimensional array data, thereby supporting the efficient processing of vector outputs received from the preceding vector core 153. Similar to the vector core, the scalar core 154 is configured as a floating-point arithmetic unit, allowing it to execute complex scalar-level operations such as function approximations, summation, or maximum value detection. However, designing the scalar core 154 to handle large M×N tensor inputs, as handled by the processing core 120, would result in increased silicon area and higher power consumption in the NPU 100. To avoid this, the scalar core 154 is deliberately architected to process data in a reduced scalar format, thus minimizing its physical footprint and lowering energy consumption. Furthermore, by enabling a pipelined dataflow with the vector core 153, the scalar core 154 contributes to reducing processing bottlenecks in neural network workloads. In alternative implementations, the scalar core 154 may be configured to receive L×1-sized tensor data, where L represents a power-of-two value selected within a defined range that is based on the value of M. For instance, if M is 64, the value of L may be set to 8, 16, 32, 64, 128, or 256. This flexibility allows the scalar core 154 to adapt to varying input sizes while maintaining compatibility with upstream data structures.

FIG. 7 illustrates energy consumption per unit operation of a neural processing unit applicable to examples of the present disclosure.

Hereinafter, the power consumption of the processing core 120, vector core 153, and scalar core 154 of the NPU 100 will be described with reference to FIG. 7, showing the energy consumed per unit operation of various arithmetic units of the NPU 100.

For example, the energy consumption may be explained by dividing it into addition operations and multiplication operations. However, the energy consumed per unit operation may vary depending on the foundry process technology of the semiconductor chip (e.g., 2 nm technology, 5 nm technology, 7 nm technology, 14 nm technology, 28 nm technology, etc.) or the technical capabilities of a specific foundry company.

The processing core 120 may be designed to operate on integer parameters of a specific bit width. In FIG. 7, the label "8b INT Add" refers to an 8-bit integer addition operation of the adder 1212 of the processing element 121. An 8-bit integer addition operation may consume 0.03 pJ of energy. The label "16b INT Add" refers to a 16-bit integer addition operation of the adder 1212 of the processing element 121. A 16-bit integer addition operation may consume 0.05 pJ of energy. The label "32b INT Add" refers to a 32-bit integer addition operation of the adder 1212 of the processing element 121. A 32-bit integer addition operation may consume 0.1 pJ of energy. The label "8b INT Mult" refers to an 8-bit integer multiplication operation of the multiplier 1211 of the processing element 121. An 8-bit integer multiplication operation may consume 0.2 pJ of energy. The label "32b INT Mult" refers to a 32-bit integer multiplication operation of the multiplier 1211 of the processing element 121. A 32-bit integer multiplication operation may consume 3.1 pJ of energy.

To elaborate, if the processing core 120 may comprise thousands to tens of thousands of processing elements designed as integer arithmetic units, the power consumption of the NPU 100 may be significantly reduced compared to the case where the processing core may comprise the same number of processing elements designed as floating-point arithmetic units. In general, for generative artificial intelligence models, since most of the operations are processed in the processing core 120, the design of the arithmetic unit with a specific integer bit width is important for the low-power design of the NPU 100.

The vector core 153 and the scalar core 154 of the special function unit 150 may be designed to operate on floating-point parameters. In FIG. 7, the label "16b FP Add" refers to a 16-bit floating-point addition operation of an adder in the special function unit 150. A 16-bit floating-point addition operation may consume 0.4 pJ of energy. The label "32b FP Add" refers to a 32-bit floating-point addition operation of an adder in the special function unit 150. A 32-bit floating-point addition operation may consume 0.9 pJ of energy. The label "16b FP Mult" refers to a 16-bit floating-point multiplication operation of a multiplier in the special function unit 150. A 16-bit floating-point multiplication operation may consume 1.1 pJ of energy. The label "32b FP Mult" refers to the 32-bit floating-point multiplication operation of the multiplier of the special function unit 150. The 32-bit floating-point multiplication operation may consume 3.7 pJ of energy. To elaborate, if the special function unit 150 is designed with floating-point arithmetic units, it is advantageous in terms of the power consumption of the neural processing unit 100 and the miniaturization of the semiconductor chip size to design the number of arithmetic units of the special function unit 150 to be relatively smaller than the number of processing elements 121 of the processing core 120. Therefore, the number of floating-point arithmetic units of the special function unit 150 may be designed to be smaller than the number of integer arithmetic units of the processing core 120.

According to an embodiment, the data pipeline circuit design of the processing core 120, the vector core 153, and the scalar core 154 may be implemented so that the array size of a specific dimension of the tensor data processed by the neural processing unit 100 is compatible with each other among the hardware components, thereby improving the operational efficiency of the neural processing unit 100.

Figure 8:
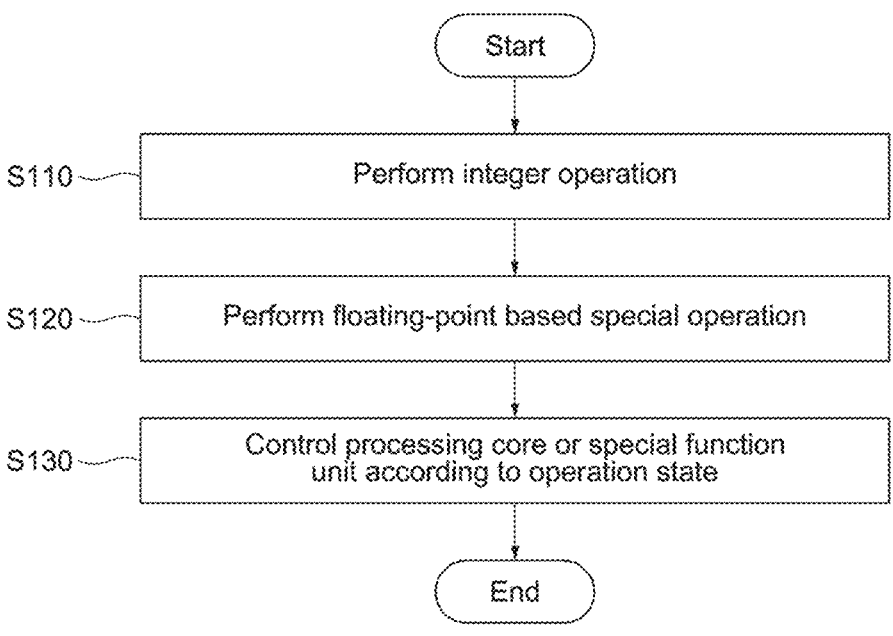
FIG. 8 is a flowchart illustrating a control method of a neural processing unit applicable to examples of the present disclosure.

FIG. 8 illustrates a control method of a neural processing unit (NPU) applicable to examples of the present disclosure. This control method outlines the sequential execution stages involving integer-based computations, floating-point special function processing, and coordinated control between hardware units.

Referring to FIG. 8, the NPU 100 initiates processing by performing integer-based operations on the input data through the processing core 120 in response to an input neural network operation request (step S110). The integer operations performed in this stage may include, for example, quantized vector-matrix multiplication (MatMul), vector accumulations, or activation functions that are implemented using integer arithmetic. These operations are typically applied to tensor data that has been quantized into formats such as INT8 or INT16 to reduce computational complexity and power consumption. The processing core 120, as shown in FIG. 3, includes a plurality of processing element (PE) units that are capable of executing these integer operations in parallel. By utilizing parallelism across the PE units and operating entirely within the integer domain, the step S110 achieves both high-speed computation and enhanced energy efficiency (low power), which are critical requirements for real-time artificial intelligence inference tasks.

Next, the NPU 100 transitions to performing floating-point based special operations on the results produced in the integer computation stage of the step S110 (step S120). These operations are executed by the special function unit 150, which is responsible for handling operations that are either too complex or not well-suited for integer arithmetic. For instance, the special function unit 150 may execute non-linear operations such as activation functions (e.g., ReLU, GELU, tanh), normalization procedures, softmax functions, or other mathematical transformations requiring higher numerical precision. The outputs from the processing core 120 are first converted into floating-point representations before being fed into these operations, allowing the special function unit 150 to maintain computational accuracy.

As illustrated in FIG. 3, the special function unit 150 comprises several sub-components, including the quantization unit 151, dequantization unit 152, vector core 153, and scalar core 154. The dequantization unit 152 plays a critical role in converting integer-form data into a floating-point format, such as FP16 or BFLOAT16, before further processing. Once dequantized, the data is directed to various modules for non-linear processing. The vector core 153, designed for high-throughput parallelism, is capable of performing complex operations such as softmax, normalization, and activation functions like ReLU and GELU, making it particularly effective for operations on multi-dimensional tensor data. In contrast, the scalar core 154 is optimized for fine-grained operations, including conditional branching, high-precision function approximation, and scalar-based calculations. This scalar core may incorporate an FSM (finite state machine)-based control circuit to manage more complex logic-driven operations. These floating-point processing capabilities complement the earlier integer-stage processing by providing the numerical accuracy required for segments of the neural network that are sensitive to approximation or rounding errors, thereby preserving the model's inference integrity.

Next, the controller 110, also depicted in FIG. 3, monitors the operation state of both the integer processing step S110 and the floating-point special processing step S120 and then provides dynamic control over the operation of the processing core 120 and the special function unit 150 (step S130). The controller 110 coordinates inter-module communication and may manage aspects such as clock control, execution order, and conditional logic based on runtime status flags. It can also analyze factors such as operation load, execution priority, or specific instruction conditions to determine whether to proceed with or bypass certain computations. For instance, if the input tensor consists entirely of zero values, the controller may opt to skip unnecessary computations and activate clock gating or power gating to conserve energy. Additionally, to mitigate pipeline bottlenecks or resource conflicts between modules, the controller may dynamically schedule instruction execution based on decoded command information, thus ensuring balanced workload distribution and efficient resource utilization.

As described, the control method of FIG. 8 is tightly integrated with the architecture and individual components of the NPU 100 of FIG. 3. This method enables synchronized operation across hardware modules while optimizing both performance and power consumption. By incorporating modular processing stages with adaptive control logic, the architecture not only accelerates neural network operations but also supports low-power inference, making it suitable for edge devices or for use in energy-constrained environments where computational efficiency is critical.

Each of FIGS. 9-16 illustrates a system on chip (1000) according to embodiments of a first example of the present disclosure. Each example and each embodiment of the present disclosure may be modified and implemented in combination with other examples and other embodiments of the present disclosure.

Figure 9:
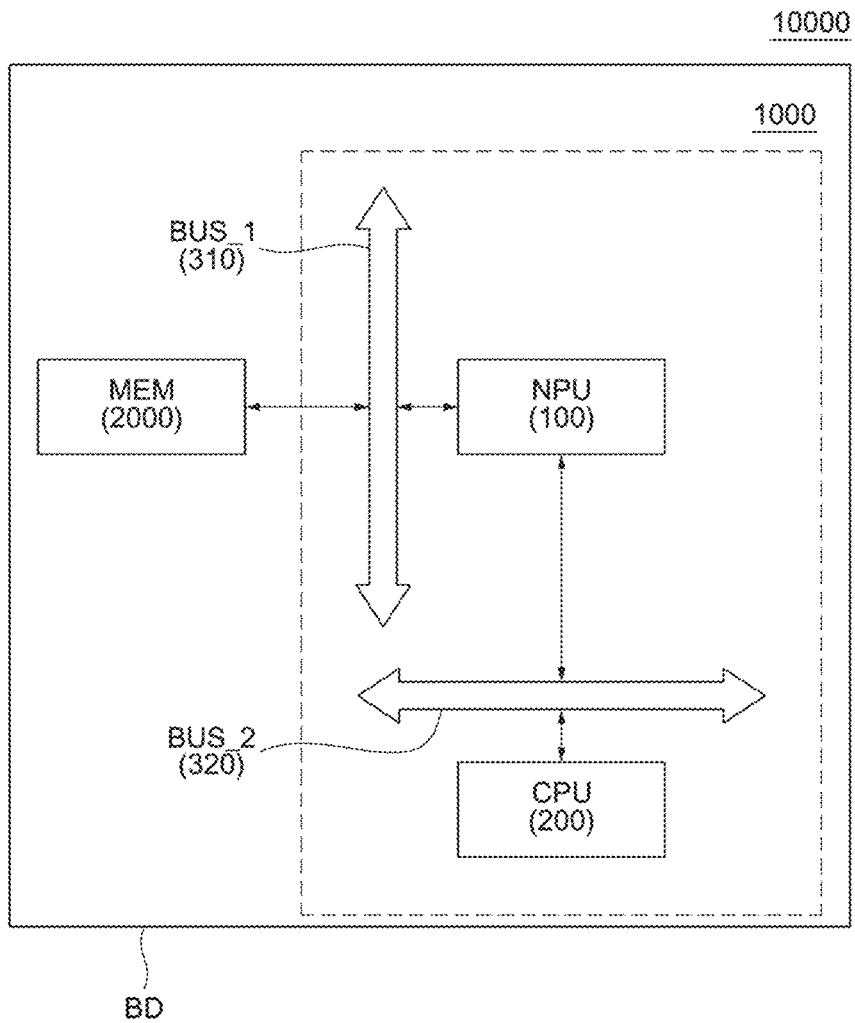
FIG. 9 is a block diagram illustrating a system on chip according to a first embodiment of a first example of the present disclosure.

FIG. 9 illustrates a system on chip according to a first embodiment of a first example of the present disclosure. In FIG. 9, a device 10000 according to the first embodiment of the first example of the present disclosure is illustrated.

Referring to FIG. 9, the device 10000 includes a circuit board BD, a memory (MEM) 2000, and a system on chip (SoC) 1000. The memory 2000 and the system on chip 1000 may be disposed on the circuit board BD. The system on chip 1000 is configured to include a neural processing unit (NPU) 100, a central processing unit (CPU) 200, a first bus (BUS_1) 310, and a second bus (BUS_2) 320. The memory 2000 is configured to be electrically connected to the first bus 310.

The system on chip 1000 may refer to a system manufactured on a single semiconductor substrate. The system on chip 1000 may be further configured to include a package (not shown) that protects the semiconductor substrate.

The NPU 100 may be configured to communicate with the memory 2000. A first bus 310 may be provided between the NPU 100 and the memory 2000. For example, the first bus 310 may be an advanced extensible interface (AXI) bus. However, examples of the present disclosure are not limited thereto. The first bus 310 may be configured to support read and write address/control interfaces of the memory 2000 and the NPU 100. The first bus 310 may be configured as an independent data communication channel to support high-speed data transmission through transaction processing other than memory control commands. The first bus 310 may be configured as a dedicated bus for transmitting input parameters, output parameters, and weight parameters of a neural network model, and it is desirable to appropriately design the bandwidth of the first bus 310 considering the parameter size of the neural network models to be processed.

The NPU 100 may be configured to communicate with the CPU 200. A second bus 320 may be provided between the NPU 100 and the CPU 200. For example, the second bus 320 may be an advanced high-performance bus (AHB). However, examples of the present disclosure are not limited thereto. The second bus 320 may be provided for efficient communication between the NPU 100, the CPU 200, and peripheral devices of the system on chip 1000. The second bus 320 may provide a master-slave architecture to improve data throughput. The second bus 320 may be configured to support burst transmission and pipeline operation tasks of the system on chip 1000. The second bus 320 may be configured to provide an on-the-fly function. The second bus 320 may be configured such that while the CPU 200 or the NPU 100 is reading or writing data in real time, a master of the second bus 320 can execute a new command on-the-fly without waiting. Therefore, real-time data processing of the NPU 100 can be optimized, and at least one core of the NPU 100 can be configured to independently use the bus. Therefore, the second bus 320 can support the system on chip 1000 to perform various commands in real time.

To elaborate, the first bus 310 provides a higher memory bandwidth than the second bus 320, and the second bus 320 provides an on-the-fly function, allowing the CPU 200 to dynamically control the neural processing unit 100. Accordingly, the system on chip 1000 can dynamically process various input queries for a generative neural network model.

A description of the NPU 100 is provided in reference to FIGS. 3 to 7. Accordingly, redundant description of the NPU 100 is omitted for convenience of explanation.

The CPU 200 may be configured to control the NPU 100 based on execution code of an artificial intelligence model. The execution code may be generated by a compiler (not shown). The CPU 200 may control the NPU 100 by directly setting register values of each circuit of the NPU 100 based on the execution code. Here, each register value may be included in the execution code. In addition, the CPU 200 may off-load and process operations that are not processed by the NPU 100. In this case, the neural network model may be compiled to off-load specific operations of the neural network model to the CPU 200, and execution code may be obtained.

The memory 2000 may include a main memory located outside the system on chip 1000, but is not limited thereto. The memory 2000 may be electrically connected to the system on chip 1000 through the first bus 310. The memory 2000 of the device 10000 according to the first embodiment of the first example of the present disclosure may include at least one memory among memories such as SRAM, LPDDR RAM, resistive RAM, magneto-resistive RAM, phase-change RAM, ferroelectric RAM, flash memory, HBM, and the like. The memory 2000 may be composed of at least one memory unit (e.g., a memory bank). The memory 2000 may be composed of a single (homogeneous) memory or heterogeneous memories. The capacity of the memory 2000 is preferably provided to be larger than the total size of the weight parameters of the neural network model. In this case, all of the weight parameters of the neural network model can be loaded into the memory 2000 at once and reside there. If the storage capacity of the memory 2000 is insufficient, only some of the weight parameters can be loaded, making it difficult to quickly process inference operations of the neural network model in real time. For example, the capacity of the memory 2000 may be one of 4 GBytes and 8 GBytes. That is, the capacity of the memory 2000 may be 4 GBytes to 8

GBytes, and may be determined considering the parameter size of the neural network model to be driven in the system on chip 1000.

That is, the main memory 2000 may be provided as a dedicated memory for the NPU 100 and may be configured to sufficiently store all essential data, including all learned weights of the neural network model, as well as key activation values generated during the inference operation process and used for the next operation, and to access them at high speed. Whereas conventionally, in the case of large-scale models, some of the weights or activation values had to rely on external slow memory or servers, the present disclosure minimizes data movement bottlenecks and eliminates external dependencies by having all operational data reside within the on-device main memory. This lays the foundation for completing the entire inference process of a neural network model on the device itself without data exchange with an external server (server-independent operation), which provides significant advantages in terms of real-time responsiveness and data privacy. Consequently, the memory structure supports the NPU 100 to stably process operations without delay even for complex models, thereby realizing a true on-device AI environment.

The bandwidth of the first bus 310 may be determined according to the processing performance (e.g., TOPS) of the NPU 100, that is, tera operations per second of the neural processing unit. For example, a memory 2000 bandwidth of 2 GB/s to 4 GB/s per 1 TOPS may be required. For example, a 10 TOPS neural processing unit (NPU 100) may be configured with a memory 2000 to provide a bus bandwidth of 20 GB/s to 40 GB/s. The bandwidth of the first bus 310 may be determined according to the operating frequency of the memory 2000 and the number of communication channels. For example, to configure a memory bandwidth of 40 GB/s with LPDDR5, the following equation can be used:

$$\text{Memory Bandwidth (GB/s)} = (\text{Data Rate (Gbps per pin)} \times \text{Bus Width (bits)} \times \text{Number of Channels} \div 8).$$

To elaborate, LPDDR5 generally supports a data rate of up to 6400 Mbps per pin. The bus width of an LPDDR channel is generally 16 bits (2 bytes). However, the number of channels cannot be a decimal and is an integer. However, examples of the present disclosure are not limited to the bandwidth of the first bus 310.

The device 10000 according to the first embodiment of the first example of the present disclosure may be configured to provide a low-power function for use on-device.

The low-power mode of the device 10000 according to the first embodiment of the first example of the present disclosure may be provided with, for example, a sleep mode, a deep sleep mode, a retention mode, etc. In some examples, the low-power mode may be referred to as a standby mode, a hibernation mode, an idle mode, etc.

The sleep mode may be implemented, for example, by applying clock gating to at least one of the processing core 120, the vector core 153, and the scalar core 154 of the NPU 100.

The deep sleep mode may be implemented, for example, by applying power gating to at least one of the processing core 120, the vector core 153, the scalar core 154 of the NPU 100, or the memory 2000.

The retention mode may be implemented by supplying a minimum retention voltage to the controller 110 of the NPU 100 or the memory 2000.

For example, the NPU 100 of the device 10000 according to the first embodiment of the first example of the present disclosure may be configured to provide at least one of a power gating function, a clock gating function, and a register retention function. To elaborate, when the device 10000 enters sleep mode, the NPU 100 can activate the clock gating function. To elaborate, when the device 10000 enters deep sleep mode, the NPU 100 can activate the power gating function. To elaborate, when the device 10000 enters retention mode, the supply voltage input to the NPU 100 may be reduced or the operating frequency may be reduced.

For example, the memory MEM of the device 10000 according to the first embodiment of the first example of the present disclosure may provide at least one of a deep sleep function, a retention function, and a maintain parameters function. To elaborate, when the device 10000 enters deep sleep mode, the memory 2000 may be power-gated, and in the case of a volatile memory device, data may be lost. To elaborate, when the device 10000 enters retention mode, the supply voltage input to the memory 2000 may be reduced or the operating frequency may be reduced, and in the case of a volatile memory device, data may be maintained. To elaborate, when the device 10000 enters maintain parameters mode, the supply voltage input to the memory 2000 may be reduced or the operating frequency may be reduced, and in the case of DRAM, the refresh period of the memory cells is increased, so data may be maintained in the case of a volatile memory device.

The low-power mode may be activated when an input query for speculative decoding is not input to the device 10000 for a certain period of time or more. The certain period of time may be provided based on, for example, a timer, a counter value, etc. The low-power mode may be activated based on a specific threshold time, and may be deactivated when an input query processed by speculative decoding is input to the device 10000. The state in which the low-power mode is deactivated may be referred to as a wake-up state.

The device 10000 according to the first embodiment of the first example of the present disclosure may be a device operable in a battery environment. Therefore, the NPU 100 may be designed to be operable with battery voltage.

The device 10000 according to the first embodiment of the first example of the present disclosure may be configured to provide at least one low-power mode and simultaneously provide speculative decoding in an on-device environment. The device 10000 can enter a low-power mode based on a pre-set condition, and accordingly, the power consumption of the device 10000 may be reduced.

The system on chip 1000 according to the first embodiment of the first example of the present disclosure has the effect of being able to quickly accelerate the inference operation of a generative neural network model with low power due to the pipeline circuit structure of the processing core 120, the vector core 153, and the scalar core 154.

Figure 10:
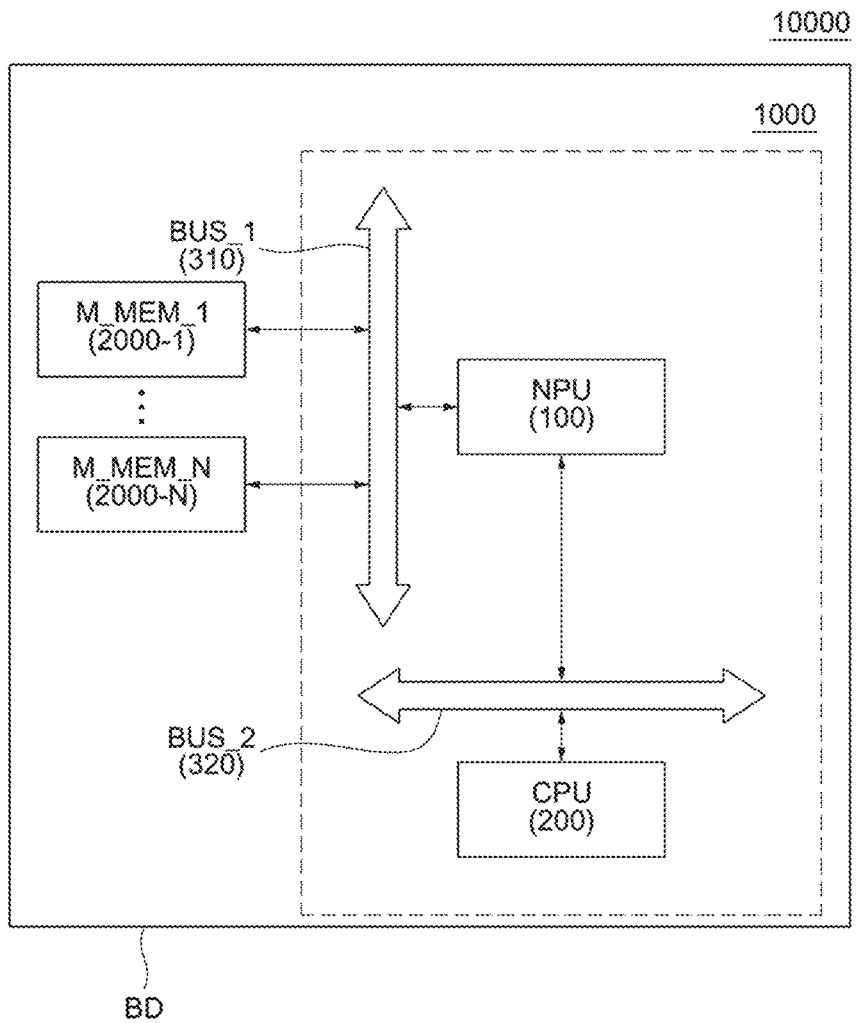
FIG. 10 is a block diagram illustrating a system on chip according to a second embodiment of a first example of the present disclosure.

FIG. 10 illustrates a system on chip according to a second embodiment of the first example of the present disclosure. In FIG. 10, a device 10000 according to the second embodiment of the first example of the present disclosure is illustrated.

Referring to FIG. 10, the device 10000 includes a circuit board (BD), a plurality of main memories (M_MEM_1, . . . , M_MEM_N) (2000-1, . . . , 2000-N), and a system on chip 1000. In describing the device 10000 according to the second embodiment of the first example of the present disclosure, overlapping content with the description with reference to FIG. 3 to FIG. 9 are omitted for convenience of explanation. Each example and each embodiment of the present disclosure may be modified and implemented in combination with other examples and other embodiments of the present disclosure.

The system on chip 1000 may refer to a system manufactured on a single semiconductor substrate. The system on chip 1000 may be further configured to include a package (not shown) that protects the semiconductor substrate.

The system on chip 1000 according to the second embodiment of the first example of the present disclosure is configured to include a neural processing unit (NPU) 100, a central processing unit (CPU) 200, a first bus 310, and a second bus 320. The plurality of main memories 2000-1, . . . , 2000-N are configured to be electrically connected to the first bus 310. The plurality of main memories 2000-1, . . . , 2000-N are configured to include a plurality of semiconductor chips.

A first bus 310 may be provided between the neural processing unit 100 and the plurality of main memories 2000-1, . . . , 2000-N. A second bus 320 may be provided between the NPU 100 and the CPU 200.

Since the operation of the NPU 100 has been described above with reference to FIG. 3 to FIG. 9, a detailed description of its operation is omitted. Since the operation of the CPU 200 has been described above with reference to FIG. 9, a detailed description of its operation is omitted.

The plurality of main memories 2000-1, . . . , 2000-N may include a plurality of memories disposed outside the system on chip 1000. However, the present disclosure is not limited thereto. The plurality of main memories 2000-1, . . . , 2000-N may be electrically connected to the system on chip 1000 through the first bus 310, respectively. Each of the plurality of main memories 2000-1, . . . , 2000-N of the device 10000 according to the second embodiment of the first example of the present disclosure may include SRAM, LPDDR RAM, resistive RAM, magneto-resistive RAM, phase-change RAM, ferroelectric RAM, flash memory, or HBM. The plurality of main memories 2000-1, . . . , 2000-N may include a single (homogeneous) memory or a heterogeneous memory.

It is desirable that the total capacity of the plurality of main memories 2000-1, . . . , 2000-N be provided to be larger than the total capacity occupied by the weight parameters of the artificial intelligence model. In this case, the weight parameters of the neural network model may be loaded onto the plurality of main memories 2000-1, . . . , 2000-N at once and reside there. If the storage capacity of the plurality of main memories 2000-1, . . . , 2000-N is insufficient, it may be difficult to process the inference operation of the neural network model quickly in real time. For example, the total capacity of the plurality of main memories 2000-1, . . . , 2000-N may be one of 8 GByte, 16 GByte, 32 GByte, 64 GByte, and 128 GByte. That is, the total capacity of the plurality of main memories 2000-1, . . . , 2000-N may be from 8 GByte to 128 GByte, and may be determined considering the parameter size of at least one artificial intelligence model to be driven on the system on chip 1000. Therefore, the device 10000 can reduce the manufacturing cost of the system on chip 1000 while easily increasing the capacity of the main memory by locating a plurality of main memories for loading and storing the parameters of the artificial intelligence model outside the system on chip 1000. If a plurality of main memories are placed inside the package protecting the system on chip 1000, the size of the package may increase, thereby increasing the manufacturing cost, but it can satisfy the standard of a specific form factor (e.g., M.2 2230, M.2 2242).

The bandwidth of the first bus 310 may be determined according to the processing performance (e.g., TOPS) of the NPU 100, that is, tera operations per second of the neural processing unit. For example, for a 30 TOPS neural processing unit (NPU 100), the plurality of main memories 2000-1, . . . , 2000-N may be configured to provide a bus bandwidth of 60 GB/s to 120 GB/s. The bandwidth of the first bus 310 may be determined by the operating frequency of the plurality of main memories 2000-1, . . . , 2000-N and the number of communication channels. However, examples of the present disclosure are not limited to the bandwidth of the first bus 310.

The device 10000 according to the second embodiment of the first example of the present disclosure provides a plurality of main memories 2000-1, . . . , 2000-N, and the total capacity of the main memories may be a capacity that can store all the parameters of at least one neural network model at once. In addition, according to the configuration of the second embodiment of the first example, the memory capacity may be expanded to correspond to the size of a generative neural network model with a significant size of weight parameters. Therefore, the system on chip 1000 can process the neural network model quickly in real time. To elaborate, the plurality of main memories 2000-1, . . . , 2000-N of the device 10000 according to embodiments of the present disclosure are configured as dedicated memories for the system on chip 1000. If all the parameters of the artificial intelligence model processed by the NPU 100 are not stored in the plurality of main memories 2000-1, . . . , 2000-N, especially if all the weight parameters and attention scores cannot be stored in the plurality of main memories 2000-1, . . . , 2000-N, these parameters must be stored in a separate storage device, which causes a decrease in operation speed due to large-scale memory operations.

Figure 11:
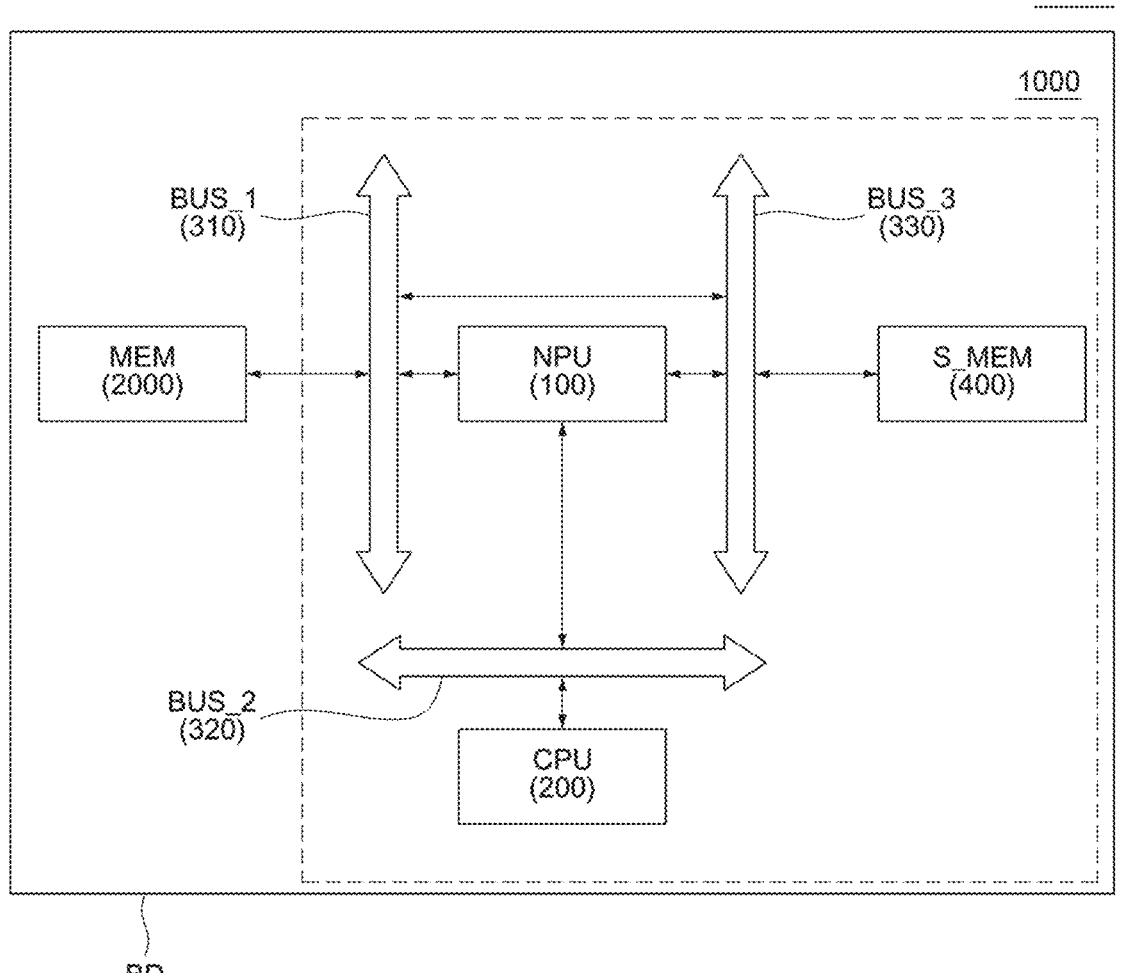
FIG. 11 is a block diagram illustrating a system on chip according to a third embodiment of a first example of the present disclosure.

FIG. 11 illustrates a system on chip according to a third embodiment of the first example of the present disclosure. In FIG. 11, a device 10000 according to the third embodiment of the first example of the present disclosure is illustrated.

Referring to FIG. 11, the device 10000 includes a circuit board (BD), a main memory 2000, and a system on chip 1000. In describing the system on chip 1000 according to the third embodiment of the first example of the present disclosure, overlapping descriptions among the descriptions with reference to FIG. 3 to FIG. 10 may be omitted for convenience of explanation. Each example and each embodiment of the present disclosure may be modified and implemented in combination with other examples and other embodiments of the present disclosure.

The system on chip 1000 may refer to a system manufactured on a single semiconductor substrate. The system on chip 1000 may be further configured to include a package (not shown) that protects the semiconductor substrate.

The system on chip 1000 according to the third embodiment of the first example of the present disclosure is configured to include a neural processing unit 100, a central processing unit 200, a first bus 310, a second bus 320, a third bus 330, and a shared memory (S_MEM) 400. The shared memory 400 is configured as an on-chip memory of the system on chip 1000. The main memory 2000 is configured to be electrically connected to the first bus 310. The main memory 2000 is configured to include at least one semiconductor chip. The shared memory 400 is configured to be electrically connected to the third bus 330.

A first bus 310 may be located between the neural processing unit 100 and the main memory 2000. A second bus 320 may be located between the neural processing unit 100 and the central processing unit 200. A third bus 330 may be located between the neural processing unit 100 and the shared memory 400. For example, the third bus 330 may be an AXI (Advanced Extensible Interface) bus. However, examples of the present disclosure are not limited thereto. The third bus 330 may be configured to support the read and write address/control interface of the shared memory 400 and the neural processing unit 100. The third bus 330 may be configured as an independent data communication channel to support high-speed data transmission through transaction processing other than memory control commands. The third bus 330 may be configured as a dedicated bus for transmitting input parameters, output parameters, and weight parameters of a neural network model. Here, the first bus 310 and the third bus 330 are configured to be electrically connected. Accordingly, the shared memory 400 and the main memory 2000 can transmit tensor data through the first bus 310 and the third bus 330.

Since the operation of the NPU 100 has been described above with reference to FIG. 3 to FIG. 10, its detailed description is omitted. Since the operation of the CPU 200 has been described above with reference to FIG. 9 to FIG. 10, its detailed description is omitted.

The main memory 2000 may include at least one memory disposed outside the system on chip 1000. The main memory 2000 may include a single (homogeneous) memory or a heterogeneous memory. The capacity of the main memory 2000 may be determined considering the parameter size of at least one neural network model to be driven on the system on chip 1000. The bandwidth of the first bus 310 may be determined based on the processing performance of the NPU 100.

The shared memory 400 may include at least one memory disposed inside the system on chip 1000. The shared memory 400 of the system on chip 1000 according to the third embodiment of the first example of the present disclosure may include at least one memory such as SRAM, LPDDR RAM, resistive RAM, magneto-resistive RAM, phase-change RAM, ferroelectric RAM, flash memory, HBM, etc. The shared memory 400 may include a single (homogeneous) memory or a heterogeneous memory. As a representative embodiment, the shared memory 400 may be implemented with SRAM. The capacity of the shared memory 400 is designed to be smaller than the capacity of the main memory 2000. If the capacity of the shared memory 400 increases, the semiconductor manufacturing cost may increase rapidly. Therefore, the capacity of the shared memory 400 may be configured from 4 MBytes to 128 MBytes. Preferably, the capacity of the shared memory 400 may be configured from 16 MBytes to 64 MBytes. The capacity of the shared memory 400 may be larger than the capacity of the internal memory 140 of the NPU 100.

The operation of the shared memory 400 and the main memory 2000 of FIG. 9 will be described with reference to FIG. 7. The label "32b S_MEM Read" in FIG. 7 refers to a 32-bit data read operation of the main memory 2000 of FIG. 11. Here, the main memory 2000 may be LPDDR RAM. In this case, a 32-bit data read operation of the main memory 2000 may consume 640 pJ of energy. The label "32b S_MEM Read" in FIG. 7 refers to a 32-bit data read operation of the shared memory 400 of FIG. 11. Here, the shared memory 400 may be SRAM. In this case, the 32-bit data read operation of the shared memory 400 may consume 5 pJ of energy. That is, when the NPU 100 uses the shared memory 400 implemented with SRAM, the energy consumption of the device 10000 may be significantly reduced compared to the case of using only the main memory 2000. However, since the manufacturing cost of the shared memory 400 is high, it is difficult to implement it with a large capacity. Therefore, when the compiler (not shown) generates execution code, it can set a data placement strategy so that parameters with a high frequency of reuse are preferentially allocated to the high-speed shared memory 400. That is, the compiler (not shown) can determine reusable parameters during a series of neural network model operations and provide a function to store them in the shared memory 400 for reuse.

The system on chip 1000 according to the third embodiment of the first example of the present disclosure provides a shared memory 400 and executes execution code set to store reusable parameters in the shared memory 400, thereby reducing the power consumption of the system on chip 1000.

Figure 12:
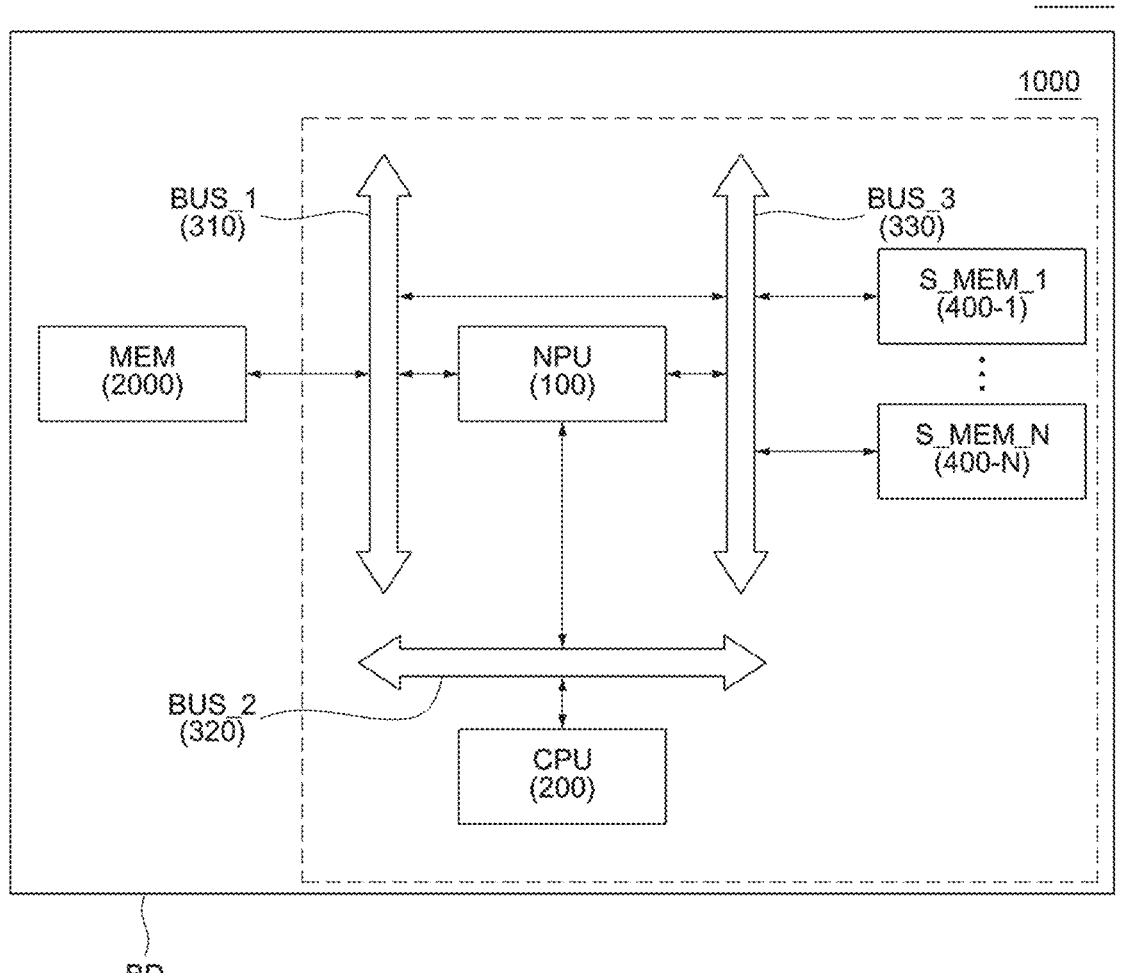
FIG. 12 is a block diagram illustrating a system on chip according to a fourth embodiment of a first example of the present disclosure.

FIG. 12 illustrates a system on chip according to a fourth embodiment of the first example of the present disclosure. In FIG. 12, a device 10000 according to the fourth embodiment of the first example of the present disclosure is illustrated.

Referring to FIG. 12, the device 10000 includes a circuit board (BD), a main memory 2000, and a system on chip 1000. In describing the system on chip 1000 according to the fourth embodiment of the first example of the present disclosure, overlapping descriptions from FIG. 3 to FIG. 11 are omitted for convenience of explanation. Each example and each embodiment of the present disclosure may be modified and implemented in combination with other examples and other embodiments of the present disclosure.

The system on chip 1000 may refer to a system manufactured on a single semiconductor substrate. The system on chip 1000 may be further configured to include a package (not shown) that protects the semiconductor substrate.

The system on chip 1000 according to the fourth embodiment of the first example of the present disclosure is configured to include a neural processing unit (NPU) 100, a central processing unit (CPU) 200, a first bus 310, a second bus 320, a third bus 330, and a plurality of shared memories 400-1, . . . , 400-N. The plurality of shared memories 400-1, . . . , 400-N are configured as on-chip memories of the system on chip 1000. The main memory 2000 is configured to be electrically connected to the first bus 310. The main memory 2000 is configured to include at least one semiconductor chip. The plurality of shared memories 400-1, . . . , 400-N are configured to be electrically connected to the third bus 330.

A first bus 310 may be located between the NPU 100 and the main memory 2000. A second bus 320 may be located between the NPU 100 and the CPU 200. A third bus 330 may be located between the NPU 100 and the plurality of shared memories 400-1, . . . , 400-N. Here, the first bus 310 and the third bus 330 are configured to be electrically connected.

Since the operation of the NPU 100 has been described with reference to FIGS. 3 to 11, redundant description of the operation of the NPU 100 is omitted. Since the operation of the central processing unit 200 has been described with reference to FIGS. 9 to 11, redundant description of the CPU 200 is omitted.

The main memory 2000 may include at least one memory disposed outside the system on chip 1000. The main memory 2000 may include a single (homogeneous) memory or a heterogeneous memory. The capacity of the main memory 2000 may be determined considering the parameter size of at least one neural network model to be driven on the system on chip 1000. The bandwidth of the first bus 310 may be determined according to the processing performance of the neural processing unit 100.

The plurality of shared memories 400-1, . . . , 400-N may include a plurality of memories disposed inside the system on chip 1000. Each shared memory may be configured to operate independently of each other. The plurality of shared memories 400-1, . . . , 400-N of the system on chip 1000 according to the fourth embodiment of the first example of the present disclosure may include at least one memory such as SRAM, LPDDR RAM, resistive RAM, magneto-resistive RAM, phase-change RAM, ferroelectric RAM, flash memory, HBM, etc. The plurality of shared memories 400-1, . . . , 400-N may include a single (homogeneous) memory or a heterogeneous memory. Here, an example where the plurality of shared memories 400-1, . . . , 400-N are implemented with SRAM will be described. The capacity of the plurality of shared memories 400-1, . . . , 400-N is designed to be smaller than the capacity of the main memory 2000. If the capacity of the plurality of shared memories 400-1, . . . , 400-N increases, the semiconductor manufacturing cost may increase rapidly. Therefore, the total capacity of the plurality of shared memories 400-1, . . . , 400-N may be configured from 4 MBytes to 128 MBytes. Preferably, the total capacity of the plurality of shared memories 400-1, . . . , 400-N may be configured from 16 MBytes to 64 MBytes. The capacity of the plurality of shared memories 400-1, . . . , 400-N may be configured to be larger than the capacity of the internal memory 140 of the NPU 100.

When the NPU 100 uses the plurality of shared memories 400-1, . . . , 400-N implemented with SRAM, the energy consumption of the device 10000 may be significantly reduced compared to the case of using only the main memory 2000. Therefore, when the compiler (not shown) generates the execution code of the neural network model to be processed by the system on chip 1000, it can set a data reuse command to preferentially store reusable input parameters, output parameters, and weight parameters in the plurality of shared memories 400-1, . . . , 400-N located inside the system on chip 1000 rather than the main memory 2000.

The system on chip 1000 according to the fourth embodiment of the first example of the present disclosure provides a plurality of shared memories 400-1, . . . , 400-N and executes execution code set to preferentially store reusable parameters in the plurality of shared memories 400-1, . . . , 400-N, thereby reducing the power consumption of the system on chip 1000. In addition, by providing a plurality of independent shared memories for their respective domains (e.g., weight domain, attention score domain, etc.), the memory operations of each domain of the neural network model's parameters (e.g., weights, input parameters, output parameters) may be easily processed.

Figure 13:
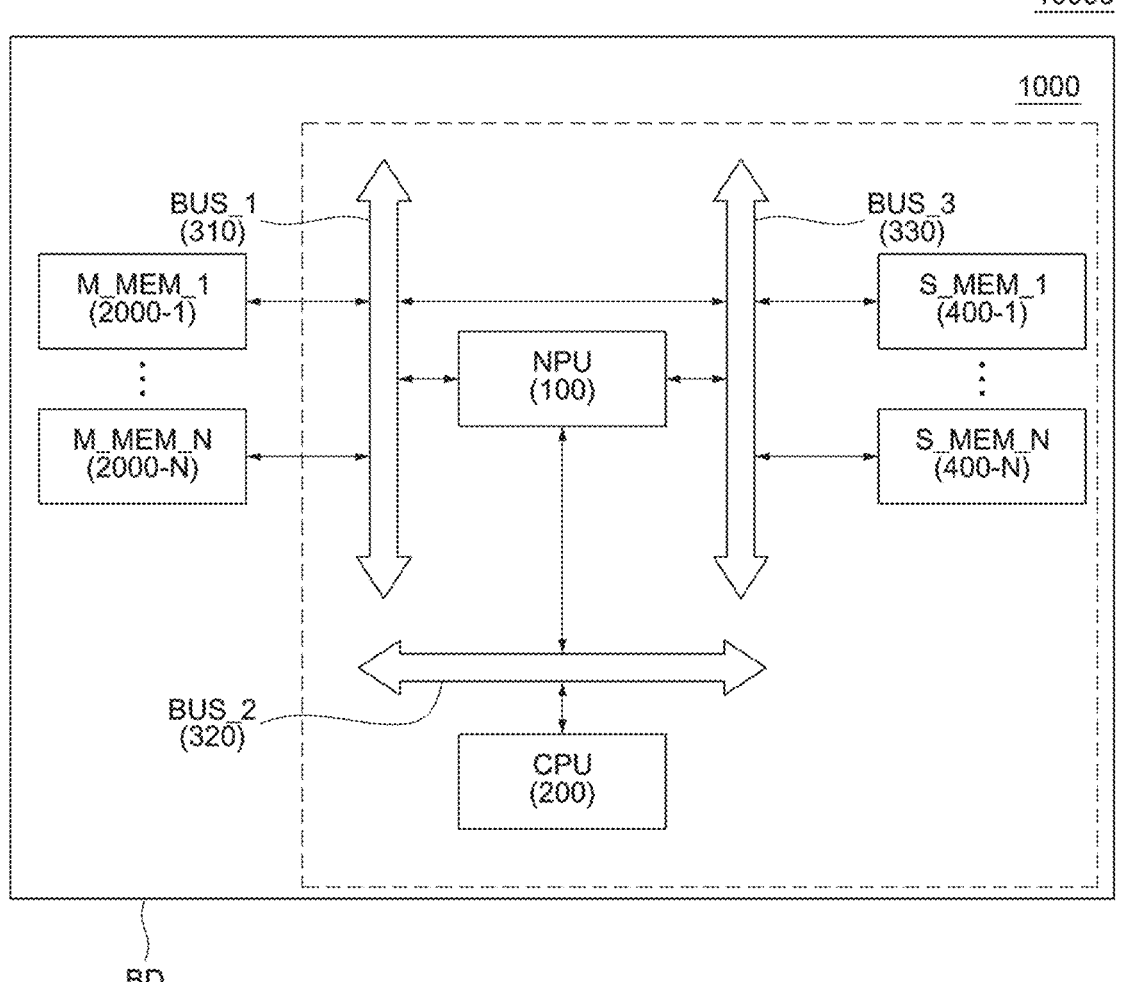
FIG. 13 is a block diagram illustrating a system on chip according to a fifth embodiment of a first example of the present disclosure.

FIG. 13 illustrates a system on chip according to a fifth embodiment of the first example of the present disclosure. In FIG. 13, a device 10000 according to the fifth embodiment of the first example of the present disclosure is illustrated.

Referring to FIG. 13, the device 10000 may include a circuit board (BD), a plurality of main memories 2000-1, . . . , 2000-N, and a system on chip 1000. In describing the system on chip 1000 according to the fifth embodiment of the first example of the present disclosure, overlapping descriptions from FIG. 3 to FIG. 12 are omitted for convenience of explanation. Each example and each embodiment of the present disclosure may be modified and implemented in combination with other examples and other embodiments of the present disclosure.

The system on chip 1000 may refer to a system manufactured on a single semiconductor substrate. The system on chip 1000 may be further configured to include a package (not shown) that protects the semiconductor substrate.

The system on chip 1000 according to the fifth embodiment of the first example of the present disclosure is configured to include a neural processing unit (NPU) 100, a central processing unit (CPU) 200, a first bus 310, a second bus 320, a third bus 330, and a plurality of shared memories 400-1, . . . , 400-N. The plurality of shared memories 400-1, . . . , 400-N are configured as on-chip memories of the system on chip 1000. The plurality of main memories 2000-1, . . . , 2000-N are configured to be electrically connected to the first bus 310. The plurality of main memories 2000-1, . . . , 2000-N are configured to include at least one semiconductor chip. The plurality of shared memories 400-1, . . . , 400-N are configured to be electrically connected to the third bus 330.

A first bus 310 may be provided between the NPU 100 and the plurality of main memories 2000-1, . . . , 2000-N. A second bus 320 may be provided between the NPU 100 and the CPU 200. A third bus 330 may be provided between the NPU 100 and the plurality of shared memories 400-1, . . . , 400-N. Here, the first bus 310 and the third bus 330 are configured to be electrically connected.

Since the operation of the NPU 100 has been described with reference to FIGS. 3 to 12, redundant description of its operation is omitted. Since the operation of the CPU 200 has been described with reference to FIGS. 9 to 12, redundant description of its operation is omitted. The plurality of main memories 2000-1, . . . , 2000-N are described with reference to FIG. 10, such that their redundant description is omitted. The plurality of shared memories 400-1, . . . , 400-N are described with reference to FIG. 12, such that their redundant description is omitted.

The plurality of main memories 2000-1, . . . , 2000-N may include a plurality of memories disposed outside the system on chip 1000. The total capacity of the plurality of main memories 2000-1, . . . , 2000-N may be determined considering the parameter size of at least one neural network model to be driven on the system on chip 1000. The total capacity of the plurality of main memories 2000-1, . . . , 2000-N may be configured to be larger than the total capacity of the plurality of shared memories 400-1, . . . , 400-N. Therefore, by providing a plurality of main memories outside the system on chip 1000, the manufacturing cost of the system on chip 1000 can be reduced.

The plurality of shared memories 400-1, . . . , 400-N may include a plurality of memories disposed inside the system on chip 1000. The total capacity of the plurality of shared memories 400-1, . . . , 400-N may be configured to be larger than the capacity of the internal memory 140 of the NPU 100. Therefore, by placing reusable parameters in the plurality of shared memories 400-1, . . . , 400-N, the data read from or transmitted to the plurality of main memories 2000-1, . . . , 2000-N may be reduced, thereby reducing the power consumption of the device 10000.

The compiler (not shown) may be set to preferentially store reusable input parameters, output parameters, and weight parameters in the plurality of shared memories 400-1, . . . , 400-N rather than the plurality of main memories 2000-1, . . . , 2000-N when generating the execution code of the neural network model to be processed by the system on chip 1000.

The device 10000 according to the fifth embodiment of the first example of the present disclosure, by combining the features of the second embodiment of the first example and the fourth embodiment of the first example of the present disclosure, can support a generative neural network model with a large number of parameters and improve data reuse with an expandable main memory and an expandable shared memory.

Figure 14:
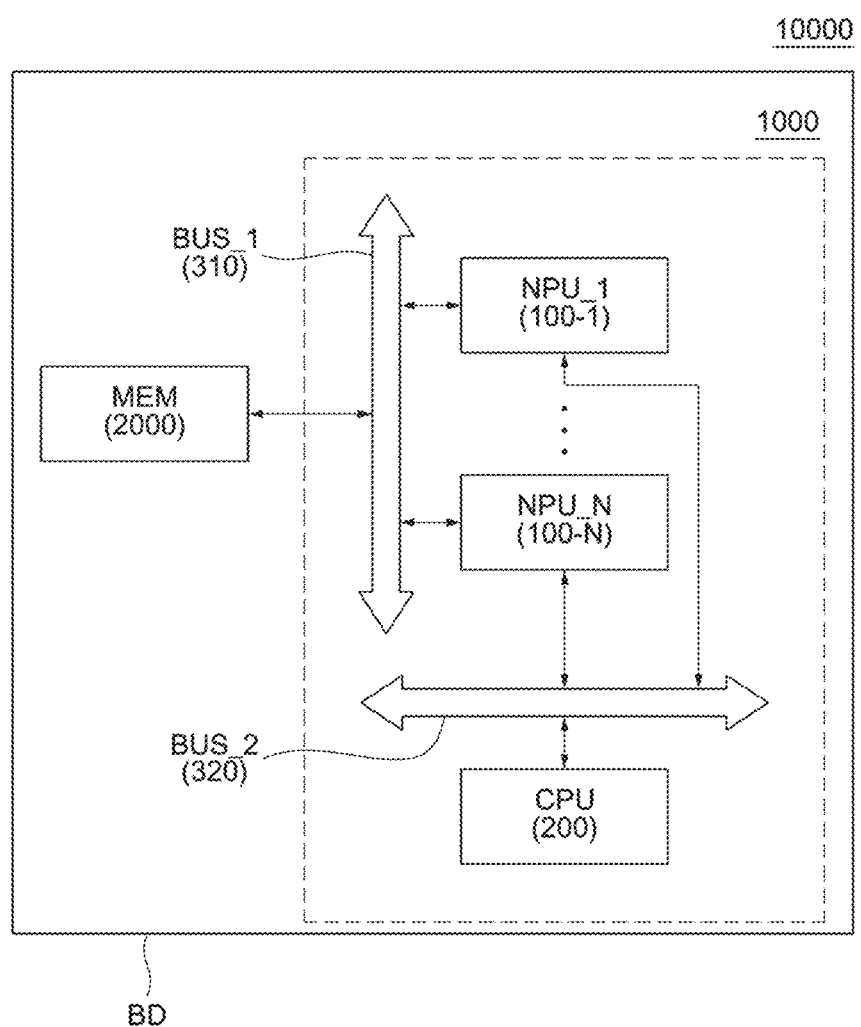
FIG. 14 is a block diagram illustrating a system on chip according to a sixth embodiment of a first example of the present disclosure.

FIG. 14 illustrates a system on chip according to a sixth embodiment of the first example of the present disclosure. In FIG. 14, a device 10000 according to the sixth embodiment of the first example of the present disclosure is illustrated.

Referring to FIG. 14, the device 10000 may include a circuit board (BD), a memory 2000, and a system on chip 1000. In describing the system on chip 1000 according to the sixth embodiment of the first example of the present disclosure, overlapping descriptions from FIG. 3 to FIG. 13 are omitted for convenience of explanation. Each example and each embodiment of the present disclosure may be modified and implemented in combination with other examples and other embodiments of the present disclosure.

The system on chip 1000 may refer to a system manufactured on a single semiconductor substrate. The system on chip 1000 may be further configured to include a package (not shown) that protects the semiconductor substrate.

The system on chip 1000 according to the sixth embodiment of the first example of the present disclosure is configured to include a plurality of neural processing units (NPU_1, . . . , NPU_N) 100-1, . . . , 100-N, a central processing unit (CPU) 200, a first bus 310, and a second bus 320. The memory 2000 is configured to be electrically connected to the first bus 310.

Each of the plurality of NPUs 100-1, . . . , 100-N may be configured to communicate with the memory 2000. A first bus 310 may be provided between the plurality of neural processing units 100-1, . . . , 100-N and the memory 2000.

Each of the plurality of NPUs 100-1, . . . , 100-N may be configured to communicate with the CPU 200. A second bus 320 may be provided between the plurality of NPUs 100-1, . . . , 100-N and the CPU 200.

The plurality of NPUs 100-1, . . . , 100-N are described with reference to FIGS. 3 to 13, such that their redundant description is omitted.

The processing performance (TOPS) of each of the plurality of NPUs 100-1, . . . , 100-N may be the same or different from each other. Each of the plurality of NPUs 100-1, . . . , 100-N may be configured to operate independently. Each of the plurality of NPUs 100-1, . . . , 100-N may be configured to process the operations of a specific neural network model in parallel.

The CPU 200 is described with reference to FIGS. 9 to 13, such that its redundant description is omitted.

The CPU 200 may be configured to control each of the plurality of NPUs 100-1, . . . , 100-N based on the execution code of the neural network model. Here, the compiler (not shown) may be configured to generate respective execution codes corresponding to each of the plurality of NPUs 100-1, . . . , 100-N. The CPU 200 may be configured to control the plurality of NPUs 100-1, . . . , 100-N by directly setting the register values of the circuits of each of the plurality of NPUs 100-1, . . . , 100-N based on the respective execution codes.

The memory 2000 may be configured as a main memory disposed outside the system on chip 1000. The memory 2000 may include a single (homogeneous) memory or a heterogeneous memory. The capacity of the memory 2000 may be determined considering the parameter size of at least one neural network model to be driven on the system on chip 1000. The bandwidth of the first bus 310 may be determined according to the processing performance of the plurality of NPUs 100-1, . . . , 100-N.

The bandwidth of the first bus 310 may be determined according to the processing performance (e.g., TOPS) of the plurality of NPUs 100-1, . . . , 100-N, that is, tera operations per second of the neural processing units. For example, a memory 2000 bandwidth of 2 GB/s to 4 GB/s per 1 TOPS may be required. For example, if there are two 10 TOPS neural processing units (NPUs 100), the memory 2000 may be configured to provide a bus bandwidth of 40 GB/s to 80 GB/s. The bandwidth of the first bus 310 may be determined by the operating frequency of the memory 2000 and the number of communication channels.

The system on chip 1000 according to the sixth embodiment of the first example of the present disclosure, by providing a plurality of NPUs 100-1, . . . , 100-N, has the effect of improving the parallel processing performance of the neural network model, thereby being able to generate a response to an input query faster.

Figure 15:
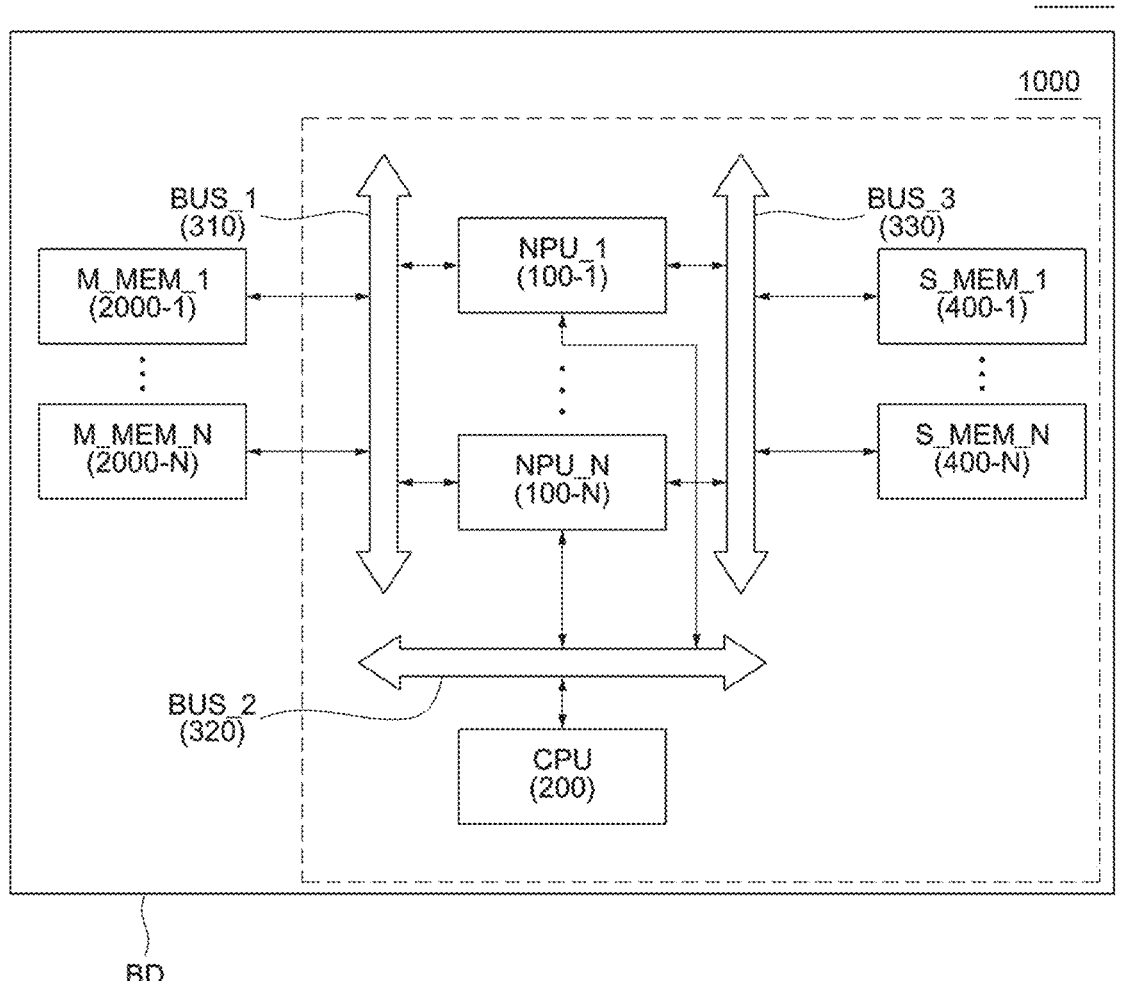
FIG. 15 is a block diagram illustrating a system on chip according to a seventh embodiment of a first example of the present disclosure.

FIG. 15 illustrates a system on chip according to a seventh embodiment of the first example of the present disclosure. In FIG. 15, a device 10000 according to the seventh embodiment of the first example of the present disclosure is illustrated.

Referring to FIG. 15, the device 10000 may include a circuit board (BD), a plurality of main memories 2000-1, . . . , 2000-N, and a system on chip 1000. In describing the system on chip 1000 according to the seventh embodiment of the first example of the present disclosure, overlapping descriptions from FIG. 3 to FIG. 14 are omitted for convenience of explanation. Each example and each embodiment of the present disclosure may be modified and implemented in combination with other examples and other embodiments of the present disclosure.

The system on chip 1000 may refer to a system manufactured on a single semiconductor substrate. The system on chip 1000 may be further configured to include a package (not shown) that protects the semiconductor substrate.

The system on chip 1000 according to the seventh embodiment of the first example of the present disclosure is configured to include a plurality of neural processing units (NPUs) 100-1, . . . , 100-N, a central processing unit (CPU) 200, a first bus 310, a second bus 320, a third bus 330, and a plurality of shared memories 400-1, . . . , 400-N. The plurality of shared memories 400-1, . . . , 400-N are configured as on-chip memories of the system on chip 1000. The plurality of main memories 2000-1, . . . , 2000-N are configured to be electrically connected to the first bus 310. The plurality of main memories 2000-1, . . . , 2000-N are configured to include at least one semiconductor chip. The plurality of shared memories 400-1, . . . , 400-N are configured to be electrically connected to the third bus 330.

A first bus 310 may be provided between the NPU 100 and the plurality of main memories 2000-1, . . . , 2000-N. A second bus 320 may be provided between the NPU 100 and the CPU 200. A third bus 330 may be provided between the NPU 100 and the plurality of shared memories 400-1, . . . , 400-N. Here, the first bus 310 and the third bus 330 are configured to be electrically connected.

The NPU 100 is described with reference to FIGS. 3 to 14, such that its redundant description is omitted. The CPU 200 is described with reference referred to in FIGS. 9 to 14, such that its redundant description is omitted. The plurality of main memories 2000-1, . . . , 2000-N are described with reference to FIG. 10, such that their redundant description is omitted. The plurality of shared memories 400-1, . . . , 400-N are described with reference to FIG. 12, such that their redundant description is omitted. The plurality of NPUs 100-1, . . . , 100-N are described with reference to FIG. 14, such that their redundant description is omitted.

The plurality of main memories 2000-1, . . . , 2000-N may include a plurality of memories disposed outside the system on chip 1000. The total capacity of the plurality of main memories 2000-1, . . . , 2000-N may be determined considering the parameter size of at least one neural network model to be driven on the system on chip 1000. The total capacity of the plurality of main memories 2000-1, . . . , 2000-N may be configured to be larger than the total capacity of the plurality of shared memories 400-1, . . . , 400-N. Therefore, by providing a plurality of main memories outside the system on chip 1000, the manufacturing cost of the system on chip 1000 may be reduced.

The plurality of shared memories 400-1, . . . , 400-N may include a plurality of memories disposed inside the system on chip 1000. The total capacity of the plurality of shared memories 400-1, . . . , 400-N may be configured to be larger than the capacity of the internal memory 140 of the NPU 100. Therefore, by placing reusable parameters in the plurality of shared memories 400-1, . . . , 400-N, the data read from or transmitted to the plurality of main memories 2000-1, . . . , 2000-N may be reduced, thereby reducing the power consumption of the device 10000.

The compiler (not shown) may be set to preferentially store reusable input parameters, output parameters, and weight parameters in the plurality of shared memories 400-1, . . . , 400-N rather than the plurality of main memories 2000-1, . . . , 2000-N when generating the execution code of the neural network model to be processed by the system on chip 1000.

The device 10000 according to the seventh embodiment of the first example of the present disclosure, by combining the features of the fifth embodiment of the first example and the sixth embodiment of the first example of the present disclosure, provides a plurality of neural processing units, an expandable main memory, and an expandable shared memory. Accordingly, a generative neural network model with a large number of parameters may be supported by parallel processing of a plurality of neural processing units while improving data reuse.

Figure 16:
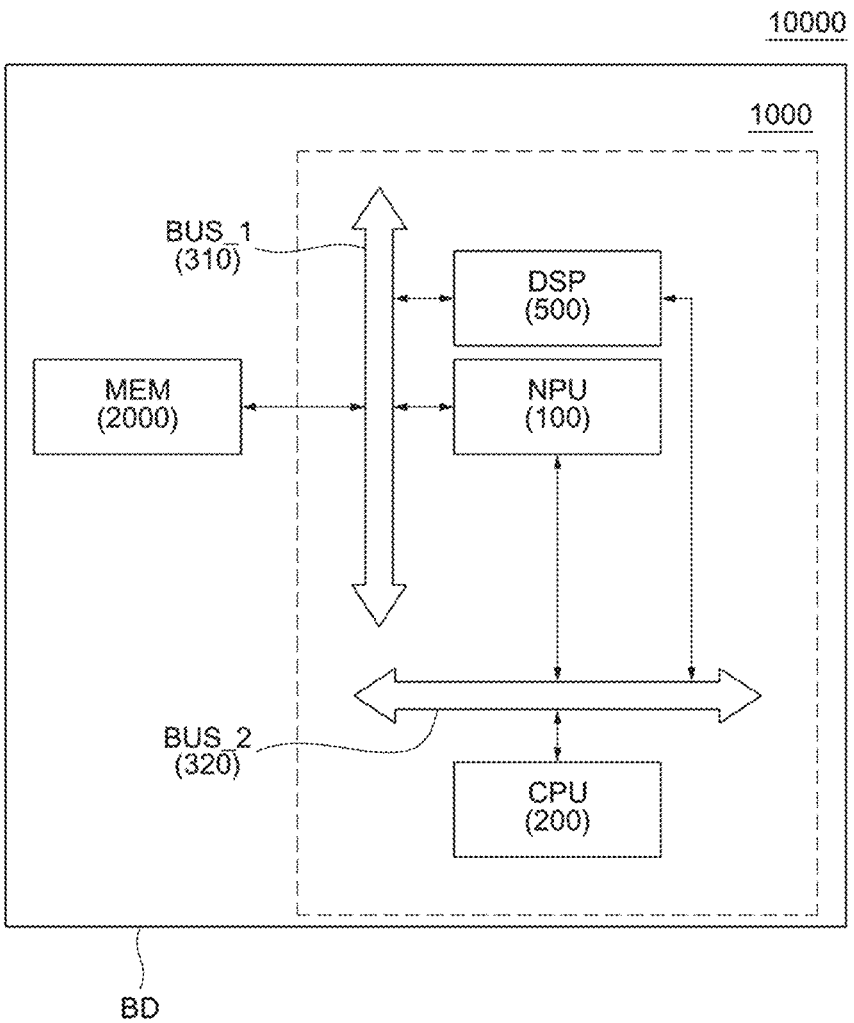
FIG. 16 is a block diagram illustrating a system on chip according to an eighth embodiment of a first example of the present disclosure.

FIG. 16 illustrates a system on chip 1000 according to an eighth embodiment of a first example of the present disclosure.

In describing the system on chip 1000 according to the eighth embodiment of the first example of the present disclosure, overlapping descriptions from FIG. 3 to FIG. 15 are omitted for convenience of explanation. Each example and each embodiment of the present disclosure may be modified and implemented in combination with other examples and other embodiments of the present disclosure.

The system on chip 1000 may refer to a system manufactured on a single semiconductor substrate. The system on chip 1000 may be further configured to include a package (not shown) that protects the semiconductor substrate.

The system on chip 1000 according to the eighth embodiment of the first example of the present disclosure is configured to include a neural processing unit 100, a central processing unit 200, a first bus 310, and a second bus 320. Here, the system on chip 1000 according to the eighth embodiment of the first example of the present disclosure is further configured to include a digital signal processor (DSP) 500. The memory 2000 is configured to be electrically connected to the first bus 310. The memory 2000 is configured to include at least one semiconductor chip.

A first bus 310 may be provided between the NPU 100 and the memory 2000. A first bus 310 may be provided between the DSP 500 and the memory 2000. A second bus 320 may be provided between the NPU 100 and the CPU 200. A second bus 320 may be provided between the DSP 500 and the CPU 200.

The NPU 100 is described with reference to FIGS. 3 to 15, such that is redundant description is omitted. The CPU 200 is described with reference to FIGS. 9 to 15, such that is redundant description is omitted. The memory 2000 is described with reference to FIGS. 9 to 15, such that is redundant description is omitted.

The DSP 500 may be configured to process at least a part of the operations of the neural network model that are inefficient to process in the NPU 100. The DSP 500 may include at least one vector processor (not shown) and at least one scalar processor (not shown).

The system on chip 1000 according to the eighth embodiment of the first example of the present disclosure further provides the DSP 500, and can offload specific operations of the neural network model that are inefficient to process in the neural processing unit 100. Therefore, the system on chip 1000 can process the neural network model quickly in real time.

In some examples, to improve the transmission speed of parameters or operation data between the shared memory(s) and the NPU 100, a dedicated bus or a high-speed bus interface that operates separately from the system bus may be further included. Here, the system bus may be a common data transmission path inside the system on chip 1000 including the second bus 320, the third bus 330, etc., and may be configured to support communication between modules such as the neural processing unit, the central processing unit, and the on-chip memory. On the other hand, the dedicated bus can connect the model parameters of a specific domain stored in the shared memory with a plurality of neural processing units in parallel, thereby alleviating the data transmission bottleneck phenomenon and enabling high-speed access. This separate bus configuration is designed to reduce the load on the main bus (e.g., the first bus 310) and at the same time optimize the operation path for accessing the shared memory.

The various system on chip (SoC) embodiments according to the first example of the present disclosure (see FIG. 9 to FIG. 16) provide a hardware basis for implementing an expandable on-device AI acceleration platform with high parallel processing capability and flexibility, and this platform may selectively or in combination include the following key features:

First, according to various examples, a multi-NPU core architecture that can improve parallel operation processing capability by integrating a plurality of NPU cores (each NPU including an integer operation-centric processing core P_CORE and a special function unit SFU for processing floating-point (FP) operations) with optimized power, performance, and area (PPA) on a single chip may be provided. Here, the sixth embodiment (FIG. 14) and seventh embodiment (FIG. 15) of the first example may be referenced accordingly.

Second, a hierarchical/distributed memory system may be provided which comprises multiple independent on-chip shared memory (SRAM) banks allocated to each NPU core or NPU core group to enhance data locality, and a multi-channel main memory (external DRAM) system accessible by all these NPU cores and providing high total bandwidth. Here, the third (FIG. 11), fourth (FIG. 12), fifth (FIG. 13), and seventh (FIG. 15) embodiments of the first example may be referenced accordingly. This efficiently manages complex data flows and minimizes memory bottleneck phenomena.

Third, the special function unit within the NPU core may include a programmable function approximation circuit embodied as a piecewise affine function (PAF) unit. Here, the configuration of SFU 150 within NPU 100 of FIG. 3 and the fourth example (FIG. 24, FIG. 25, FIG. 27) may be referenced accordingly. This allows for software support for various current and future activation functions and nonlinear operations without separate hardware changes, thereby securing the system's flexibility and future expandability.

Fourth, in the system configuration according to the first example of the present disclosure (e.g., FIG. 9 to FIG. 16), a digital signal processor (DSP) 500 for offloading data processing before and after neural network operations (e.g., sensor data preprocessing, post-processing) or specific operations that are inefficient to process in the NPU may be selectively integrated. FIG. 16 shows an example of such DSP integration. This allows the NPU to focus on core AI operations, thereby improving the efficiency of the entire system.

The organic combination of the above-described components can create a synergistic effect. The multi-NPU cores and the distributed/hierarchical memory structure provide extreme parallelism and high data supply capability, enabling the processing of complex or multiple AI models simultaneously or very quickly in an on-device environment. When combined with a programmable SFU, it can provide flexibility not limited to a specific model or operation and adaptability to new AI algorithms of the future in an on-device environment. The selective integration of a DSP further expands the scope of application of this platform.

In summary, an expandable on-device artificial intelligence (AI) acceleration system according to the present disclosure may include: one or a plurality of NPU cores, each including an integer operation processing core and a floating-point special function unit SFU; (optionally) one or more on-chip shared memories associated with each of the NPU cores or a group of NPU cores to provide data locality; a high-bandwidth main memory interface shared by the NPU cores for storing large-capacity data; and an integrated controller that distributes AI operations to the NPU cores and (optionally) the DSP, and controls the data flow through the on-chip shared memory and the main memory interface. At this time, the floating-point special function unit SFU may include a programmable function approximation circuit PAF that approximates various nonlinear functions according to input parameters. In addition, a digital signal processor (DSP) that performs specific signal processing operations independently of the operations of the NPU cores may be selectively provided. This enables the parallel and flexible acceleration of various AI models and workloads in an on-device environment, making the realization of high-performance AI applications possible.

The various system on chip (SoC) embodiments according to the first example of the present disclosure (see FIG. 9 to FIG. 16), when combined with the unique architecture of the previously described neural processing unit 100, can create an integrated synergistic effect that goes beyond the simple parallel arrangement of hardware. This is a feature of the present disclosure that solves the technical challenges of implementing high-performance on-device AI, and may be specified as follows.

For example, intelligent linkage of a hierarchical/distributed memory system and a hybrid function approximation unit may be implemented. As shown in FIG. 11, FIG. 13, FIG. 15, etc., the system according to the first example of the present disclosure may adopt a hierarchical memory structure composed of a large-capacity external main memory 2000 and a high-speed on-chip shared memory 400. This memory system, when operated in conjunction with the hybrid structure of the special function unit 150, which combines a programmable method and a dedicated hardware method to process various nonlinear functions, can have its effect enhanced. Specifically, the control unit 110 or the compiler can optimize data placement so that the vast size of neural network weights are stored in the external main memory 2000, while parameters such as programmable operation coefficients used repeatedly by the function approximation unit FuncApx to approximate activation functions like GELU and SiLU are made resident in the high-speed on-chip shared memory 400 or the internal memory of the NPU. Since the coefficients are loaded directly from the on-chip memory without needing to access the external memory for each activation function operation, the system's memory bottleneck phenomenon is greatly alleviated, and the power consumption associated with data movement can be reduced.

For example, an operation pipeline may be implemented through NPU-DSP heterogeneous computing. As shown in FIG. 16, the system of the present disclosure can implement a highly specialized heterogeneous computing architecture by integrating a digital signal processor (DSP) 500 along with the NPU 100. This can improve processing efficiency by decomposing the entire AI inference process into the following three-stage specialized pipeline.

Signal pre/post-processing (dedicated to DSP): Traditional signal processing operations such as sensor data filtering and Fourier transform (FFT) may be configured to be exclusively handled by the DSP 500.

Large-scale integer matrix operations (dedicated to P_CORE): Matrix multiplication (MatMul), which accounts for the majority of the neural network operation amount, may be configured to be processed by the processing core P_CORE 120, which is specialized for low-power integer operations.

High-precision nonlinear function operations (dedicated to SFU/FuncApx): Complex nonlinear functions that require the precision of floating-point (FP), such as Softmax, negative exponential, and reciprocal, may be configured to be processed at ultra-high speed by the function approximation unit FuncApx within the special function unit (SFU) 150, which performs autonomous pipeline operations with a single instruction.

The above clear division of roles can optimize the processing performance and energy efficiency of the entire system by allocating hardware optimized for each operation.

Figure 17:
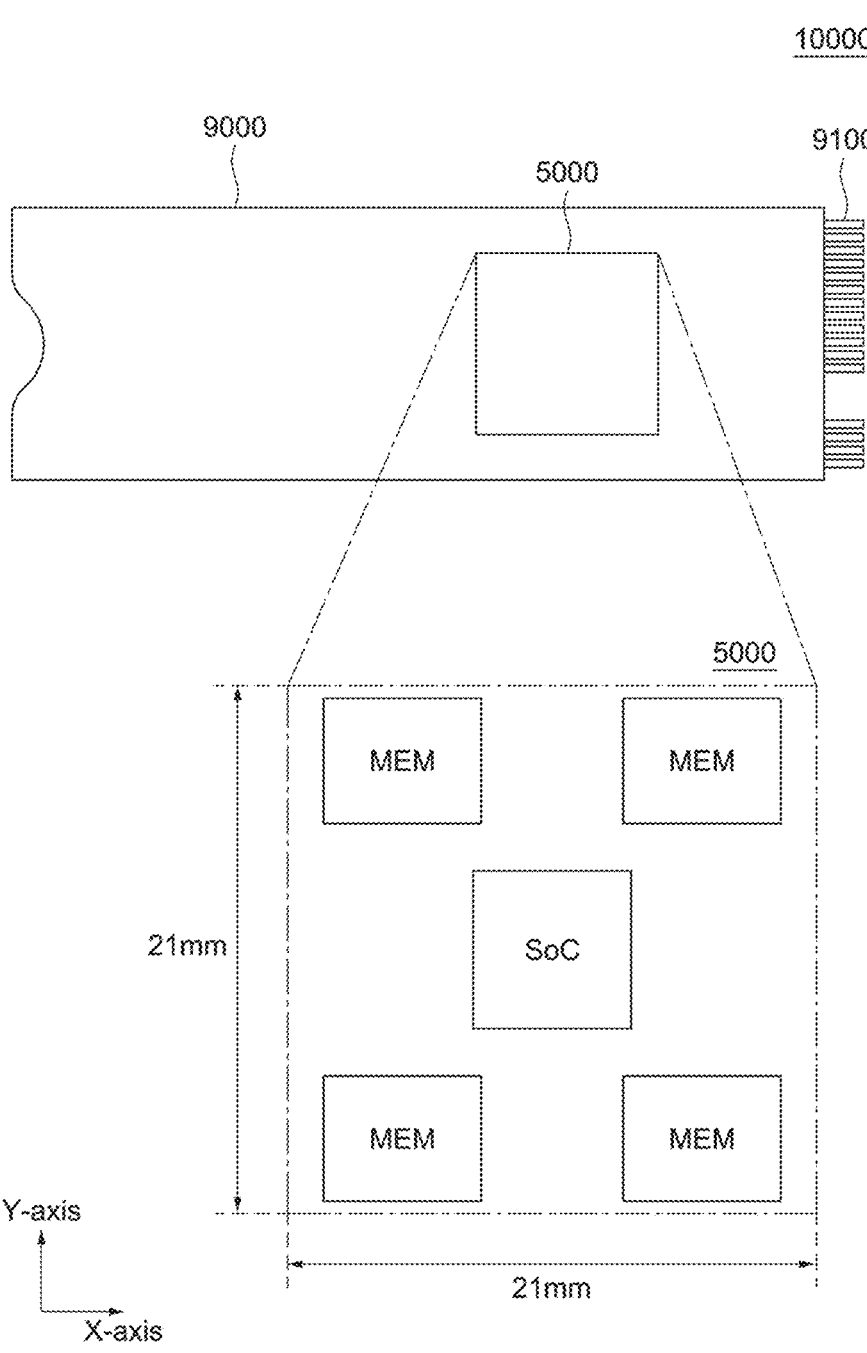
FIG. 17 is a diagram illustrating a device according to a first embodiment of a second example of the present disclosure.

FIG. 17 illustrates a device 10000 according to a first embodiment of a second example of the present disclosure.

The device 10000 shown in FIG. 17 may be a plan view of the device 10000 viewed from above, but is not limited thereto. The size of each of the hardware components described with reference to FIG. 17 may mean width (X-axis length) and height (Y-axis length).

The device 10000 according to the first embodiment of the second example of the present disclosure includes a circuit board 9000 and a package 5000. The circuit board 9000 may further include a slot 9100 (for example, an M.2 slot). The device 10000 according to the first embodiment of the second example of the present disclosure may correspond to the device 10000 according to the embodiments of the first example of the present disclosure. The circuit board 9000 according to the first embodiment of the second example of the present disclosure may correspond to the circuit board (BD) according to the embodiments of the first example of the present disclosure. The package 5000 according to the first embodiment of the second example of the present disclosure may correspond to the package (not shown) in the embodiments of the first example of the present disclosure. Duplicate descriptions with reference to FIG. 3 to FIG. 16 are omitted.

The device 10000 according to the first embodiment of the second example of the present disclosure may be configured as a system on chip (SoC). The system on chip (SoC) may refer to a semiconductor package that integrates at least one neural processing unit 100 and components of various electronic systems. The system on chip (SoC) can integrate digital circuits, analog circuits, mixed-signal, and radio frequency processing circuits into a single package. For example, the system on chip (SoC) may further include at least one of a central processing unit (CPU), a digital signal processor (DSP), an image signal processor (ISP), and a graphics processing unit, in addition to the NPU. The system on chip (SoC) may include at least one memory MEM. The system on chip (SoC) may include a high-speed data bus for efficient communication between the various circuits included in the system on chip (SoC). The system on chip (SoC) may include at least one interface such as PCIe, USB, I2C, SPI, UART, GPIO for connection with external devices and sensors. The system on chip (SoC) may include an on-chip power management unit that regulates the voltage and power distribution of the semiconductor package. The system on chip (SoC) may include a communication interface that integrates wired or wireless communication protocols such as Ethernet, Wi-Fi, Bluetooth, cellular connection for data transmission.

Referring to FIG. 17, the device 10000 is an example implemented with an M.2 form factor. In the first embodiment of the second example of the present disclosure, the width of the circuit board 9000 is 22 mm and the depth may be 42 mm, 60 mm, 80 mm, or 110 mm, but is not limited thereto.

The M.2 board is a next-generation interface standard for high-speed data transmission, providing high speed and high efficiency, and is designed in a compact size, being adopted in various devices such as laptops, desktops, and mini-PCs. In particular, a small form factor like M.2 is easy to apply on-device.

The package 5000 mounted on the device 10000 may include a system on chip (SoC) and at least one memory MEM. The system on chip (SoC) according to the first embodiment of the second example of the present disclosure may correspond to the system on chip 1000 according to the embodiments of the first example of the present disclosure. The memory MEM of FIG. 17 may correspond to the memory MEM or main memory (M_MEM) described above with reference to FIG. 9 to FIG. 16.

The physical size of the SoC may be, for example, 4.50 mm×4.85 mm. However, the present disclosure is not limited thereto. Considering the minimum separation distance required between the SoC and the memories (MEM), the physical size of each memory MEM may be limited to 6.43 mm×5.30 mm. However, the present disclosure is not limited to the size or dimensions of each component.

Meanwhile, the maximum number of memories (MEM) in the package 5000 may be determined considering the processing capability of the SoC (for example, TOPS), or the size of a package that is smaller than a specific size that satisfies the size of a specific form factor applied to the SoC.

According to an embodiment, the process node of the semiconductor manufacturing process of the memory MEM may be lower than the process node of the semiconductor manufacturing process of the SoC. For example, the memory MEM may be manufactured by a 14 nm semiconductor manufacturing process, and the process of the SoC may be manufactured by a 7 nm semiconductor manufacturing process. For example, the memory MEM may be manufactured by a 5 nm semiconductor manufacturing process and the SoC may be manufactured by a 7 nm semiconductor manufacturing process. For example, the memory MEM may be manufactured by a 2 nm semiconductor manufacturing process, and the SoC may be manufactured by a 5 nm semiconductor manufacturing process. According to the above-described configuration, the size of the SoC can be reduced to be suitable for the specification of a specific form factor (e.g., M.2). In particular, in the case of on-device, if the size of the SoC is large, it may be an obstacle to commercialization.

Referring to FIG. 17, the package 5000 may include up to four memories (MEM). Each memory MEM may be a low power double data rate 5 (LPDDR5). If the number of bus channels between the SoC and the memories (MEM) is increased to correspond to the number of memories (MEM), the memory bandwidth of the first bus 310 of the embodiments of the first example of the present disclosure can be increased. For example, if the SoC and four memories (MEM) of the package 5000 are placed closest to each other, the size of the package 5000 may be 21 mm×31 mm. In this embodiment, the package 5000 may be mounted on a device 10000 having a width of 22 mm and a depth of 42 mm.

However, the package 5000 of FIG. 17 cannot be mounted on a circuit board 9000 having a depth of 30 mm. Therefore, FIG. 18 describes an embodiment in which a package 5000 including a system on chip (SoC) and four memories (MEM) may be mounted on a circuit board 9000 having a depth of 30 mm.

The package 5000 may include at least one semiconductor chip to which a fan-in semiconductor package, a fan-out semiconductor package, a package on package (POP), and/or a 2.5D package method is applied. In addition, the technical features of different examples of the present disclosure may be combined and implemented in a modified manner.

Figure 18:
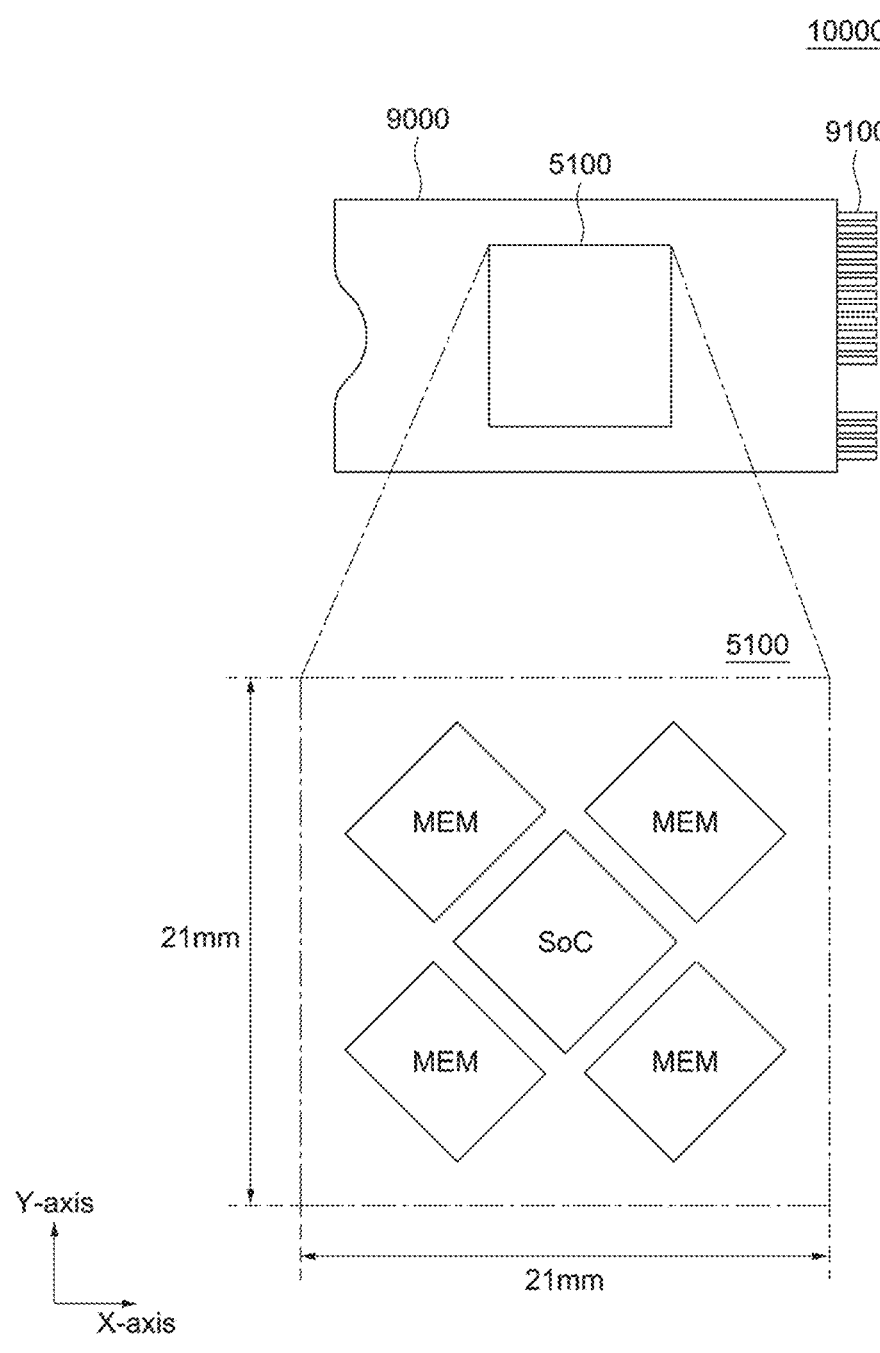
FIG. 18 is a diagram illustrating a device according to a second embodiment of a second example of the present disclosure.

FIG. 18 illustrates a device 10000 according to a second embodiment of a second example of the present disclosure.

The device 10000 shown in FIG. 18 may be a plan view of the device 10000 viewed from above, but is not limited thereto. The size of each of the hardware components described with reference to FIG. 18 may mean width (X-axis length) and height (Y-axis length).

The device 10000 according to the second embodiment of the second example of the present disclosure may include a circuit board 9000 and a package 5100. The circuit board 9000 may further include a slot 9100 (for example, an M.2 slot). The device 10000 according to the second embodiment of the second example of the present disclosure may correspond to the device 10000 according to the embodiments of the first example of the present disclosure. The circuit board 9000 according to the second embodiment of the second example of the present disclosure may correspond to the circuit board (BD) according to the embodiments of the first example of the present disclosure. The package 5100 according to the second embodiment of the second example of the present disclosure may correspond to the package (not shown) in the embodiments of the first example of the present disclosure. Duplicate descriptions among the contents described above with reference to FIG. 3 to FIG. 17 are omitted. In addition, in describing the second embodiment of the second example of the present disclosure, duplicate descriptions with the first embodiment of the second example may be omitted for convenience of explanation.

Referring to FIG. 18, the device 10000 is an example implemented with an M.2 form factor. In the second embodiment of the second example of the present disclosure, the width of the circuit board 9000 is 22 mm and the depth may be 30 mm, but is not limited thereto.

The package 5100 mounted on the device 10000 may include a system on chip (SoC) and at least one memory MEM. The system on chip (SoC) according to the second embodiment of the second example of the present disclosure may correspond to the system on chip 1000 according to the embodiments of the first example of the present disclosure. The memory MEM of FIG. 18 may correspond to the memory MEM or main memory (M_MEM) described above with reference to FIG. 10 to FIG. 17.

The width of the circuit board 9000 shown in FIG. 18 may be 22 mm, and the depth may be 30 mm. In order to mount the package 5100 within such a restrictive size, the placement of the SoC and the plurality of memories (MEM) within the package 5100 must be improved.

The physical size of the SoC may be 4.50 mm×4.85 mm, and the physical size of each memory MEM may be 6.43 mm×5.30 mm.

According to an embodiment, the process node of the semiconductor manufacturing process of the memory MEM may be lower than the process node of the semiconductor manufacturing process of the SoC. For example, the memory MEM may be manufactured by a 14 nm semiconductor manufacturing process, and the process of the SoC may be manufactured by a 7 nm semiconductor manufacturing process. For example, the memory MEM may be manufactured by a 5 nm semiconductor manufacturing process and the SoC may be manufactured by a 7 nm semiconductor manufacturing process. For example, the memory MEM may be manufactured by a 2 nm semiconductor manufacturing process, and the SoC may be manufactured by a 5 nm semiconductor manufacturing process. According to the above-described configuration, the size of the SoC can be reduced to be suitable for the specification of a specific form factor (e.g., M.2).

Referring to FIG. 18, the SoC and the plurality of memories (MEM) may be arranged in a diagonal direction of the package 5100. In this case, the size of the package 5100 may be reduced to 21 mm×21 mm. To elaborate, the configuration of the plurality of semiconductor chips arranged inside the package 5100 may be referred to as a "rotated multi-chip substrate layout". The package 5100 of the rotated multi-chip substrate layout has the effect of being able to reduce the size of the package 5100 due to the arrangement of each semiconductor chip rotated at a specific angle. That is, the X-axis of the SoC and the X-axis of the substrate 5100 may not be parallel. The Y-axis of the SoC and the Y-axis of the substrate 5100 may not be parallel. The X-axis of the memory MEM and the X-axis of the substrate 5100 may not be parallel. The Y-axis of the memory MEM and the Y-axis of the substrate 5100 may not be parallel.

Meanwhile, the number of memories (MEM) in the package 5100 may be changed considering the processing capability of the SoC (for example, TOPS), the size of a specific form factor, and the size that may be placed in a package smaller than the specific form factor.

The package 5100 may be configured to include at least one semiconductor chip to which a fan-in semiconductor package, a fan-out semiconductor package, a package on package (PoP), and/or a 2.5D package method is applied. In addition, the technical features of different examples of the present disclosure may be combined and implemented in a modified manner.

That is, the package 5100 may include a semiconductor package substrate, a SoC rotated at a first angle with respect to one side of the semiconductor package substrate on a planar basis and disposed on the semiconductor package substrate, and one or a plurality of memories (MEM) rotated at a second angle with respect to one side of the semiconductor package substrate on a planar basis and disposed on the semiconductor package substrate adjacent to the SoC. Here, the first angle and the second angle may be determined so that the size of the package 5100 is smaller than the size of a specific form factor.

That is, according to the device 10000 of the second embodiment of the second example of the present disclosure, a "rotated multi-chip substrate layout" for mounting a SoC and a plurality of memories (MEM) on a very limited form factor such as M.2 2230 is exemplified. In order to efficiently implement sophisticated and computationally intensive artificial intelligence (AI) operations in such a small device with extremely limited physical space, an optimized hardware foundation is essential.

Various embodiments of the present disclosure can provide hardware support suitable for compact, efficient, and high-performance artificial intelligence (AI) acceleration. The main features of such embodiments are summarized as follows.

First, an NPU core, referred to as the value IN core, may be provided that is highly optimized for power, performance, and area (PPA). This NPU core may be structured to include a processing core specialized in performing integer operations, along with a special function unit (SFU) capable of efficiently executing floating-point operations. The special function unit may employ area-efficient function approximation techniques, such as piecewise affine function (PAF) methods, to support complex activation functions. This architectural configuration enables the NPU to perform both high-speed, low-power integer computations and accurate floating-point-based operations within a compact silicon footprint, thereby enhancing overall PPA characteristics.

Second, advanced semiconductor packaging technology may be applied to integrate the NPU die and essential memory components (e.g., LPDDR series) into a single high-density package to conform to standard compact form factors, such as M.2 cards. As exemplified in FIG. 18, the overall module size can be minimized through space optimization layouts such as rotating and arranging the system on chip and memory chips within the package. That is, the layout of the package may be spatially optimized by selectively rotating and arranging the NPU and memory dies within the enclosure, which allows the total module area to be minimized to address challenges due to space-constrained platforms such as mobile devices or embedded systems.

Third, a main memory of sufficient capacity, placed very close either inside the package or on the main board, may be provided to store the weights and operational data of the target AI model and to exchange data with the NPU at high speed. This reduces the need for memory expansion via external large printed circuit boards (PCBs), contributing to the miniaturization of the entire system.

Thus, the organic combination of a PPA-optimized NPU core, high-density integration packaging technology (see FIG. 18), and a proximate memory configuration creates an important synergistic effect. It becomes possible to effectively implement sophisticated on-device AI functions (e.g., advanced operations such as speculative decoding) even in mobile devices, wearable devices, or small embedded systems with extremely limited space and power budgets, where AI accelerator deployment was previously difficult.

In conclusion, a small form factor AI acceleration device according to the present disclosure may include an NPU die comprising an integer operation processing core and a floating-point special function unit optimized for power, performance, and area, and one or more memory dies electrically connected to the NPU die for storing weights and operational data of an AI model. At this time, the NPU die and memory die are integrated with high density within a single semiconductor package mountable on a standard small form factor substrate such as an M.2 standard, as shown in FIG. 18, and the relative positions and orientations of the dies within the package may be configured to minimize the overall package area. In addition, the SFU may include a programmable function approximation circuit to implement various activation functions in an area-efficient manner. Through this, the AI acceleration device of the present disclosure can be successfully integrated into portable or embedded devices with severe constraints on physical size and power consumption, and can support efficient performance of advanced AI operations (e.g., operations such as speculative decoding) in an on-device environment.

Figure 19:
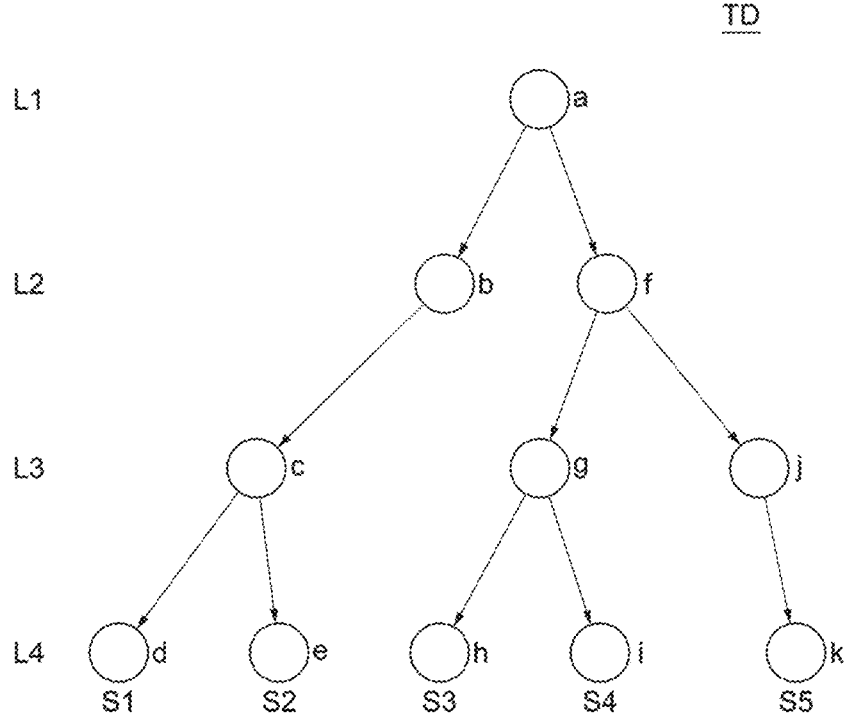
FIG. 19 is a diagram illustrating a tree for explaining speculative decoding according to a third example of the present disclosure.

FIG. 19 illustrates a tree for explaining speculative decoding according to a third example of the present disclosure.

Hereinafter, the speculative decoding method according to the third example of the present disclosure may be performed in the device 10000 described with reference to FIGS. 3 to 18. Accordingly, in describing the third example of the present disclosure, duplicate descriptions with the first and second examples are omitted for convenience of explanation.

A transformer-based generative artificial intelligence model can receive a query as input and generate a response. For example, a language model can receive a query in text form to obtain input tokens, and generate output tokens from the input tokens. Subsequently, the query and the generated output token may be input back into the language model to generate a subsequent next output token. This token generation operation may be repeated multiple times until the response to the query is complete. A token can correspond to a word or part of a word. A response may include an output token. The final response generated by the language model for the input query data may include a series of output tokens generated by inputting the output tokens generated as part of the response generated by the language model back into the language model.

The larger the number of parameters in a language model, the higher the cost for generating a response from the language model. Therefore, using a language model with a large number of parameters increases the computational cost required to generate a response. Reducing the number of parameters in a language model can lower the computational cost and improve the response speed, but the response accuracy may be degraded. That is, there is a trade-off relationship between the number of parameters and accuracy (or quality) of a language model and the time required for a processor to perform the language model's operations. In particular, to generate a response of a certain level of quality or higher, the number of parameters in the language model must be quite large.

Meanwhile, providing a commercial service by processing a language model on the device itself is difficult considering the hardware resource limitations of the device (e.g., energy consumption, battery capacity, memory capacity, AI processing capability, etc.).

Accordingly, the third example of the present disclosure describes speculative decoding for driving heterogeneous language models using the limited hardware resources of the device 10000.

Speculative decoding is a technique in which a plurality of language models each perform a prediction, and then the results are combined to generate the most reliable answer. For example, a first language model selects candidates that can come as the next token and calculates a probability indicating the suitability for each candidate token. Subsequently, a second language model can consider the context and make a final selection of one of the candidate tokens proposed by the first language model. Since the second language model must select one of the candidate tokens reflecting a broader context, it may be a model with more parameters and better performance than the first language model.

The device 10000 according to examples of the present disclosure can drive heterogeneous language models based on at least one system on chip 1000. That is, in an on-device method, to accelerate the token generation speed of a language model, speculative decoding can utilize heterogeneous language models. At least one device 10000 can utilize a speculative decoding technique in which heterogeneous language models cooperate with each other to generate a response to an input query.

The heterogeneous language model according to the third example of the present disclosure may include a first language model and a second language model. Here, the number of parameters of the first language model is smaller than the number of parameters of the second language model. That is, the number of parameters of the heterogeneous language models is different from each other. A language model with a relatively small number of parameters and a language model with a large number of parameters may be defined as an upper model and a lower model, respectively. That is, the first language model is defined as a lower model of the second language model, and the second language model may be defined as an upper model of the first language model. For example, the number of parameters of the upper model may be 7 billion, and the number of parameters of the lower model may be 1 billion.

According to the third example of the present disclosure, the lower model can generate probabilities used for sampling the additional tokens, based on the speculatively generated additional tokens and the currently allowed token set. According to the third example of the present disclosure, the upper model generates output tokens using the candidate tokens generated by the lower model. The upper model can accept or reject the candidate tokens by sampling the additional tokens speculatively generated by the lower model. Here, the acceptance or rejection by the upper model may be determined by comparing the probability generated by the upper model corresponding to each token with the probability generated by the lower model corresponding to each token. The candidate token accepted by the upper model is the output token included in the response. That is, speculative decoding can dramatically reduce the total amount of computation by having a light lower model quickly generate multiple candidates and having a heavy upper model participate only in verification, instead of performing the entire operation of the upper model every time.

According to the speculative decoding of the third example of the present disclosure, the lower model can generate one or more candidate token sets to generate a response corresponding to the input query to the lower model. A candidate token set (e.g., set 1, set 2, or set 3) is a set including one or more candidate tokens, as in Table 1 below.

TABLE 1

| Candidate Tokens | Candidate Token Sets |
|---|---|
| apple, is, red, banana, yellow, car, fast | set 1: [apple, is, red]<br>set 2: [banana, is, yellow]<br>set 3: [car, is, fast] |

The upper model can accept or reject the candidate token set by sampling for each of one or more candidate token sets. Here, when the device 10000 samples for each candidate token set, the device 10000 can generate more tokens faster than when sampling for each token. In addition, the probability distributions of the lower model and the upper model can also be maintained similarly. Here, the token generation speed may be referred to as TPS (tokens per second).

The speculative decoding according to the third example of the present disclosure can operate in an auto-regressive token generation manner. The auto-regressive token generation method generates a token by inputting a series of tokens generated from the lower model back into the lower model. The lower model generates one token for each auto-regression. Therefore, if the lower model performs N inferences, N series of tokens are generated. The lower model can generate a conditional probability distribution related to the N series of tokens. Subsequently, the upper model can process the N series of tokens generated from the lower model and the conditional probability distribution related to the N series of tokens to generate a probability distribution of the upper model. Therefore, the upper model can accept or reject the token generated by the lower model by comparing the probability distribution generated by the upper model with the conditional probability distribution generated by the lower model. The upper model can accept a token based on a threshold value. When the similarity between the probability distribution value of the upper model and the conditional probability distribution value of the lower model is equal to or greater than the threshold value, the corresponding token is accepted, and when the similarity is less than the threshold value, the corresponding token may be rejected.

The upper model can accept or reject a series of tokens generated by the lower model based on a threshold value. If a specific token among the series of tokens is rejected, the tokens up to the previous token of the rejected token become the final output tokens. For example, the lower model of speculative decoding can generate tokens in units of sets. In this case, the upper model can accept or reject for each of a plurality of token sets generated from the lower model. If the lower model generates candidate tokens in units of sets, the acceptance or rejection judgment in the upper model can also be performed in units of sets, which can improve the token generation speed of the speculative decoding of the device 10000. In addition, as the number of token sets generated by the lower model increases, the probability that the upper model will accept a token set may increase.

The lower model can generate one or more candidate token sets in response to an input query. Each candidate token set includes a series of tokens, and the lower model can select a series of tokens with high probability in the probability distribution as a candidate token set. Each candidate token set may be selected in various ways. For example, each candidate token set may be generated by selecting tokens with the highest probability in the probability distribution, but the present disclosure is not limited thereto. For the upper model to accept one candidate token set, the probabilities of the tokens included in each candidate token set may be summed. Therefore, the upper model can accept or reject the entire candidate token set based on the summed probability of the candidate token set, not the probability of each token. To elaborate, if the probability of each token is used, it may be difficult to match the probability of each token generated by the lower model and the upper model, so the rejection probability of the upper model may increase. If the summed probability of the token set is used, the matching of the summed probability of the token set generated by the lower model and the upper model may be more similar, so the acceptance probability of the upper model may increase.

The lower model can generate one or more candidate token sets in response to an input query. The one or more candidate token sets may be generated statically or dynamically. For example, the sequence length of each candidate token set may be preset. The lower model can generate one or more candidate token sets and generate tree data by combining each candidate token set. The tree data includes a node at each branch point.

FIG. 19 shows tree data TD including one or more token sets generated by the lower model, according to an embodiment. Referring to FIG. 19, a first token set S1, a second token set S2, a third token set S3, a fourth token set S4, and a fifth token set S5 are displayed below the leaf nodes of the tree.

The first candidate token set S1 may include four tokens (a, b, c, d). The second candidate token set S2 may include four tokens (a, b, c, e). The third candidate token set S3 may include four tokens (a, f, g, h). The fourth candidate token set S4 may include four tokens (a, f, g, i). The fifth candidate token set S5 may include four tokens (a, f, j, k). Each of the candidate token sets may be selected or rejected by the upper model.

The token length of each candidate token set may be set. For example, the sentence length of each token set may be set to four. However, the present disclosure is not limited thereto, and the length of the token set may be changed dynamically.

Each token can have a sequence level. The sequence level can correspond to the sentence length. To be more specific, the first sequence level L1 corresponds to the token (a). The second sequence level L2 corresponds to the tokens (b, f). The third sequence level L3 corresponds to the tokens (c, g, j). The fourth sequence level L4 corresponds to the tokens (d, e, h, i, k). In the example where the sentence length is set to 4, the maximum sequence level is set to 4. The order of the tokens in each token set may be arranged according to the corresponding sequence level. To be more specific, the first token (a) among the tokens (a, b, c, d) of the first token set S1 corresponds to the first sequence level L1. The second token (b) among the tokens (a, b, c, d) of the first token set S1 corresponds to the second sequence level L2. The third token (c) among the tokens (a, b, c, d) of the first token set S1 corresponds to the third sequence level L3. The fourth token (d) among the tokens (a, b, c, d) of the first token set S1 corresponds to the fourth sequence level L4.

Each token is defined as a node of the tree data TD. For example, the token (g) may be a branch node of the third token set S3 and the fourth token set S4 at the third sequence level L3. Each node includes branch information.

That is, the tree data TD generated by the lower model may include all or at least a part of one or more token sets (S1 to S5), sequence levels (L1 to L4), node information of each token (a, b, c, d, e, f, g, h, i, j, k), and the selection probability of each candidate token set (for example, the summed probability of the token set). The upper model can accept or reject at least one token of the tree data TD.

Speculative decoding can also be implemented as hybrid speculative decoding. Hybrid speculative decoding can set a threshold α that determines whether a token is approved or rejected by comparing the probability distributions of the lower model and the upper model, after the previously speculatively generated token is verified by the upper model.

Group speculative decoding can provide high efficiency by being configured so that the lower model generates tokens in groups and the upper model verifies them.

Figure 20:
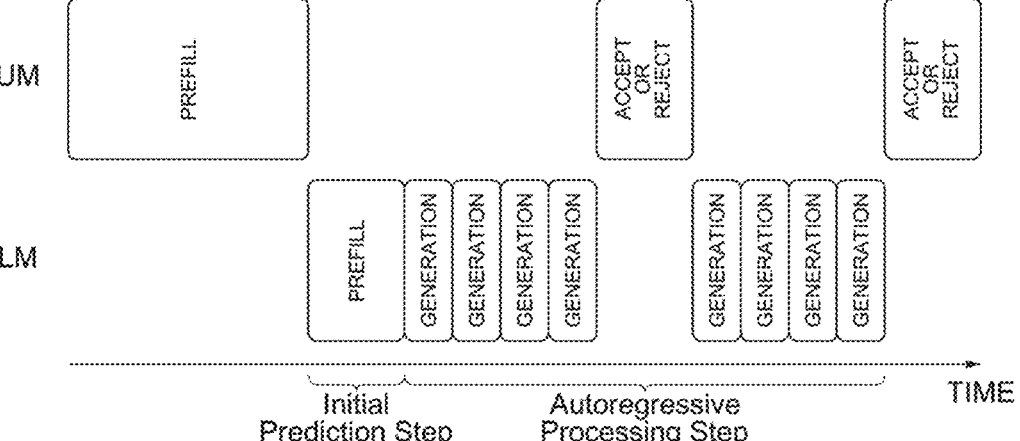
FIG. 20 is a diagram illustrating a speculative decoding operation according to a third example of the present disclosure.

FIG. 20 schematically illustrates a speculative decoding operation according to a third example of the present disclosure.

Referring to FIG. 20, a lower model LM and an upper model UM are shown. The device 10000 according to the third example of the present disclosure may be configured to sequentially process the lower model LM and the upper model UM for speculative decoding.

A transformer-based artificial intelligence model can perform certain operation steps (e.g., prefill step and generation step) to generate a response to an input query. A transformer is an artificial intelligence model based on an attention mechanism. The transformer utilizes a large number of matrix multiplication operations. The transformer can obtain an attention score (Q, K, V), which is an output value, using input values and parameters such as query Q, key K, and value V. The transformer can process various inference operations based on the output value (i.e., attention (Q, K, V)). The transformer is actively used in generative language models.

A tensor refers to a multi-dimensional matrix parameter processed in an artificial intelligence model (e.g., an artificial neural network). A tensor can refer to various neural network model parameters such as weights, input parameters, output parameters, and attention parameters.

The prefill step is an initial step of processing and interpreting the input (e.g., a prompt input by a user). The prefill step may include a tokenization step, a context embedding step, a processing step through layers, and a preparation step for decoding. The prefill step may be processed by one or more neural processing units. In the tokenization step, the input text is converted into tokens (sub-words, words, or characters), which are numerical representations used in the artificial intelligence model. In the context embedding step, the tokens may be mapped to dense embedding vectors that encode semantic and syntactic information. In the prefill step, the embeddings are processed through several layers of the neural network model (e.g., transformer blocks) to generate a contextual representation of the input tokens. In the preparation step for decoding, the artificial intelligence model calculates the probability for each entire token of what the next output token might be based on the input context, but does not yet finally generate the next token. Instead, it can set the context for the generation step.

In the generation step, one or more neural processing units can sequentially generate one or more output tokens based on the context provided by the artificial intelligence model in the prefill step and the previously generated output tokens. The generation step may include an initial prediction step, an autoregressive processing step, and a stopping condition. The generation step may be processed by one or a plurality of neural processing units. In the initial prediction step, the first token is generated by sampling from the probability distribution calculated in the prefill step. In the autoregressive processing step, each subsequent token is generated by integrating the previous tokens (including the generated tokens) into the context of the neural network model. The generation process continues until a stopping condition is met, such as reaching a maximum token limit, encountering a special end-of-sequence (EOS) token, or achieving a specific semantic goal. The series of tokens generated in the generation step may correspond to the tree data TD of FIG. 19. The tree data may include at least one token set.

Referring to FIG. 20, a third example showing the steps of speculative decoding over time is shown. The speculative decoding according to examples of the present disclosure may be processed sequentially or in parallel by one or more neural processing units. In speculative decoding, the upper model UM and the lower model LM can cooperate with each other to generate a response to an input query. The longer the horizontal length of the block representing each step, the longer the processing time.

Specifically, in speculative decoding, the upper model UM first performs a prefill operation. Subsequently, the lower model LM performs a prefill operation. Subsequently, the lower model LM continuously performs generation steps, and each token is generated in each generation step. Next, the upper model UM can accept or reject the tokens generated by the lower model LM. The upper model UM can accept or reject some or all of the tokens generated by the lower model LM. The lower model LM receives the accepted tokens as an input query again, and the lower model LM continuously performs generation steps to generate each token corresponding to each generation step. Next, the upper model UM can accept or reject the tokens generated by the lower model LM. These steps are repeated until a stopping condition is met.

The number of parameters of the upper model UM is larger than the number of parameters of the lower model LM, so the processing time is longer. Therefore, the processing time of the prefill step of the upper model UM is longer than the processing time of the prefill step of the lower model LM. The processing time of the acceptance or rejection step of the upper model UM is longer than the processing time of the generation step of the lower model LM. Therefore, the token generation speed of the system can be improved by configuring the lower model to generate as many tokens as possible and the upper model to perform only selective judgment in generating a response.

The number of parameters of each of the lower model LM and the upper model UM may be determined considering the hardware resource limitations of the device 10000 (for example, the processing performance of the System on Chip (SoC) and the bandwidth of the memory MEM). The upper model UM can utilize a language model whose number of parameters is determined considering the hardware resource limitations of the device being processed.

In some examples, the lower model LM may be a pruned model of the upper model UM. In this case, the parameters of the pruned neural network model can be lightweight, and the required memory bandwidth may be smaller than that of the upper model UM.

According to a third example of the present disclosure, the device 10000 may be configured to process a prefill operation using the upper model UM to process speculative decoding. Subsequently, the device 10000 may process prefill and generation operations using the lower model LM to process speculative decoding.

The device 10000 according to the third example of the present disclosure may include at least one interface (not shown). The interface can input and/or output data. The device 10000 can receive an input query through the interface (not shown). The interface may be an electronic circuit capable of receiving input queries such as prompts, gestures, voice, etc. The input and/or output interface may include, for example, a mouse, keyboard, touch pad, touch screen, microphone, wireless communication device, wired communication device, camera, speaker, etc.

The System on Chip (SoC) of the device 10000 according to the third example of the present disclosure can perform inference operations on the upper model UM and the lower model LM. The upper model UM and the lower model LM can cooperate with each other to process speculative decoding. The NPU of the System on Chip (SoC) of the device 10000 according to the third example of the present disclosure can process the upper model UM and the lower model LM alternately. That is, the NPU can operate to process the upper model UM and the lower model LM sequentially. In other words, the NPU can operate to process the upper model UM and the lower model LM in a time-division manner. Therefore, the utilization rate of the arithmetic circuits of the NPU can be increased while processing the upper model UM and the lower model LM sequentially.

According to the disclosed embodiment, as the upper model UM and the lower model LM are sequentially processed in the NPU of the device 10000 to perform speculative decoding, the bottleneck phenomenon caused by the speculative decoding operation can be reduced by having the parameters of the upper model UM and the lower model LM reside in the memory MEM.

The memory MEM of the device 10000 according to the third example of the present disclosure is configured to store all the weight parameters of the upper model UM and the lower model LM when the device 10000 is operating. By storing all the first weight parameters of the upper model UM and the second weight parameters of the lower model LM in the memory MEM, the device 10000 can efficiently process speculative decoding. The memory MEM of the device 10000 according to the third example of the present disclosure can provide the parameters of the upper model UM to the NPU when the NPU infers the upper model UM, and can provide the parameters of the lower model LM to the NPU when it infers the lower model LM.

For example, during the speculative decoding operation, the device 10000 can set the address map of the memory MEM to allocate memory banks where the weight parameters of the upper model UM and the lower model LM will be stored. Therefore, during the speculative decoding operation, all the weight parameters of the upper model UM and the lower model LM can reside in the memory MEM. That is, the capacity of the memory MEM of the device 10000 according to the third example of the present disclosure may be larger than the total capacity occupied by the first weight parameters of the upper model UM and the second weight parameters of the lower model LM. If the memory MEM of the device 10000 does not have the memory capacity to store the upper model UM and the lower model LM, it may be difficult to process speculative decoding quickly in real time. That is, the capacity of the memory MEM may be determined considering the size of the parameters of the upper model UM and the lower model LM to be driven on the device 10000. If all the parameters of the upper model UM and the lower model LM are not stored in the memory MEM, a conventional device must read the weight parameters of each model from an external storage device for speculative decoding. In this embodiment, the conventional device must command unnecessary memory read and memory write operations for speculative decoding, so the token generation speed may be lower than the token generation speed of the device 10000 according to the third example of the present disclosure.

The first memory MEM1 of the device 200 according to the second embodiment of the first example of the present disclosure is configured to store the weight parameters of the upper model UM and the tokens generated by the upper model UM when the device 200 is operating.

The second memory MEM2 of the device 200 according to the second embodiment of the first example of the present disclosure is configured to store the weight parameters of the lower model LM and the tokens generated by the lower model when the device 200 is operating. If all the weight parameters of the upper model UM and the lower model LM are stored in the first memory MEM1 and the second memory MEM2, the device 200 can efficiently process speculative decoding. To elaborate, the size of the weight parameters of the upper model UM and the lower model LM may be quite large, and it may be difficult to store them all on a single memory chip. In this case, the device 200 can increase the memory capacity by configuring a plurality of memories.

The first memory MEM1 of the device 200 according to the second embodiment of the first example of the present disclosure is configured to provide the parameters of the upper model UM to the NPU when the NPU infers the upper model UM, and the second memory MEM2 is configured to provide the parameters of the lower model LM to the NPU when it infers the lower model LM.

For example, during the speculative decoding operation, the device 200 can set the address map of each of the first memory MEM1 and the second memory MEM2 to allocate memory banks where the weight parameters of the upper model UM and the lower model LM will be stored. Therefore, during the speculative decoding operation, all the weight parameters of the upper model UM and the lower model LM can reside in the first memory MEM1 and the second memory MEM2.

Accordingly, the capacity of the plurality of memories (MEM1, MEM2) of the device 200 according to the second embodiment of the first example of the present disclosure is configured to be larger than the total capacity occupied by the weight parameters of the upper model UM and the lower model LM. Therefore, the weight parameters of the upper model UM and the lower model LM can reside in the plurality of memories (MEM1, MEM2). If the capacity of the plurality of memories (MEM1, MME2) of the device 200 is insufficient for the upper model UM and the lower model LM, it may be difficult to efficiently process speculative decoding.

If all the parameters of the upper model UM and the lower model LM are not stored in the plurality of memories (MEM1, MEM2), a conventional device must read the weight parameters of each model from an external storage device for speculative decoding. Accordingly, the conventional device commands unnecessary memory read and memory write operations for speculative decoding. Accordingly, the token generation speed of the conventional device is lower than the token generation speed of the device 200 according to the second embodiment of the first example of the present disclosure.

In summary, FIG. 19 to FIG. 20 illustrate speculative decoding according to a third example of the present disclosure. The speculative decoding method according to the third example of the present disclosure may be performed in the device 10000 described with reference to FIGS. 3 to 18. To support such efficient on-device speculative decoding, the device 10000 according to the present disclosure can lay the foundation through the following optimized hardware architecture and system configuration.

That is, the device 10000 according to the present disclosure includes a low-power NPU (NPU 100 of FIG. 3) core architecture, and the low-power NPU core architecture has a separate structure of an integer operation-centric processing core (P_CORE 120 of FIG. 3) and a special function unit (SFU 150 of FIG. 3) for processing floating-point operations and complex functions. The special function unit 150 is configured to include, in particular, dedicated hardware accelerators for functions essential for softmax and attention operations, such as exponential and reciprocal functions supporting various activation functions. These include, for example, circuits (e.g., NEXP of FIG. 30, RECIP of FIG. 28) included in the vector function approximation unit (V_FuncApx 1537 in FIG. 5) or scalar function approximation unit (S_FuncApx 1545 in FIG. 6) within the SFU 150, and a programmable function approximation unit (e.g., PAF circuit of FIGS. 24 and 25).

Accordingly, the device 10000 includes a large-capacity on-device memory system, and the memory system includes a main memory (e.g., external DRAM, see 2000 of FIG. 9 or 2000-1~2000-N of FIG. 10) with sufficient capacity to store all the weights of the LLM and even the weights of an auxiliary model that may be used for speculative decoding, and an on-chip shared memory (e.g., SRAM, see 400 of FIG. 11 or 400-1~400-N of FIG. 12) with sufficient capacity for high-speed access and reuse of frequently used weights and intermediate activation values. Accordingly, the memory system may have a hierarchical structure.

Therefore, through the optimized hardware configuration of this NPU core 100 and memory system, NPU acceleration-based speculative decoding may be effectively implemented. According to the above-described configuration, it is not a simple sum of individual technologies, but the optimized NPU core 100 is organically combined with a large-capacity memory system (e.g., 2000, 400) and a speculative decoding algorithm, providing a synergistic effect that enables the execution of large-scale language models, which previously required server-level computing power, in a complete on-device form without response delay while reducing energy consumption. This can enable the implementation of a practical server-independent AI agent.

In summary, a low-power on-device large language model (LLM) inference system according to the present disclosure can achieve the above effects by including the following elements: a processing core 120 that performs integer-based matrix operations on input data; a special function unit 150 that performs floating-point-based special operations (including exponential, reciprocal, and programmable function approximation) on the result of the integer operation, wherein the special operations are optimized for attention and activation function processing of the LLM: a main memory 2000 that stores the entire weights of the LLM and at least one auxiliary model weight for speculative decoding; an on-chip shared memory 400 that temporarily stores frequently accessed data by the processing core 120 or the SFU 150 to increase data reusability; and a controller (e.g., the controller 110 within the NPU 100 or a system-level control unit including it) that controls the processing core 120, the SFU 150, the main memory 2000, and the on-chip shared memory 400 to perform a speculative decoding operation including candidate token generation using the auxiliary model and candidate token verification using the LLM. Through this system configuration, it is possible to complete the inference of the LLM with low power without the help of an external server.

The ability of the system according to the present disclosure to efficiently perform speculative decoding is not simply because the operation speed of the NPU 100 is fast. This may be a significant synergistic effect that occurs because the unique hierarchical/distributed memory system proposed by the present disclosure (see FIG. 11 to FIG. 15) is co-designed to match the unique data access pattern of the speculative decoding algorithm.

Speculative decoding is a technique that accelerates token generation by using an upper model UM with a large number of parameters and a lower model LM with a small number of parameters together. In this process, fast and frequent data exchange between the weights of the two models and the intermediate operation results (such as KV cache) is essential. In a conventional single memory structure, a serious memory bottleneck can occur in the process of swapping the parameters of the two large models, which can degrade the efficiency of the algorithm.

The system of the present disclosure may adopt a multi-layered memory structure to solve this problem. For example, in embodiments such as FIG. 13 or FIG. 15, the entire weights of the upper model UM, which are relatively less frequently accessed but have a huge size, can reside in a large-capacity external main memory (2000-1, . . . , 2000-N) or a dedicated NPU memory (11400) within an AI module (11000). At the same time, data such as the weights of the lower model LM and the KV cache of both models, which must be accessed very frequently during the inference process, may be cached or stored in an ultra-high-speed on-chip shared memory (SRAM) (400-1, . . . , 400-N).

This intelligent data placement strategy is possible because of the hierarchical memory structure provided by the hardware architecture of the present disclosure. This can support the data access requirements of the speculative decoding algorithm (some data accessed very quickly, other data less quickly) at the hardware level, reducing unnecessary data movement and latency. That is, the hardware architecture and the software algorithm are not independently optimized, but are organically combined to enhance each other's advantages, which can contribute to improving the AI inference performance of the entire system.

Hereinafter, a fourth example of the present disclosure will be described. The fourth example of the present disclosure describes the circuit configuration and operation method of the vector function approximation unit V_FuncApx and the scalar function approximation unit S_FuncApx shown in FIG. 5 and FIG. 6.

Figure 21:
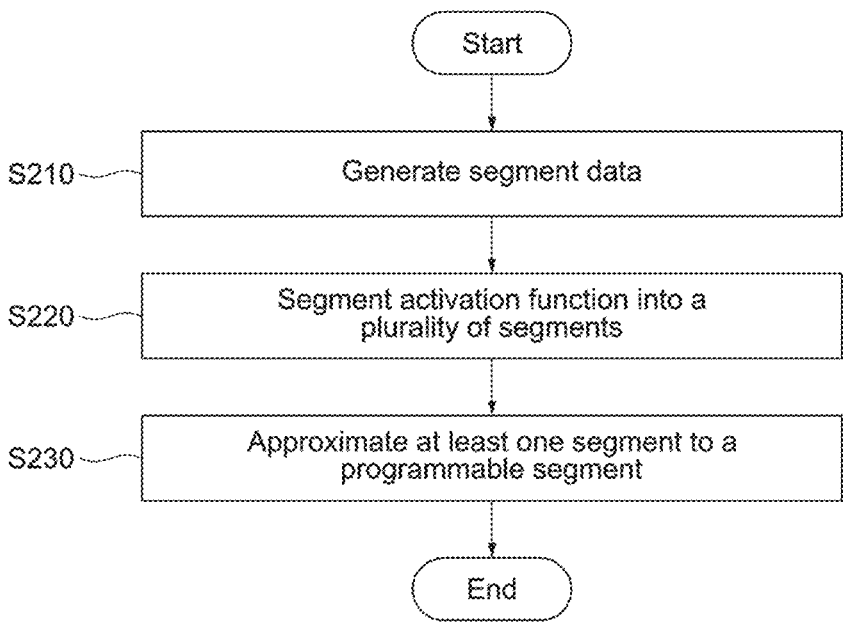
FIG. 21 is a flowchart illustrating an activation function programming method according to a first embodiment of a fourth example of the present disclosure.

FIG. 21 illustrates an activation function programming method according to a first embodiment of a fourth example of the present disclosure.

Referring to FIG. 21, the operation of the vector function approximation unit 1537 and the scalar function approximation unit 1545 will be described. The vector function approximation unit 1537 and the scalar function approximation unit 1545 are configured to process a programmed activation function to be described later.

In a neural network model, the activation or inhibition of a signal is determined based on the signal strength propagated between layers, as governed by an activation function. The inference accuracy of the neural network model can vary depending on the implementation method of the activation function within the NPU 100 described in the fourth example of the present disclosure. In other words, both the inference accuracy and processing efficiency of the neural network model may be affected by the specific hardware characteristics of the activation function processing circuitry embedded in the NPU 100. The precision, granularity, and approximation method used to realize the activation function in hardware can all influence the final inference results and computational resource utilization.

To address this, an activation function programming method according to the first embodiment of the fourth example of the present disclosure comprises: (i) generating segment data used for partitioning an activation function (step S210); (ii) dividing (segmenting) the activation function into a plurality of segments based on the generated segment data (step S220); and (iii) approximating at least one of the segments among the plurality of segments as a programmable segment (step S230). Through this process, an activation function can be transformed into a format suitable for hardware-level approximation while retaining sufficient fidelity for neural network inference tasks.

The activation function programming method may be carried out by an activation function conversion program. The activation function conversion program may be implemented in the form of a computer program, software, firmware, application, or executable code that is stored in a non-transitory computer-readable recording medium. This program (not shown) may be designed to generate a transformed or programmed version of an activation function using programmable parameters that define the segmented and approximated function shape. Furthermore, the activation function conversion program may be configured as part of a neural network model compiler (not shown), thereby enabling integration into the compilation workflow used to generate executable models for the NPU 100.

In the step S210, segment data is generated. Segment data, which is data generated to segment a specific activation function into a plurality of segments, will be described later.

In the step S220, the activation function is segmented into a plurality of segments using the generated segment data. In the present disclosure, the term "segment" means a part of an activation function divided into a plurality of sections and is distinguished from "candidate segment" or "programmable segment," which are terms related to the approximation of an activation function.

The step S220 may include determining both the number and the respective widths of a plurality of segments based on the segment data. In this step, the activation function targeted for conversion is partitioned into multiple segments, and the segment data may be used to define the total number of segments as well as the width of each individual segment. At least one of the segments among the plurality may have a width that is either equal to or different from the widths of the other segments. In other words, the segmentation may be uniform or non-uniform, depending on the characteristics of the activation function and the desired level of approximation fidelity or computational efficiency. The segmentation strategy can be adaptively configured to allocate finer granularity to regions of the activation function that exhibit high curvature or are otherwise sensitive to approximation error.

The respective segments of the plurality of segments may be represented by coordinate values defining the start and end points along the X-axis of the activation function domain. That is, each segment may be defined by a pair of X-axis coordinates indicating the boundaries of the segment interval. Once the number of segments and the width of each segment are determined, the corresponding segment boundary coordinates may be automatically derived.

In the step S230, at least one segment among the plurality of segments is approximated into a programmable segment. The programmable segment may be programmed in accordance with the circuit architecture of the V_FuncApx 1537 and the S_FuncApx 1545. Specifically, the activation function conversion program may be configured to generate a programmable representation of the activation function that is tailored to the hardware capabilities of the V_FuncApx 1537 and the S_FuncApx 1545 within the NPU 100. A programmable parameter may be generated during the step S230, and such a parameter may be formatted to align with the functional specifications and data format requirements of the respective circuit implementations. For instance, the V_FuncApx 1537 and the S_FuncApx 1545 may include hardware components that are configured to execute each programmable segment based on a specified slope and offset. The activation function conversion program may therefore be provided with configuration data or hardware description information relating to the functional design of the V_FuncApx 1537 and the S_FuncApx 1545, enabling generation of compatible programmable segments.

In this context, the activation function conversion program (not shown) may approximate a programmable segment using a function of a defined type, such as a linear, quadratic, or higher-order polynomial function, depending on the desired approximation accuracy and hardware constraints. For example, under a specified decision criterion, a given segment may be approximated as a linear function. In such cases, the activation function conversion program may generate a programmable segment that is expressed in the form of a linear equation, such as "(slope a)×(input value x)+ (offset b)." The specific slope and offset used in this equation may serve as the programmable parameters that define the segment's behavior. Therefore, for a segment that is determined to be approximated using a linear function, the step S230 may include deriving and assigning values for a particular slope and offset to characterize the linear approximation of the selected segment.

The steps S220 and S230 may be substantially performed as a single step. This is because the step of segmenting a segment and the step of generating programmable parameters of the corresponding programmable segment can be performed simultaneously. To elaborate, the steps S220 and S230 may be modified to be a step of segmenting an activation function into a plurality of segments using generated segment data, and approximating at least one segment among the plurality of segments into a programmable segment.

Meanwhile, the process of generating the optimal segment data (e.g., boundary values and widths of segments) and deriving the optimal programmable parameters to approximate each segment, particularly the activation function programming method, may be performed in a systematic and automated manner by replacing it with a deep learning model's learning problem according to another embodiment of the present disclosure.

Conventionally, the process of finding the optimal approximation parameters relied on empirical or complex numerical analysis, making it difficult to guarantee the optimal approximation for all nonlinear functions. However, in the present disclosure, a small-scale artificial neural network optimized for expressing a piecewise linear function can be utilized. Through this artificial neural network, learning may be conducted to most accurately mimic the target activation function to be approximated.

Figure 23:
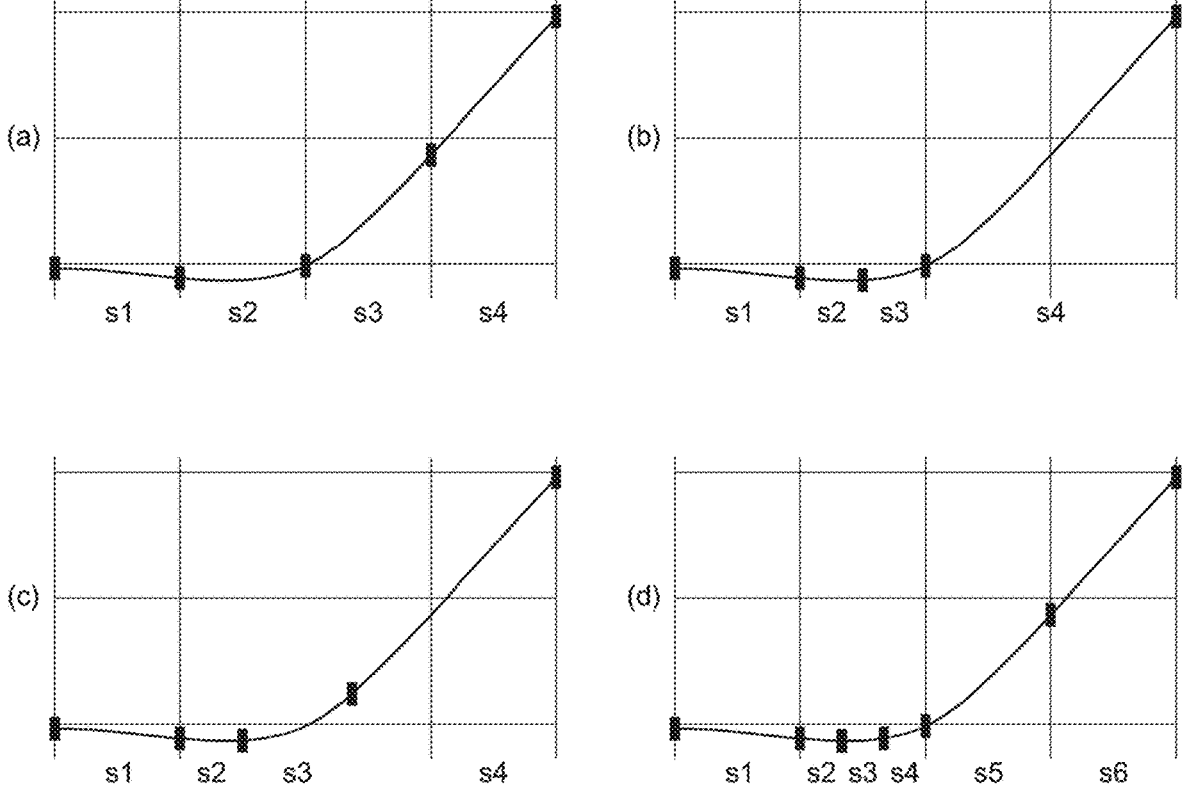
FIG. 23 is a graph illustrating various cases of segmenting an activation function into a plurality of segments by the activation function programming method according to the first embodiment of the fourth example of the present disclosure.

During the learning process, the artificial neural network optimizes its internal weights and biases in a direction that minimizes a loss function, and in this process, the optimal division points (break points) that best represent the non-linear characteristics of the target function and the linear relationship of each interval are automatically determined. Once learning is complete, a set of programmable parameters, including segment boundary values (SB), the slope A and offset B of each segment, etc., in a form that may be directly used by the programmable function approximation circuit PAF, may be finally extracted from the optimized parameters of the artificial neural network. Through this deep learning-based approach, it is possible to automatically derive the optimal segments with various widths and numbers according to the characteristics of the function, as shown in FIG. 23, and to generate the most accurate approximation parameters thereof.

Figure 22:
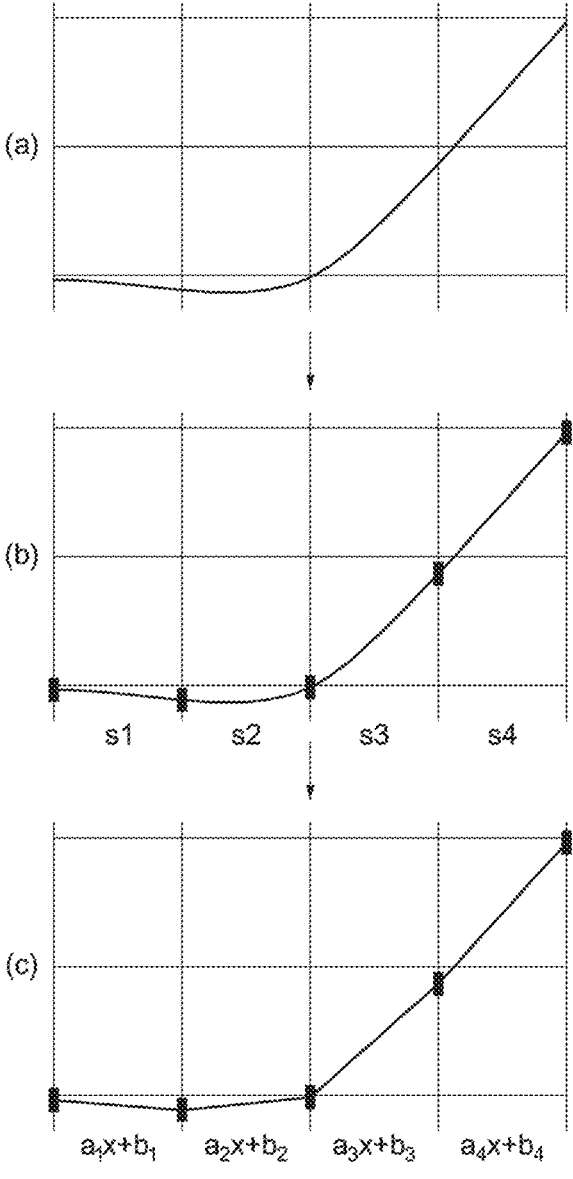
FIG. 22 is a graph illustrating a process in which an activation function is approximated by the activation function programming method according to the first embodiment of the fourth example of the present disclosure.

FIG. 22 includes three graphs (a), (b), and (c) to illustrate a process in which an activation function is approximated by the activation function programming method according to the first embodiment of the fourth example of the present disclosure.

The activation function shown in (a) of FIG. 22 is segmented into a plurality of segments (s1, s2, s3, s4) using segment data as shown in (b) of FIG. 22. The plurality of segments (s1, s2, s3, s4) are approximated by programmable segments (a1x+b1, a2x+b2, a3x+b3, a4x+b4) as shown in (c) of FIG. 22. Here, an example is described in which the activation function conversion program (not shown) generates programmable parameters so that all programmable segments correspond to a linear function.

Each programmable segment includes corresponding programmable parameters. In (c) of FIG. 22, all of the plurality of segments have been approximated by programmable segments in the form of a linear function. However, in various examples, some of the plurality of segments may be approximated by other forms of programmable segments. For example, the activation function conversion program (not shown) can program each programmable segment in the form of a linear function, a quadratic function, a cubic function, a logarithmic function, etc.

For example, only the segments (s1, s3, s4) may be approximated by programmable segments, and the segment s2 may be approximated using various methods available in the device where the activation function is to be processed. Specifically, if a pre-determined and stored lookup table, a nonlinear approximation formula, etc., are available in the hardware in the interval of the segment s2, the segment s2 may be approximated using such a pre-determined and stored lookup table, a nonlinear approximation formula, etc.

In other words, the activation function conversion program (not shown) may be configured to program each of the segments (s1, s2, s3, s4) independently. At this time, the activation function conversion program (not shown) is provided with the hardware configuration information of the vector function approximation unit 1537 and the scalar function approximation unit 1545. The activation function conversion program (not shown) may be configured to independently determine the approximation method for each of the segments (s1, s2, s3, s4) based on the hardware configuration information of the vector function approximation unit 1537 and the scalar function approximation unit 1545.

For example, each of the vector function approximation unit 1537 and the scalar function approximation unit 1545 may be designed to include at least one of a linear function approximation circuit, a quadratic function approximation circuit, a reciprocal function approximation circuit, a root mean square function approximation circuit, and a negative exponential function approximation circuit. In this case, the activation function conversion program (not shown) can selectively program at least one of each of the segments (s1, s2, s3, s4) in the form of a linear function, a quadratic function, a reciprocal function, a root mean square function, and a negative exponential function.

For example, each of the vector function approximation unit 1537 and the scalar function approximation unit 1545 may be configured to include a circuit configured to support at least one specific function operation. In this case, the activation function conversion program (not shown) can program each of the segments (s1, s2, s3, s4) in the form of a corresponding specific function.

For example, the vector function approximation unit 1537 and the scalar function approximation unit 1545 may be configured to include at least one of a hardware-designed linear function operation circuit, a quadratic function operation circuit, a reciprocal function operation circuit, a root mean square function operation circuit, and a negative exponential function operation circuit, or a similar function operation circuit.

For example, the activation function conversion program (not shown) can program the same activation function in different ways.

For example, the activation function conversion program (not shown) can program a specific activation function only with a linear function.

For example, the activation function conversion program (not shown) can program a specific activation function only with a quadratic function.

For example, the activation function conversion program (not shown) can program a specific activation function only with a reciprocal function.

For example, the activation function conversion program (not shown) can program a specific activation function only with a root mean square function.

For example, the activation function conversion program (not shown) can program a specific activation function only with a negative exponential function.

For example, the activation function conversion program (not shown) can program each of a plurality of segments of a specific activation function with a corresponding approximation function.

For example, the activation function conversion program (not shown) can program a plurality of segments of a specific activation function with a set of approximation functions of different formulas.

For example, the programmed activation function to be processed in the vector function approximation unit 1537 and the scalar function approximation unit 1545 according to the first embodiment of the fourth example of the present disclosure may include at least one of Swish, Mish, Sigmoid, Hyperbolic Tangent (Tanh), Scaled Exponential Linear Unit (SELU), Gaussian Error Linear Unit (GELU), Softplus, Rectified Linear Unit (ReLU), Leaky ReLU, Maxout, Exponential Linear Unit (ELU), Hard Sigmoid, Hard Tanh, Bent Identity, ArcTan, Softsign, Sinusoidal Activation, S-shaped Rectified Linear Unit (SReLU), Parametric Rectified Linear Unit (PReLU), Logistic Activation, Radial Basis Function (RBF), Binary Step, Reciprocal, Root mean square, Reciprocal root mean square, and Negative exponential. Each programmed activation function may be converted into programmable parameters and provided to the neural processing unit 100.

FIG. 23 includes four graphs (a), (b), (c), and (d) to illustrate various cases of segmenting an activation function into a plurality of segments by the activation function programming method according to the first embodiment of the fourth example of the present disclosure.

Referring to (a) of FIG. 23, a specific activation function may be segmented to have 4 segments and a uniform width.

Referring to (b) of FIG. 23, a specific activation function may be segmented to have 4 segments and different widths.

Referring to (c) of FIG. 23, a specific activation function may be segmented to have 4 segments and different widths.

Referring to (d) of FIG. 23, a specific activation function may be segmented to have 6 segments and different widths.

The number of the plurality of segments and the width of each of the plurality of segments may be determined using the segment data.

The activation function conversion program (not shown) may be configured to analyze the nonlinearity of the activation function and segment the plurality of segments with different widths. However, the present disclosure is not limited thereto.

The activation function conversion program (not shown) may be configured to analyze the nonlinearity of the activation function and segment each of the plurality of segments with an optimal width. However, the present disclosure is not limited thereto.

In the present disclosure, the activation function may be implemented in various forms including characteristic intervals. When segmenting an activation function into a plurality of segments, the number and width of the plurality of segments may be variously determined according to the various forms of the activation function.

For example, various activation functions such as the swish function, Mish function, sigmoid function, hyperbolic tangent (tanh) function, SELU function, Gaussian Error Linear Unit (GELU) function, SOFTPLUS function, ReLU function, Leaky ReLU function, Maxout function, ELU function, etc., have various forms divided into a plurality of characteristic intervals including (substantially) linear intervals and/or nonlinear intervals. Accordingly, when approximating a nonlinear activation function to be processable in hardware, if segmentation is performed considering these characteristic intervals, that is, if the number and width of segments are determined considering the (substantially) linear intervals, nonlinear intervals, etc., the activation function may be more efficiently approximated corresponding to the characteristics of each activation function.

Figure 24:
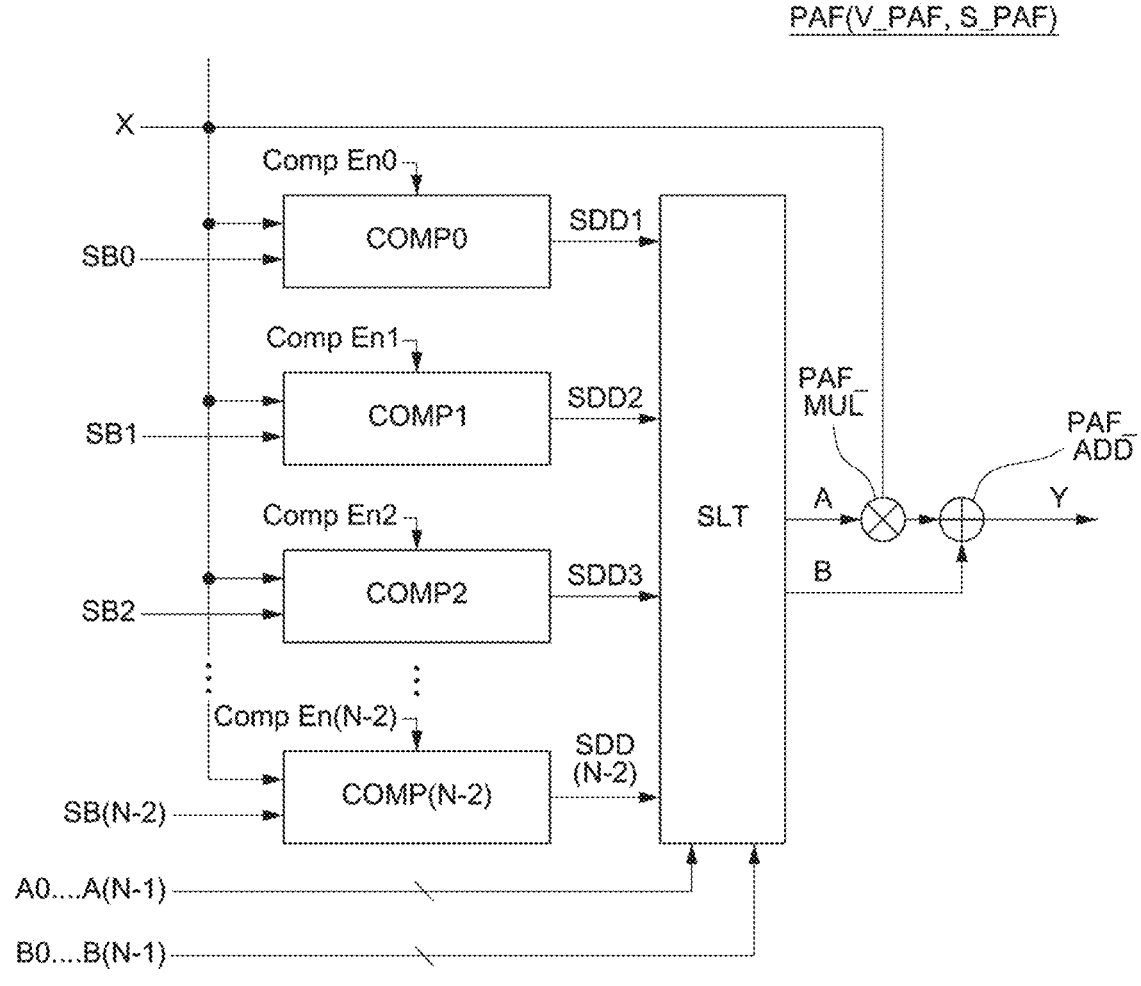
FIG. 24 is a diagram illustrating a function approximation circuit of a neural processing unit configured to process a programmed activation function according to a second embodiment of the fourth example of the present disclosure.

FIG. 24 illustrates a function approximation circuit (PAF) of a neural processing unit configured to process a programmed activation function according to a second embodiment of the fourth example of the present disclosure.

The programmable function approximation circuit PAF according to the second embodiment of the fourth example of the present disclosure shown in FIG. 24 may correspond to the vector function approximation circuit V_PAF of the vector function approximation unit 1537 of FIG. 5 and the scalar function approximation circuit S_PAF of the scalar function approximation unit 1545 of FIG. 6. Hereinafter, for convenience of explanation, the vector function approximation circuit V_PAF and the scalar function approximation circuit S_PAF will be collectively referred to as the programmable function approximation circuit PAF to describe the second embodiment of the fourth example of the present disclosure.

Specifically, the programmable function approximation circuit PAF according to the second embodiment of the fourth example of the present disclosure shown in FIG. 24 is an example of a circuit configured to process an activation function programmed as a linear function.

The programmable function approximation circuit PAF configured to process an activation function programmed as a linear function may be configured to include a plurality of comparators (COMP0 to COMP(N–2)), a selector SLT, a multiplier PAF_MUL, and an adder PAF_ADD. However, the present disclosure is not limited thereto, and it is also possible to configure the circuit in various ways to distinguish the regions of each segment. In addition, it is also possible for the programmable function approximation circuit PAF to be modified to further include additional circuit configurations to process activation functions with programming methods other than a linear function.

The coordinates of the start and end points of the interval of the plurality of segments are defined as segment boundary values (SB). That is, the interval of each of the plurality of segments may be determined by the segment boundary values (SB0 to SB(N–2)). For example, to define the interval of N segments, N–1 segment boundary values (SB0 to SB(N–2)) may be required.

Each of the plurality of comparators (COMP0 to COMP(N–2)) compares the input value X with each of the plurality of segment boundary values (SB0 to SB(N–2)). Accordingly, the interval of the segment to which the input value X belongs among the intervals of the plurality of segments may be determined through the comparison value output from each of the plurality of comparators (COMP0 to COMP(N–2)). The output value output from each of the plurality of comparators (COMP0 to COMP(N–2)) described above may be referred to as segment determination data SDD. The selector SLT outputs the slope A for the programmable segment corresponding to the interval of the segment to which the input value X belongs among the plurality of slopes (A0 to A(N–1)) for the plurality of programmable segments, according to the segment determination data (SDD0 to SDD(N–2)). The selector SLT outputs the offset B for the programmable segment corresponding to the interval of the segment to which the input value X belongs among the plurality of offsets (B0 to B(N–1)) for the plurality of programmable segments, according to the segment determination data (SDD0 to SDD(N–2)).

When a specific segment is determined based on the segment determination data SDD, the slope A and offset B of the determined segment may be output from the selector SLT. That is, the programmable parameters include the slope A and offset B for each of the programmable segments. The slope A is multiplied by the input value X in the multiplier PAF_MUL, and the offset B is added to the output value of the multiplier PAF_MUL in the adder PAF_ADD. That is, the output of the multiplier PAF_MUL may be expressed as $A \times X$, and the output of the adder PAF_ADD may be expressed as $A \times X + B$.

Meanwhile, the operation of each of the plurality of comparators (COMP0 to COMP(N–2)) may be determined by each of the plurality of comparator enable signals (Comp En 1 to Comp En (N–2)). For example, even when the activation function conversion program (not shown) programs the same activation function, a first programmed activation function may be programmed to have ten segments, and a second programmed activation function may be programmed to have five segments. Therefore, the programmable function approximation circuit PAF can control the number of comparators activated in the programmable function approximation circuit PAF differently according to each programmed activation function data, even for the same activation function. Therefore, the accuracy of the artificial neural network operation and the power consumption of the neural processing unit 100 can also vary depending on the programming. That is, it is also possible to provide a high-performance activation function operation function or a low-power activation function operation function for the same activation function according to the user's requirements.

Meanwhile, depending on the maximum number of segment boundary values (SB), the number of comparators that receive them as input must also vary. For example, if the maximum number of segment boundary values (SB) is ten, at least ten comparators may be required. That is, the minimum number of comparators may be the maximum number of segment boundary values.

Accordingly, the operation of each of the plurality of comparators (COMP0 to COMP(N–2)) may be determined by each of the plurality of comparator enable signals (Comp En 1 to Comp En (N–2)). Therefore, by controlling the operation of unnecessary comparators according to the number of the plurality of segments, the power consumption of the neural processing unit 100 may be reduced.

However, due to hardware limitations, the number of comparators may be limited. Accordingly, the number of the plurality of segments for segmenting the activation function may be limited according to the number of comparators of the programmable function approximation circuit PAF.

Meanwhile, according to the first embodiment of the fourth example of the present disclosure, it is possible to distinguish between the linear interval and the nonlinear interval of the activation function, and it is possible to minimize the number of segments by providing a variable segment width while reducing the error value. Therefore, there is an advantage in that the hardware gate count of the programmable function approximation circuit PAF of the neural processing unit 100 may be minimized by reducing the number of comparators.

In addition, the activation function programming method according to the first embodiment of the fourth example of the present disclosure may be configured to program a specific activation function based on the information of the maximum supportable number of comparators.

Meanwhile, the selector SLT may be a multiplexer composed of a plurality of switching elements, but the configuration of the selector SLT may be variously changed. The programmed activation function operation unit of the programmable function approximation circuit PAF may refer to a circuit configured to operate on the output value Y by receiving the input value X, the slope A, and the offset B. The programmed activation function operation unit of the programmable function approximation circuit PAF may be configured to include at least one multiplier PAF_MUL and an adder PAF_ADD. The programmed activation function operation unit of the programmable function approximation circuit PAF may be a hard-wired circuit. In particular, if the programmable function approximation circuit PAF is a hard-wired circuit, the programmable function approximation circuit PAF can process the approximation operation on a clock-by-clock basis by simply inputting the programmable parameters without complex instructions.

Meanwhile, the configuration in which the programmable function approximation circuit PAF according to the present disclosure stores programmable parameters (A, B, C, etc.) and uses them through a selector SLT may appear similar to a conventional lookup table (LUT) method in appearance. However, the parameter storage and utilization method of the present disclosure has the following fundamental differences from the conventional LUT method in its technical idea and operation principle.

First, the nature of the stored data is different. A conventional LUT stores the 'final approximation result value' or 'representative value for interpolation' for a specific input interval. This is a passive data table for the purpose of looking up and retrieving a pre-calculated result value according to an input address. On the other hand, the programmable parameters stored in the present disclosure are not result values, but 'Coefficients' (i.e., programmable parameters) for controlling a hard-wired operation unit in real time.

Second, the role and operation method of the data are different. The conventional LUT method is a "lookup-centric" operation that reads a value from memory. In contrast, the present disclosure is a "computation-centric" architecture that directly performs polynomial operations such as Ax+B by supplying the operation coefficients selected through the selector SLT to a "direct computation engine" composed of a multiplier PAF_MUL and an adder PAF_ADD in real time. That is, the parameter storage unit of the present disclosure functions as an active "coefficient register file" that dynamically configures the operation circuit, which is one of the technical features of the present disclosure that is clearly distinguished from a conventional LUT.

In particular, the programmable parameters (A0 . . . . A(N–1), B0 . . . B(N–1), etc.) have an important technical feature in that they are constant values pre-generated off-line through the deep learning-based optimization method described above.

That is, these parameters, which are finally determined through learning, are not changed at the execution time when the NPU performs the actual inference operation, and are pre-stored in a designated memory or coefficient register within the programmable function approximation circuit PAF. Therefore, when performing an operation, the NPU can immediately load and process these pre-optimized constant values without a complex calculation process, thereby eliminating additional operation overhead and improving the speed of the function approximation operation.

In addition, the function approximation unit FuncApx of the present disclosure has a structure that can reuse one programmable function approximation circuit PAF for approximating several different types of dedicated functions (e.g., reciprocal, square root reciprocal, negative exponential, etc.). The effect of this structure may be increased when combined with the learning-based parameter generation method described above. The hardware is equipped with only an area-efficient single programmable function approximation circuit PAF, and by selectively loading and using a pre-learned optimal constant parameter set (i.e., a programmable parameter set) according to the function to be processed, it eliminates the inefficiency of designing a separate approximation circuit for each function and increases the utilization of hardware resources while simultaneously securing high accuracy and flexibility.

Meanwhile, the means for storing the programmable parameters (slope A, offset B, etc.) used by the PAF circuit of the present disclosure has a fundamental difference from a conventional lookup table (LUT) in its purpose and operation method.

A conventional LUT stores the "final approximation result value" for a specific input interval, and is a passive memory table that looks up the corresponding result value according to the input address. In contrast, the means for storing parameters in the present disclosure can function as an active coefficient register file (CRF) or an equivalent on-chip memory.

That is, the value stored here is not a final result value, but a "coefficient" for controlling a hard-wired operation unit (multiplier, adder) in real time. The selector SLT can read the operation coefficients corresponding to the determined segment from this register file and supply them to the "direct computation engine." Therefore, this circuit is a "computation-centric" architecture that directly calculates the result by performing arithmetic operations such as Ax+B on the input value, which is clearly distinguished from the "Lookup-centric" conventional LUT method.

Figure 25:
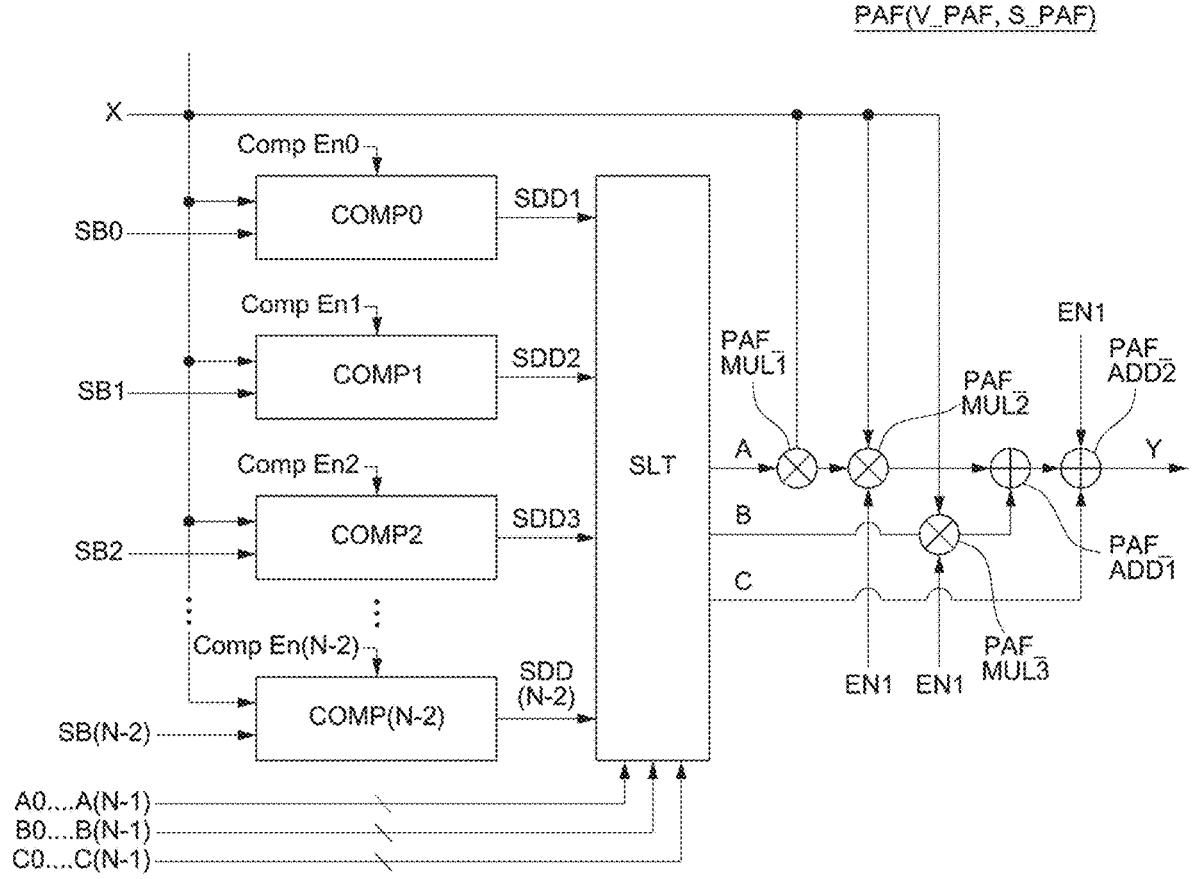
FIG. 25 is a diagram illustrating a function approximation circuit of a neural processing unit configured to process a programmed activation function according to a third embodiment of the fourth example of the present disclosure.

FIG. 25 illustrates a function approximation circuit of a neural processing unit configured to process a programmed activation function according to a third embodiment of the fourth example of the present disclosure.

The programmable function approximation circuit PAF according to the third embodiment of the fourth example of the present disclosure shown in FIG. 25 may correspond to the vector function approximation circuit V_PAF of the vector function approximation unit 1537 of FIG. 5 and the scalar function approximation circuit S_PAF of the scalar function approximation unit 1545 of FIG. 6. Hereinafter, for convenience of explanation, the vector function approximation circuit V_PAF and the scalar function approximation circuit S_PAF will be collectively referred to as the programmable function approximation circuit PAF to describe the third embodiment of the fourth example of the present disclosure.

In describing the programmable function approximation circuit PAF of FIG. 25, overlapping descriptions with the programmable function approximation circuit PAF of FIG. 24 may be omitted for convenience of explanation.

Specifically, the programmable function approximation circuit PAF according to the third embodiment of the fourth example of the present disclosure shown in FIG. 25 is an example of a circuit configured to process an activation function programmed as a quadratic function.

Accordingly, the coefficients (A, B, C) for the programmable segment described above may include a coefficient of quadratic term A, a coefficient of linear term B, and an offset (C).

The programmable function approximation circuit PAF according to the third embodiment of the fourth example of the present disclosure may be configured to include a plurality of comparators (COMP0 to COMP(N–2)), a selector SLT, a plurality of multipliers (PAF_MUL1, PAF_MUL2, PAF_MUL3), and a plurality of adders (PAF_ADD1, PAF_ADD2).

Each of the plurality of comparators (COMP0 to COMP(N–2)) compares the input value X calculated in at least one processing core P_CORE with each of the plurality of segment boundary values (SB0 to SB(N–2)).

Accordingly, the interval of the segment to which the input value X belongs among the intervals of the plurality of segments may be determined through the output value output from each of the plurality of comparators (COMP0 to COMP(N–2)).

Meanwhile, the operation of each of the plurality of comparators (COMP0 to COMP(N–2)) may be determined by each of the plurality of comparator enable signals (Comp En 1 to Comp En (N–2)).

The selector SLT can output the coefficients (A, B, C) for the programmable segment corresponding to the interval of the segment to which the input value X belongs, among the coefficients (A0 to A(N–1), (B0 to B(N–1)), (C0 to C(N–1))) for the plurality of programmable segments, according to the segment determination data (SDD0 to SDD(N–2)).

Specifically, a pre-stored coefficient set or coefficient register can provide the coefficient of the quadratic term (A0 to A(N–1)), the coefficient of the linear term (B0 to B(N–1)), and the offset (C0 to C(N–1)) for each of the plurality of programmable segments to the selector SLT.

The selector SLT can determine the interval of the segment to which the input value X belongs among the intervals of the plurality of segments according to the segment determination data (SDD0 to SDD(N–2)) output from each of the plurality of comparators (COMP0 to COMP(N–2)).

The selector SLT can output the coefficient of the quadratic term A, the coefficient of the linear term B, and the offset C for the programmable segment corresponding to the interval of the determined segment among the coefficient of the quadratic term (A0 to A(N–1)), the coefficient of the linear term (B0 to B(N–1)), and the offset (C0 to C(N–1)) for the plurality of programmable segments.

Accordingly, the selector SLT can output the coefficient of the quadratic term A, the coefficient of the linear term B, and the offset C for the programmable segment corresponding to the interval of the segment to which the input value X belongs.

The programmed activation function operation unit of the programmable function approximation circuit PAF may refer to a circuit configured to operate on the output value Y by receiving the input value X, the coefficient of the quadratic term A, the coefficient of the linear term B, and the offset C.

The programmed activation function operation unit of the programmable function approximation circuit PAF may be configured to include a plurality of multipliers (PAF_MUL1, PAF_MUL2, PAF_MUL3) and a plurality of adders (PAF_ADD1, PAF_ADD2) to process a quadratic function or a linear function.

The programmed activation function operation unit of the programmable function approximation circuit PAF may be a hard-wired circuit.

The plurality of multipliers of the programmed activation function operation unit may include a first multiplier PAF_MUL1, a second multiplier PAF_MUL2, and a third multiplier PAF_MUL3.

The first multiplier PAF_MUL1 multiplies the input value X by the coefficient of the quadratic term A for the programmable segment corresponding to the interval of the segment to which the input value X belongs.

Specifically, the first multiplier PAF_MUL1 multiplies the input value X calculated in at least one processing core P_CORE by the coefficient of the quadratic term A for the programmable segment output from the selector SLT.

Accordingly, the first multiplier PAF_MUL1 can output the product of the coefficient of the quadratic term A for the programmable segment and the input value X. That is, the output of the first multiplier PAF_MUL1 may be expressed as A×X.

The second multiplier PAF_MUL2 multiplies the output value output from the first multiplier PAF_MUL1 by the input value X.

Specifically, the second multiplier PAF_MUL2 multiplies the input value X calculated in at least one processing core P_CORE by the output value output from the second multiplier PAF_MUL2.

Accordingly, the output of the second multiplier PAF_MUL2 may be expressed as A×X2. However, the above-described configuration is only one example for implementing A×X2, and it is also possible to be modified and implemented through various circuit combinations.

The third multiplier PAF_MUL3 multiplies the input value X by the coefficient of the linear term B for the programmable segment corresponding to the interval of the segment to which the input value X belongs.

Specifically, the third multiplier PAF_MUL3 multiplies the input value X calculated in at least one processing core P_CORE by the coefficient of the linear term B for the programmable segment output from the selector SLT.

Accordingly, the third multiplier PAF_MUL3 can output the product of the coefficient of the linear term B for the programmable segment and the input value X. That is, the output of the third multiplier PAF_MUL3 may be expressed as B×X.

The plurality of adders may include a first adder PAF_ADD1 and a second adder PAF_ADD2.

The first adder PAF_ADD1 adds the output value of the second multiplier PAF_MUL2 to the output value of the third multiplier PAF_MUL3.

Specifically, the first adder PAF_ADD1 can output the sum of the quadratic term and the linear term of each of the plurality of programmable segments composed of a quadratic term. That is, the output of the first adder PAF_ADD1 may be expressed as A×X2+B×X.

The second adder PAF_ADD2 adds the offset C for the programmable segment corresponding to the interval of the segment to which the input value X belongs to the output value of the first adder PAF_ADD1.

Specifically, the adder PAF_ADD adds the offset C for the programmable segment to the sum of the quadratic term and the linear term of the programmable segment composed of a quadratic term. That is, the output of the second adder PAF_ADD2 may be expressed as A×X2+B×X+C.

Accordingly, the adder PAF_ADD can output an activation value to which an activation function programmed as a quadratic function is applied to the operation value which is the input value X.

According to the above-described configuration, the programmable function approximation circuit PAF operates to be able to process a quadratic polynomial.

Meanwhile, the operation of the second multiplier PAF_MUL2, the third multiplier PAF_MUL3, and the second adder PAF_ADD2 may be controlled by a first enable signal EN1.

Specifically, when the second multiplier PAF_MUL2, the third multiplier PAF_MUL3, and the second adder PAF_ADD2 do not operate due to the first enable signal EN1, the operation is as described below.

The first multiplier PAF_MUL1 multiplies the input value X by the coefficient of the quadratic term A for the programmable segment corresponding to the interval of the segment to which the input value X belongs.

Specifically, the first multiplier PAF_MUL1 multiplies the input value X calculated in at least one processing core 120 by the coefficient of the quadratic term A for the programmable segment output from the selector SLT.

Accordingly, the first multiplier PAF_MUL1 can output the product of the coefficient of the quadratic term A for the programmable segment and the input value X. That is, the output of the first multiplier PAF_MUL1 may be expressed as A×X.

Since the second multiplier PAF_MUL2 and the third multiplier PAF_MUL3 do not operate, the output of the first multiplier PAF_MUL1 is input to the first adder PAF_ADD1 as it is. That is, the operator deactivated by the first enable signal EN1 may be bypassed.

The first adder PAF_ADD1 adds the coefficient of the linear term B for the programmable segment corresponding to the interval of the segment to which the input value X belongs to the output value of the first multiplier PAF_MUL1.

Specifically, the first adder PAF_ADD1 adds the coefficient of the linear term B for the programmable segment to the value obtained by multiplying the coefficient of the quadratic term A for the programmable segment by the input value X. That is, the output of the first adder PAF_ADD1 may be expressed as A×X+B.

Since the second adder PAF_ADD2 does not operate, the output of the first adder PAF_ADD1 is output as it is. That is, the operator deactivated by the first enable signal EN1 may be bypassed.

That is, the first adder PAF_ADD1 can output an activation value to which an activation function programmed as a linear function is applied to the operation value which is the input value X.

According to the above-described configuration, the programmable function approximation circuit PAF operates to be able to process a linear polynomial.

As described above, some configurations of the plurality of multipliers and the plurality of adders may be controlled by the first enable signal EN1. Accordingly, according to the first enable signal EN1, the programmable function approximation circuit PAF may be driven not only when each of the programmable segments is a quadratic polynomial, but also when each of the programmable segments is a linear polynomial.

To elaborate, the programmable function approximation circuit PAF pipelined with at least one processing core 120 according to an example of the present disclosure may also be configured with a hard-wired circuit configured to implement both activation functions programmed as a quadratic function and a linear function.

Therefore, there is an advantage that various cases of PAF may be processed with one programmable function approximation circuit PAF.

Meanwhile, the programmable function approximation circuit PAF may include not only a plurality of comparators (COMP0 to COMP(N−2)), a selector SLT, a plurality of multipliers (PAF_MUL1, PAF_MUL2, PAF_MUL3), and a plurality of adders (PAF_ADD1, PAF_ADD2), but also a logarithmic operator.

Figure 26:
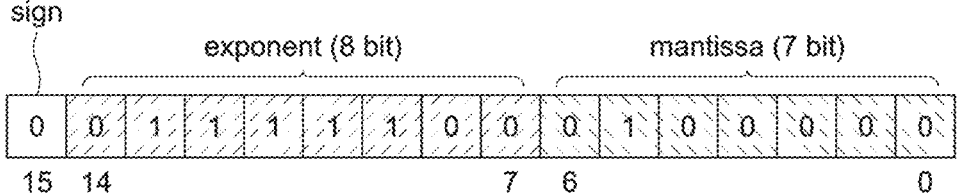
FIG. 26 is a diagram illustrating an example of a number system processed in a special function unit of a neural processing unit applicable to examples of the present disclosure.

FIG. 26 illustrates an example of a number system processed in a special function unit of a neural processing unit applicable to examples of the present disclosure.

The special function unit 150 of the neural processing unit 100 according to examples of the present disclosure is designed to be processed with at least one floating-point number system.

For example, the special function unit 150 may be designed to process floating-point numbers. Referring to FIG. 26, a floating-point number is expressed in the brain floating 16 format. Referring to FIG. 26, the BF16 format floating-point number system includes a sign bit S, an exponent bit E, and a mantissa bit M.

However, the number system of the special function unit 150 according to examples of the present disclosure can also use the IEEE standard 754, and other number systems may be applied for the operation efficiency of the special function unit 150, reduction of memory usage, reduction of power consumption, etc. However, examples of the present disclosure are not limited thereto, and dynamic floating-point, variable precision floating-point (VPFP), custom floating-point (CFP), flexible floating-point (FFP), etc., may be applied. Therefore, the bit width allocation of the exponent part and the bit width allocation of the mantissa part may be varied according to the number system supported by the special function unit 150 of the neural processing unit 100.

For example, when the special function unit 150 according to examples of the present disclosure is configured to use the FP32 number system, the special function unit 150 is configured to recognize the 31st bit of the weight parameter, input parameter, and output parameter as the sign bit S, the 23rd bit to the 30th bit as the exponent bit E, and the 0th bit to the 22nd bit as the mantissa bit M.

For example, when the special function unit 150 according to examples of the present disclosure is configured to use the FP16 number system, the special function unit 150 is configured to recognize the 15th bit of the weight parameter, input parameter, and output parameter as the sign bit S, the 10th bit to the 14th bit as the exponent bit E, and the 0th bit to the 9th bit as the mantissa bit M.

For example, when the special function unit 150 according to examples of the present disclosure is configured to use the brain floating 16 (BF16) number system, the special function unit 150 is configured to recognize the 15th bit of the weight parameter, input parameter, and output parameter as the sign bit S, the 7th bit to the 14th bit as the exponent bit E, and the 0th bit to the 6th bit as the mantissa bit M.

This may be expressed by Equation 5.

$$x = (-1)^s \times m \times 2^e \qquad \text{Equation 5}$$

Here, x is the input in floating-point format, s means the sign of the input (x), e means the exponent part of the input (x), and m denotes the mantissa part of the input (x). The bias of BF16 is 127, and the range of the actual value of the exponent part is −126 to +127. The actual exponent value may be derived by subtracting the bias from the stored exponent.

Figure 27:
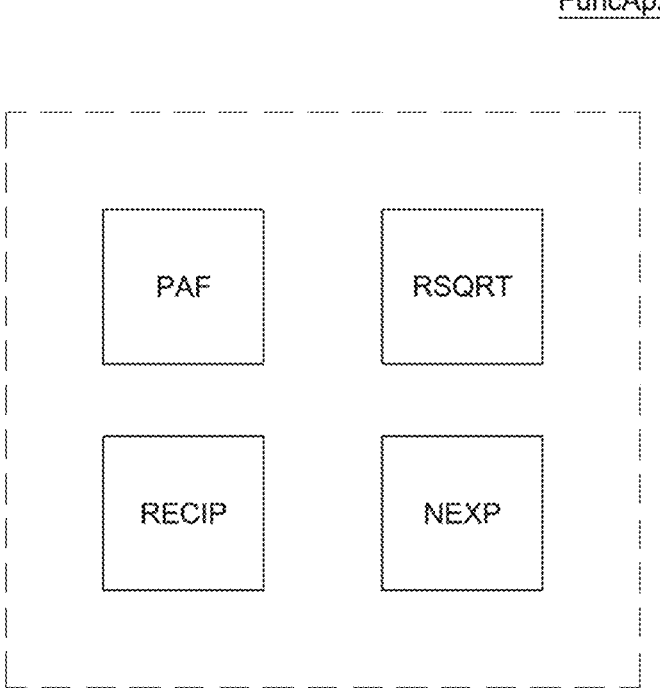
FIG. 27 is a block diagram illustrating a function approximation unit according to a fourth embodiment of the fourth example of the present disclosure.

FIG. 27 illustrates a function approximation unit (FuncApx) according to a fourth embodiment of the fourth example of the present disclosure.

The function approximation unit (FuncApx) according to the fourth embodiment of the fourth example of the present disclosure will be described with reference to FIGS. 5, 6, 24, 25, and Referring to FIG. 27, the function approximation unit FuncApx according to the fourth embodiment of the fourth example of the present disclosure may include a programmable function approximation circuit PAF, a reciprocal function circuit RECIP, a reciprocal of square root function circuit RSQRT, and a negative exponential function circuit NEXP. The circuits are individual circuits configured to independently process the operations of functions required for the attention score operation of an artificial intelligence model.

The function approximation unit FuncApx of FIG. 27 according to the fourth embodiment of the fourth example of the present disclosure may correspond to the vector function approximation unit V_FuncApx of FIG. 5 or the scalar function approximation unit S_FuncApx of FIG. 6. The programmable function approximation circuit PAF of FIG. 24 according to the fourth embodiment of the fourth example of the present disclosure may correspond to the programmable function approximation circuit PAF of FIG. 25 or the programmable function approximation circuit PAF of FIG. 27. The reciprocal function circuit RECIP of FIG. 27 according to the fourth embodiment of the fourth example of the present disclosure may correspond to the vector reciprocal function circuit V_RECIP of FIG. 5 or the scalar reciprocal function circuit S_RECIP of FIG. 6. The reciprocal of square root function circuit RSQRT of FIG. 27 according to the fourth embodiment of the fourth example of the present disclosure may correspond to the vector reciprocal of square root function circuit V_RSQRT of FIG. 5 or the scalar reciprocal of square root function circuit S_RSQRT of FIG. 6. The negative exponential function circuit NEXP of FIG. 27 according to the fourth embodiment of the fourth example of the present disclosure may correspond to the vector negative exponential function circuit V_NEXP of FIG. 5 or the scalar negative exponential function circuit S_NEXP of FIG. 6.

Each of the programmable function approximation circuit PAF, the reciprocal function circuit RECIP, the reciprocal of square root function circuit RSQRT, and the negative exponential function NEXP circuit is a respective hard-wired operation circuit. That is, when each of the circuits receives an input parameter, it can process the operation very quickly through the hard-wired operation circuit without complex instructions. That is, the function approximation unit FuncApx activates at least one circuit corresponding to the function to be processed. Subsequently, when the function approximation unit FuncApx provides an input parameter to the activated circuit, the function is calculated along the pipeline of the calculation circuit without complex instruction control. That is, each of the programmable function approximation circuit PAF, the reciprocal function circuit RECIP, the reciprocal of square root function circuit RSQRT, and the negative exponential function NEXP circuit is a dedicated operation circuit for the function corresponding to each circuit. To elaborate, a hard-wired operation circuit can only process pre-defined operations and lacks versatility, so it cannot process other operations. However, each of the programmable function approximation circuit PAF, the reciprocal function circuit RECIP, the reciprocal of square root function circuit RSQRT, and the negative exponential function NEXP circuit can process pre-defined operations quickly and with low power. In particular, since all of the operation circuits may be used for calculating the attention score, a Transformer-based artificial intelligence model can be operated quickly.

For example, the function approximation unit FuncApx may be designed to process the function approximation operation by activating only the programmable function approximation circuit PAF. For example, the programmable function approximation circuit PAF can process at least one of Swish, Mish, Sigmoid, Hyperbolic Tangent (Tanh), Scaled Exponential Linear Unit (SELU), Gaussian Error Linear Unit (GELU), Softplus, Rectified Linear Unit (ReLU), Leaky ReLU, Maxout, Exponential Linear Unit (ELU), Hard Sigmoid, Hard Tanh, Bent Identity, ArcTan, Softsign, Sinusoidal Activation, S-shaped Rectified Linear Unit (SReLU), Parametric Rectified Linear Unit (PReLU), Logistic Activation, Radial Basis Function (RBF), Binary Step, Reciprocal, root mean square, and negative exponential by receiving programmable parameters.

Furthermore, the function approximation unit FuncApx may be designed to process the corresponding reciprocal function, square root function, and negative exponential function more precisely by activating one of the reciprocal function circuit RECIP, the reciprocal of square root function circuit RSQRT, and the negative exponential function NEXP circuit while activating the programmable function approximation circuit PAF.

The feature of the function approximation unit FuncApx described above lies in a Hybrid architecture for achieving both versatility and efficiency.

That is, the function approximation unit FuncApx may include a programmable function approximation circuit PAF to flexibly respond to new nonlinear functions that have various forms or may appear in the future, such as GELU and Swish, and dedicated function circuits for processing functions that are frequently used in neural network operations and have a fixed form, such as reciprocal RECIP, reciprocal of square root RSQRT, and negative exponential NEXP, with the highest speed and efficiency.

When the control unit 110 receives an instruction indicating the type of function to be processed, it can selectively activate either the PAF circuit or a specific dedicated function circuit accordingly. At this time, the other circuit blocks that are not activated may be power-gated or clock-gated to cut off the power supply and minimize unnecessary power consumption.

In addition, instead of each dedicated function circuit (RECIP, RSQRT, NEXP) having its own approximation operation circuit, one PAF circuit may be reused as a Shared Operation Unit. Each dedicated function circuit can preprocess the input value according to its own function characteristics (e.g., mantissa normalization), and then transfer the result to the common PAF circuit to delegate the approximation operation. At this time, the control unit may be configured to provide a pre-learned optimal programmable parameter set (P_PARA-1, P_PARA-2, etc.) for the corresponding function to the PAF circuit.

This structure can provide the effect of the present disclosure of maintaining high accuracy and performance through a pre-processing circuit and parameters optimized for each function, while dramatically reducing the hardware area compared to the method of implementing all of the complex approximation circuits for each function, and at the same time.

The programmable function approximation circuit PAF (see FIG. 24, 25, 27) included in the special function unit 150 of the present disclosure may be a strategic component that imparts the important value of 'Future-Proofing' to the entire system, beyond simply being a means of implementing a specific activation function. This can lead to a synergistic effect where the flexibility of the hardware guarantees the long-term life cycle and investment value of the system.

Artificial intelligence technology, especially neural network models, is advancing very rapidly, and even after ReLU, more efficient new activation functions such as GELU, Swish, and Mish are continuously being proposed. If an AI accelerator were designed as fixed-function hardware that only processes a specific activation function (e.g., ReLU), the hardware could become technologically obsolete and lose its value when a new standard activation function emerges. This is a major risk factor for users who invest heavily in AI infrastructure.

The PAF circuit of the present disclosure can fundamentally solve this problem. The PAF circuit is not fixed to a specific function, but can approximate various forms of nonlinear functions as polynomials by loading a pre-calculated set of programmable parameters (e.g., slope, offset coefficients) off-line. This means that even if a new activation function such as 'Super-GELU' is developed in the future, there is no need to design and manufacture a new chip; instead, it is only necessary to calculate a new parameter set to approximate the corresponding function and apply it to the system through a software or firmware update.

As a result, the hardware-level flexibility of the PAF circuit can transform the AI system from a static hardware asset into a dynamic and adaptable platform. This may eliminate the risk of premature obsolescence of hardware due to rapid changes in AI technology and create a synergistic effect that protects the user's initial investment. This may be one of the technical features of the present disclosure that contributes to increasing the sustainability and economic feasibility of the system in the long term, beyond simply providing high operation speed.

Figure 28:
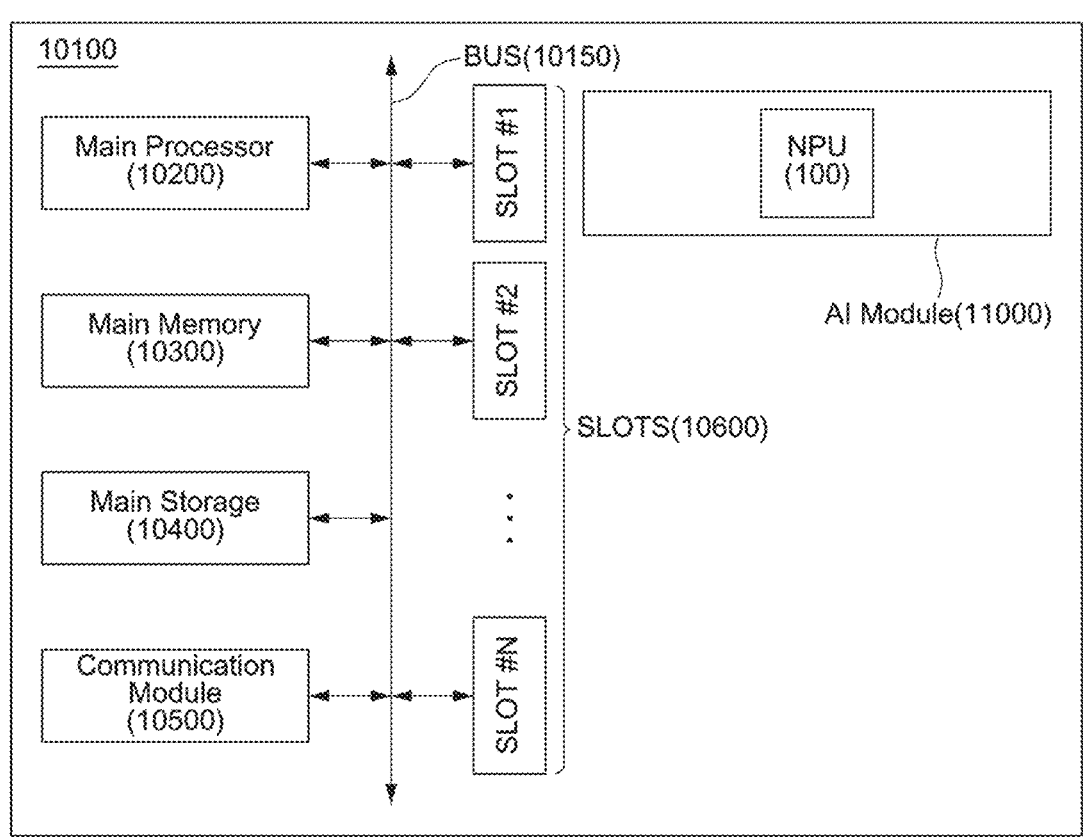
FIG. 28 is a diagram illustrating an AI system according to a first embodiment of a fifth example of the present disclosure.

FIG. 28 illustrates the basic architecture of an AI system 10000 according to a fifth example of the present disclosure.

Fifth Example: Scalable AI System Architecture

Hereinafter, a fifth example of the present disclosure will be described. This example relates to a scalable AI system 10000 that may be configured to efficiently infer specific data by utilizing the advantages of the NPU architecture described above (see FIG. 3). This system 10000 aims to overcome the limitations that GPU-based systems may have, such as high-power consumption, enormous cost, and large physical size. To this end, it aims to provide performance optimized for the requirements of various AI applications by actively utilizing the architectural advantages provided by an NPU 100 specialized for AI operations, that is, a structure optimized for specific operations, an efficient data flow, and an optimized memory hierarchy.

The most distinctive feature of this system 10000 may be said to be its modular expansion structure, which allows the overall AI operation performance of the system to be flexibly expanded or configured according to the user's needs through a plurality of slots and AI modules mounted therein. Components and Organic Interworking of the AI System Referring to FIG. 28, the AI system 10000 may be implemented in various forms, such as a tower-type case with a desktop structure or a server rack structure case, and at its center, a main board 10100 may be located, on which main components are mounted and a bus 10150 is arranged for mutual communication. The main board 10100 may include a main processor 10200 that can perform the role of the system's brain, a main memory 10300 that is used as the main workspace, a main storage device 10400 for permanent data storage, a communication module 10500 that is in charge of communication with the outside, and a plurality of slots 10600, which are elements that implement the scalability of this system.

The main processor 10200 may include a central processing unit (CPU) or an application processor (AP), and can play a role like a control tower that executes the operating system (OS) of the AI system 10000 and supervises the overall operation of the system. In particular, the main processor 10200 can analyze an AI operation request (query) received through the communication module 10500, efficiently allocate and control tasks to each AI module 11000 mounted in the plurality of slots 10600, and direct the process of delivering the completed operation results back to the user. If the number of AI modules 11000 increases and the system load becomes large, a configuration that increases the number of main processors 10200 to flexibly respond to this can also be considered.

The main memory 10300 and the main storage device 10400 may be important infrastructure that stores data essential for the operation of the AI system 10000. The main memory 10300 can typically be DRAM, and may be implemented with various memories such as ROM, SRAM, HBM, etc., as needed. The main storage device 10400 may comprise a large-capacity storage medium such as a hard disk drive (HDD) or a solid-state drive (SSD), and can permanently store not only the operating system and application programs, but also a specific neural network model required for AI operations and a compiler software that generates machine code optimized for each AI module 11000. This main storage device 10400 may be connected to the main board 10100 through a standard interface such as SATA, PCIe, NVMe, etc. When an AI application is executed, the data from the main storage device 10400 is loaded into the high-speed main memory 10300 and quickly accessed by the main processor 10200 and the AI module 11000, thereby enabling a smooth data flow throughout the system.

The communication module 10500 can play a role as a channel connected to the outside world through a wired/wireless network. Through this, the AI system 10000 can support the smooth performance of interactions, such as receiving various forms of AI service requests from users and transmitting the sophisticated inference results processed by the AI module 11000 back to the user.

The plurality of slots 10600 and the AI modules 11000 mounted therein, which are components of this example, may be called the heart of the system that determines its performance and scalability. The number of slots provided on the main board 10100 may be configured in various ways, say, from 4 to 32 or from 16 to 64, as needed. Each slot can support a standard interface such as M.2 or E1.S, providing a physical basis for easily mounting or detaching a standardized AI module 11000. In addition, each slot may be designed to operate at a low power of 30 W or less, preferably 25 W or 20 W or less, which can contribute to efficiently managing the overall power consumption of the system even when multiple modules are mounted.

Each AI module 11000 can include at least one NPU 100 described in detail in the preceding examples of the present disclosure, making it possible to provide high-efficiency inference performance specialized for AI operations. The operation performance of this NPU 100 may be designed to various levels such as 5 TOPS, 25 TOPS, 50 TOPS, etc., by applying the latest semiconductor micro-fabrication processes such as 7 nm, 5 nm, and further 2 nm, from existing processes such as 28 nm and 14 nm, and adjusting the number of processing elements or MAC operators included therein. This configuration can provide a basis for the overall AI operation performance of the AI system 10000 to be expanded in conjunction with the number of AI modules 11000 mounted in the plurality of slots 10600. For example, if an AI module 11000 providing 25 TOPS of operation performance is mounted in all eight slots, the AI system 10000 can secure a operation performance of a total of 200 TOPS. A user can have the flexibility to easily expand and extend the system without interruption by simply adding an AI module 11000 when higher performance is needed in the future, after initially building the system with a single module.

Superiority of NPU-Based Architecture and Fundamental Difference from GPU Architecture The NPU 100 included in the AI module 11000 of the present disclosure may appear similar to a GPU in that it processes AI operations, but due to the fundamental difference in its architecture, it can show essentially different characteristics in terms of processing speed and power efficiency in AI inference operations. A GPU is a general-purpose parallel processor originally designed to simultaneously process numerous independent pixels for graphics rendering, and due to this characteristic, it has a vast number of arithmetic cores and has strengths in high-precision floating-point (FP32, FP64) operations.

However, AI inference, especially neural network operations, is not simply a collection of parallel calculations, but has a structured data flow in which structured operations such as matrix multiplication, convolution, and activation function application are sequentially processed according to the layer order. The general-purpose SIMT (single instruction, multiple thread) architecture of a GPU may not always be optimally suited for this data flow specific to AI inference, which can cause unnecessary control overhead and inefficient data movement. In addition, a GPU may have a structure that constantly exchanges data between the arithmetic cores and a large, power-consuming external high-bandwidth memory (HBM, GDDR). This can make it difficult to utilize data locality in the AI inference process, causing a memory bottleneck phenomenon, and consequently increasing the time that the arithmetic cores are in an idle state waiting for data. As a result, an inefficiency can occur where the high theoretical operation performance (TOPS) figure of the GPU does not fully translate into actual AI inference speed.

On the other hand, the NPU 100 architecture according to the present disclosure can aim to fundamentally solve this inefficiency. The NPU 100 may be designed to be specialized only for AI inference operations. For example, it has a heterogeneous pipeline structure where operations such as matrix multiplication, which account for the majority of the operation amount, are exclusively handled by a processing core 120 optimized for low-power integer (INT8, INT4) operations, and complex nonlinear operations that require the precision of floating-point, such as activation functions and normalization, are processed by a separate special function unit 150. This can eliminate unnecessary control overhead and improve operation efficiency by allocating hardware optimized for each operation, compared to the GPU method of processing all operations with general-purpose cores. This may be much more efficient than the GPU method of processing all operations with general-purpose cores. In terms of data flow, the NPU 100 can also improve data reusability through a hierarchical memory structure such as on-chip SRAM or dedicated LPDDR memory within the module, and can minimize unnecessary external memory access by placing the data required for operations as close as possible to the operation unit.

This can dramatically reduce the time and power consumed for data movement, providing the potential to achieve superior power efficiency (TOPS/W) compared to a GPU for the same amount of operation. In conclusion, it may be difficult to say that a GPU with a higher TOPS than the NPU 100 necessarily guarantees better performance in the same neural network model inference. This is because the architectural efficiency of the NPU 100, which has optimized everything from data flow, memory access, to the type of operation unit for the specific purpose of AI inference, has the potential to provide substantially faster and more efficient performance by overwhelming the inherent inefficiency that occurs in the general-purpose structure of the GPU.

Software Support and Application Scenarios

This AI system 10000 can provide high usability not only with optimized hardware but also with software support. A compiler that may be included in the system can perform the function of taking a neural network model developed with widely used AI frameworks such as TensorFlow, PyTorch, ONNX, etc., as input and converting it into optimized machine code that can be most efficiently executed on the NPU 100 mounted on the AI module 11000 of this system. In this process, it is possible for the compiler to improve the processing efficiency on the NPU 100 by applying model lightweighting techniques such as quantization and pruning.

In addition, if the once-compiled machine code is stored in the main storage device 10400, it may be supported to be immediately loaded and executed quickly and stably without the compilation process when the same AI application is executed later.

Through the organic combination of such hardware and software, the AI system of the present disclosure can provide a scalable and flexible AI infrastructure platform that customers can consider applying to specific application fields.

Customers can use this AI system to conceive various services such as intelligent control based on AI video analysis, smart factories, and retail analysis. For example, a scenario of implementing a system based on facial recognition or fingerprint recognition using various image classification models such as Mobilenet, ResNet, VGG, and Inception for intelligent access control and security is possible. In addition, for traffic analysis in smart cities or customer movement analysis in stores, object detection models such as YOLO, SSD, and Faster R-CNN may be used to identify vehicles or people in real time, and may be used to continuously monitor the movement of a specific object by linking with tracking models based on DeepSORT or Siamese networks. In the medical field, it can contribute to assisting doctors' diagnosis by precisely segmenting specific organs or lesions in CT or MRI images in pixel units using models such as U-Net or Mask R-CNN, DeepLab, or to improving driving safety by precisely segmenting various objects such as roads, lanes, and pedestrians in autonomous driving systems. Furthermore, a smart fitness solution that analyzes the user's exercise posture and provides real-time feedback may be developed through pose estimation models such as OpenPose and HRNet, or a system that automatically detects specific events such as a pedestrian falling or a goal in a soccer game from surveillance video and notifies the administrator may be built by combining a CNN and RNN or a 3D CNN. Furthermore, it is also possible to provide an auxiliary device for the visually impaired that explains the content of an image taken with a camera, such as "a group of people playing soccer in a field," in voice by driving an image-to-text model that combines a CNN and a transformer or RNN.

In addition, through AI sound analysis, customers can consider implementing next-generation voice-based interfaces and intelligent auditory analysis solutions. It is possible to provide an AI assistant that controls devices with voice commands or an automatic meeting minutes system that converts meeting contents into text in real time and organizes them by distinguishing speakers, using high-performance speech recognition models based on transformers such as DeepSpeech, WaveNet, Whisper, and wav2vec. By utilizing sound detection models based on CNN and RNN and acoustic feature analysis such as Mel-frequency cepstral coefficient (MFCC), a solution may be created that immediately detects abnormal sound sources such as gunshots, glass breaking sounds, and baby crying sounds in public places or sensitive facilities and links them with a security system. Voice biometric models such as i-vector and x-vector can enable safe and convenient financial services that perform self-authentication with the user's unique voice characteristics (pitch, tone, rhythm), and applying noise reduction models based on DNN or GAN can help build a communication system that guarantees clear call quality even in noisy environments. In addition, it is possible to automatically segment long audio recordings such as podcasts by speaker or topic to facilitate navigation using audio segmentation models based on Bayesian information criterion (BIC) or deep learning.

Especially in the field of natural language processing, this system, based on its performance, can support customers in developing innovative language-based AI services by efficiently utilizing large language models (LLMs) such as LLaMA and Chat-GPT. It is possible to consider developing an intelligent chatbot that can respond to customers 24 hours a day to automate customer support tasks, or implementing a virtual assistant with expertise in a specific field. In addition, it may be used to improve the efficiency of content creation by automatically generating various types of text such as marketing copy, blog posts, and social media posts according to given keywords or topics, and a real-time translation application that allows communication without language barriers in travel, business meetings, etc., may be provided using a transformer model trained on parallel corpora of multiple languages. It is also possible to build a knowledge management solution that dramatically shortens the time to acquire information by summarizing vast amounts of news articles, research papers, and legal documents to their core content. Furthermore, a next-generation search engine may be developed that accurately understands the user's question intent and generates direct answers beyond simple information retrieval, or a text completion function that recommends the next sentence appropriate for the context when writing an email may be provided. It can also be used for services such as social media monitoring or email spam filtering by classifying text into pre-defined labels such as sentiment and topic.

Finally, customers in the creative industry can consider innovating the way they visually implement ideas through image generation scenarios. By combining an image generation model such as Stable Diffusion, a text encoder based on a transformer such as CLIP, and a U-Net architecture, it can contribute to expanding the efficiency and possibilities of creative work by instantly generating high-quality concept art, illustrations, and visual designs with just a simple text prompt such as "a silver robot horse running on a green meadow."

Sixth Example: Implementation of AI Modules Applying Standard Form Factors and High-Density Packaging Hereinafter, a sixth example of the present disclosure relates to specific implementation forms of an AI module 11000 that may be mounted on the scalable AI system 10000 described in the fifth example. This example may include various embodiments applying industry standard form factors M.2 and E1.S, and further, high-density integration packaging technology for physically mounting SoC and memory, etc. The adoption of such standard form factors and packaging technology can increase the mass producibility of the AI module 11000 to achieve economics of scale, and contribute to improving AI performance under various physical constraints. Each embodiment of this sixth example may have its own independent configuration, and for convenience of explanation, overlapping content may be omitted. In addition, each embodiment may be modified and implemented by selectively combining or referencing the technical features of each other to suit various purposes and performances.

The modular scalability of the AI system according to the present disclosure means more than just providing a plurality of slots. This flexible and economical scalability is made possible for the first time because of the fundamental architectural efficiency of the NPU 100 mounted on the individual AI module 11000, which can correspond to a significant synergistic effect between the two technical features.

Specifically, the NPU 100 has a heterogeneous pipeline structure in which matrix multiplication, which accounts for the majority of the operation amount, is exclusively handled by a processing core 120 optimized for low-power integer operations, and complex nonlinear operations such as activation functions are processed by a separate special function unit 150. This operation-specialized design can eliminate unnecessary control overhead and improve power-to-performance (TOPS/W) compared to the GPU method of processing all operations with general-purpose cores. The AI module 11000 of the present disclosure may be designed to operate at a very low power of 25 W or less, preferably 20 W or less, based on this NPU 100.

This "low-power high-efficiency" characteristic of the individual module is a major prerequisite that enables the "high-density scalability" of the entire system. For example, integrating sixteen high-power GPUs of 1000 W class into one chassis is a very difficult engineering task that requires a massive power supply of 16 kW and a complex liquid cooling system. On the other hand, if sixteen AI modules of 25 W class of the present disclosure are mounted in the same chassis, the total power consumption is only 400 W, which may be sufficiently managed by a standard air-cooling method.

Therefore, the scalability of the present disclosure may not be the result of a physical configuration of simply arranging many slots, but may be the result of the architectural efficiency of the NPU solving the power and heat problems of individual modules, thereby making high-density module integration physically and economically feasible for the first time. That is, the chip-level architectural innovation can provide a clear synergistic effect that creates a new value of flexible scalability at the system level.

First Embodiment: AI Module Based on M.2 Form Factor

Figure 29:
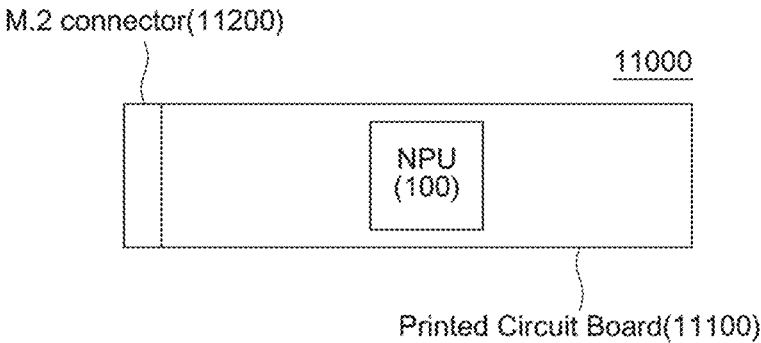
FIG. 29 is a diagram illustrating an M.2 AI module according to a first embodiment of a sixth example of the present disclosure.

FIG. 29 illustrates an M.2 AI module 11000 according to a first embodiment of a sixth example of the present disclosure.

This embodiment can aim to present the most basic implementation form of the AI module 11000 and show the possibility of AI acceleration in a small form factor. Referring to FIG. 29, the AI module 11000 of this embodiment may be configured with an M.2 form factor, which may include a printed circuit board 11100, an M.2 connector 11200 formed on one side of the board to handle physical and electrical connection with the mainboard slot, and a core operation unit, the NPU 100, mounted on the printed circuit board 11100. The M.2 interface supports several interfaces including Serial ATA (SATA) and Peripheral Component Interconnect Express (PCIe), and in the case of PCIe, high-speed data transmission is possible by utilizing several lanes such as ×2, ×4, etc. In addition, it is provided in various sizes (e.g., 2230, 2242, 2280, 22110) and may be flexibly applied to a wide range of devices such as laptops, desktops, and mini-PCs.

The effect of this embodiment lies in providing AI operation functionality with a low power consumption of about 10 W or less. This low-power characteristic is directly linked to the scalability of the AI system 10000 described in the fifth example and can create an important synergy. For example, if the AI system 10000 provides 20 M.2 slots and 15 M.2 AI modules 11000 are mounted therein, the AI system 10000 can perform AI operations with a relatively low power consumption of about 150 W. If one AI module 11000 has an operation performance of 25 TOPS, the AI system 10000 can secure a total AI operation performance of 375 TOPS, which can mean that it is possible to flexibly expand the AI operation performance with superior power efficiency compared to a GPU-based system.

Second Embodiment: M.2 AI Module Including NPU Dedicated Memory

Figure 30:
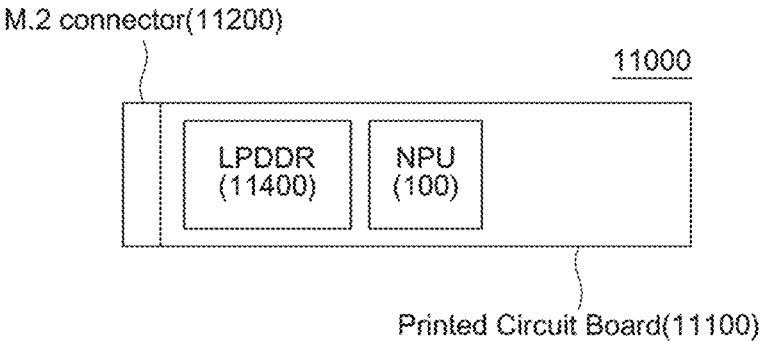
FIG. 30 is a diagram illustrating an M.2 AI module including an NPU and a dedicated memory according to a second embodiment of the sixth example of the present disclosure.

FIG. 30 illustrates an M.2 AI module 11000 according to a second embodiment of a sixth example of the present disclosure.

The second embodiment of the sixth example of the present disclosure is a modified embodiment, and for convenience of explanation, descriptions of overlapping content may be omitted. The second embodiment aims to improve the efficiency and autonomy of AI operations, going a step further from the configuration of the first embodiment.

As shown in FIG. 30, the AI module 11000 may include an NPU 100 and an NPU dedicated memory 11400 mounted together on the printed circuit board 11100. For example, the dedicated memory may be LPDDR. Integrating a large-capacity on-chip memory inside the NPU 100 may have the limitation of rapidly increasing the physical size and manufacturing cost of the chip. On the other hand, the parameter size of the latest neural network models is rapidly increasing to hundreds of megabytes or more, so it may be difficult to process with only the limited on-chip memory of the NPU 100, and it may be necessary to frequently use the main memory 10300 of the AI system 10000. However, since the main memory 10300 is shared with other elements of the system, it may be difficult to always stably guarantee the data bandwidth required by the NPU 100.

This embodiment can solve this problem by providing an NPU dedicated memory 11400, for example, an LPDDR memory with low-power characteristics, on the AI module 11000. As a result, the NPU 100 can stably secure an independent and high memory bandwidth without bus contention with other devices. By storing the entire parameters (weights, activation values, etc.) of a specific neural network model in this dedicated memory 11400, data exchange with the main memory 10300 of the AI system 10000 may be minimized and the operation performance of the AI module 11000 may be stably maintained regardless of external factors. This can also contribute to making the service transition between various AI applications fast and easy.

Third Embodiment: High-Performance M.2 AI Module with Multi-Channel Memory

Figure 31:
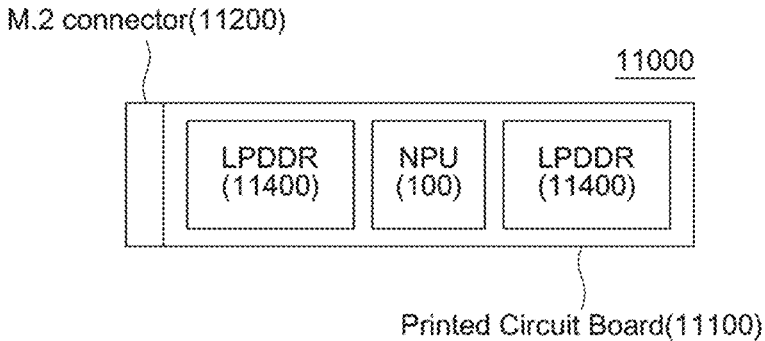
FIG. 31 is a diagram illustrating an M.2 AI module including an NPU and a plurality of NPU dedicated memories according to a third embodiment of the sixth example of the present disclosure.

FIG. 31 illustrates an M.2 AI module 11000 according to a third embodiment of a sixth example of the present disclosure.

The third embodiment of the sixth example of the present disclosure is a modified embodiment, and for convenience of explanation, descriptions of overlapping content may be omitted.

The third embodiment aims to provide a high-performance module optimized for specific application fields where memory bandwidth has a large impact on performance. As shown in FIG. 31, it may include a plurality of NPU dedicated memories 11400 corresponding to one NPU 100. The two NPU dedicated memories 11400 can improve the total memory bandwidth supplied to the NPU 100 by forming a multi-channel (e.g., dual-channel) memory configuration that uses, for example, four lanes provided by the PCIe interface by dividing them into two each.

The effect of this multi-channel memory configuration may be enhanced especially when the size of the parameters to be processed is vast, such as in large language models (LLMs) or high-resolution video processing, where the memory-bound phenomenon determines performance. Even with the same NPU 100 operation performance (TOPS), as the memory bandwidth doubles, it becomes possible to process data faster than a single memory configuration. As a result, it can lead to the effect of significantly improving the actual perceived performance, such as the token generation speed of a small language model (SLM).

Fourth Embodiment: E1.S AI Module Including a Plurality of NPUs

Figure 32:
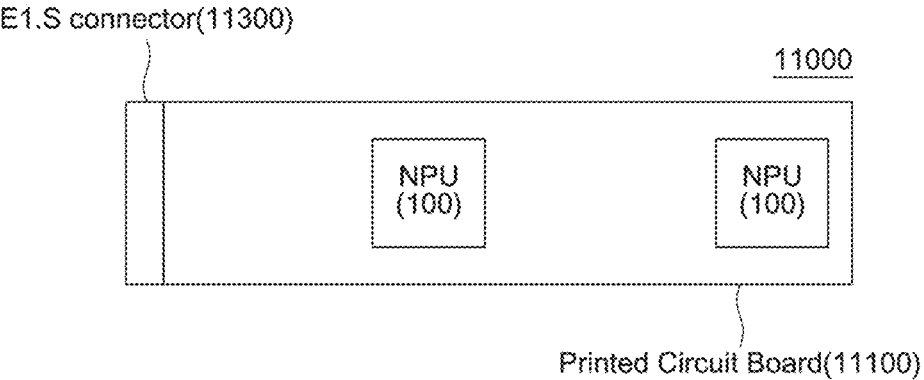
FIG. 32 is a diagram illustrating an E1.S AI module including a plurality of NPUs according to a fourth embodiment of the sixth example of the present disclosure.

FIG. 32 illustrates an E1.S AI module 11000 according to a fourth embodiment of a sixth example of the present disclosure.

The fourth embodiment of the sixth example of the present disclosure is a modified embodiment, and for convenience of explanation, descriptions of overlapping content may be omitted.

The fourth embodiment aims to provide an AI module 11000 suitable for data center and enterprise environments that require higher performance and integration than M.2. For this, the E1.S form factor may be utilized. The E1.S interface may be said to be a form factor designed as a standardized high-density solution for data center and enterprise storage systems, and can support high-speed data transmission by utilizing various lanes (×2, ×4, ×8, etc.) of the PCIe interface. An E1.S module generally has a rectangular shape with a height of 1 U (about 44.45 mm), and the width may be up to 14 mm and the length may be configured in various ways up to 300 mm or more. Since it is physically larger than M.2 and allows for higher power consumption (e.g., 20 W or less), it is possible to integrate a larger number of NPUs 100 on one module.

Referring to FIG. 32, the E1.S AI module 11000 of this embodiment may include a plurality of NPUs 100 (for example, two NPUs) along with an E1.S connector 11300 on a printed circuit board 11100. The effect of this configuration is that even if the same NPU chip is used, the operation performance of one AI module may be theoretically expanded up to twice that of an M.2-based module. For example, a configuration of mounting two NPUs 100 with a power consumption of 10 W or less on a 20 W-class E1.S module 11000 is possible. This presents an effective method of systematically expanding the performance of an AI module by standardizing it simply by changing the form factor.

Fifth Embodiment: Multi-NPU E1.S AI Module with Dedicated Memory

Figure 33:
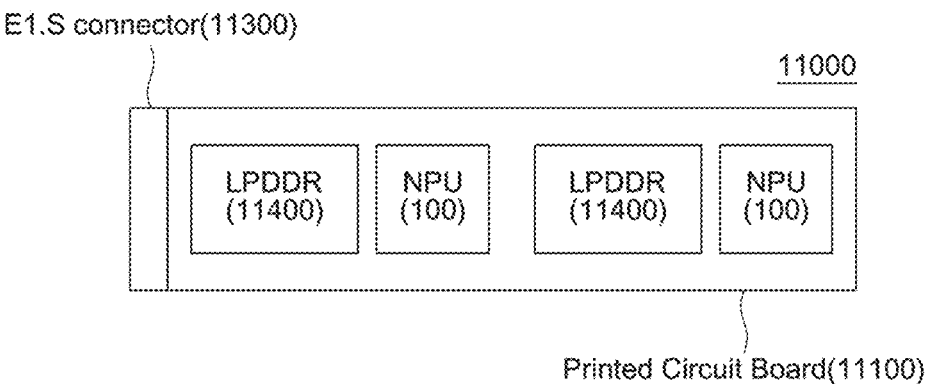
FIG. 33 is a diagram illustrating an E1.S AI module including a plurality of NPUs and NPU dedicated memories according to a fifth embodiment of the sixth example of the present disclosure.

FIG. 33 illustrates an E1.S AI module 11000 according to a fifth embodiment of a sixth example of the present disclosure.

The fifth embodiment of the sixth example of the present disclosure is a modified embodiment, and for convenience of explanation, descriptions of overlapping content may be omitted.

This embodiment is based on the configuration of the fourth embodiment and aims to prevent potential performance degradation that may occur when a plurality of NPUs 100 operate at maximum performance simultaneously and to ensure stable parallel processing. As shown in FIG. 33, it may include one NPU dedicated memory 11400 corresponding to each of the plurality of NPUs 100 in the E1.S module 11000.

Referring to FIG. 33, through the structural feature where each NPU 100 has its own independent dedicated memory 11400, the effect of preventing the two NPUs 100 from interfering with each other's memory access paths even when they perform operations simultaneously may be obtained. This structure can fundamentally prevent memory contention between NPUs and ensure that each NPU 100 can stably exert its maximum processing performance. This can contribute to stably maintaining the processing performance of the entire module. This can provide a particularly important advantage in scenarios where each NPU 100 processes independent AI applications in parallel.

Sixth Embodiment: E1.S AI Module with Enhanced Performance

Figure 34:
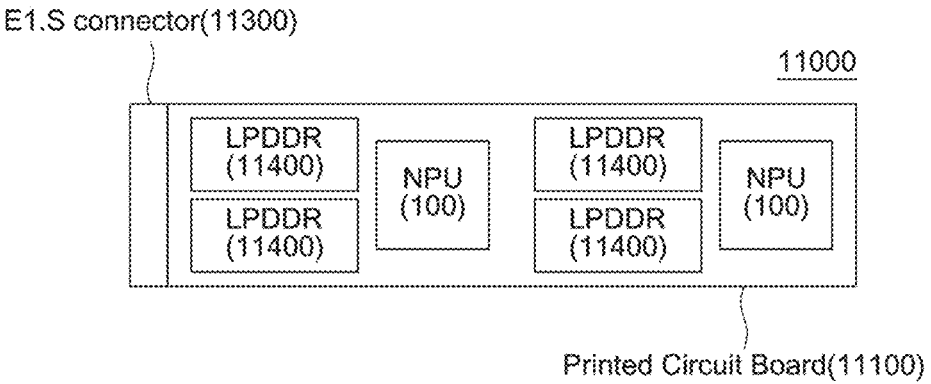
FIG. 34 is a diagram illustrating an E1.S AI module including a plurality of NPUs and a plurality of NPU dedicated memories according to a sixth embodiment of the sixth example of the present disclosure.

FIG. 34 illustrates an E1.S AI module 11000 according to a sixth embodiment of a sixth example of the present disclosure.

The sixth embodiment of the sixth example of the present disclosure is a modified embodiment, and for convenience of explanation, descriptions of overlapping content may be omitted.

The sixth embodiment is a configuration that aims to improve the performance of the module unit by maximizing the space and power advantages provided by the E1.S form factor. As shown in FIG. 34, the E1.S module 11000 may include a plurality of NPU dedicated memories 11400 corresponding to each of the two NPUs 100. That is, each NPU 100 will have a multi-channel memory configuration as described in the third embodiment. For example, a method is possible where each NPU 100 divides a total of eight lanes of the PCIe interface into four lanes each to configure a multi-channel memory.

This configuration has an important effect in that it is a form that maximizes both the operation performance (multiple NPUs) and the memory bandwidth (dual channel per NPU) within the AI module 11000. This can provide a suitable solution for high-performance AI systems that need to process large-scale AI models on a single module or process multiple AI models simultaneously at high performance.

Seventh Embodiment: High-Density Integration Packaging Based on Standard Layout The seventh embodiment of the sixth example of the present disclosure is a modified embodiment, and for convenience of explanation, descriptions of overlapping content may be omitted.

The seventh embodiment aims to present a packaging method that efficiently implements a high-performance AI module through a standard component arrangement in a form factor with relatively ample space, such as E1.S. Referring to FIG. 17, a system on chip (SoC) that performs AI operations and a plurality of memories (MEM) for data storage may be arranged in a standard grid form within the package 5000. Since the E1.S form factor provides a wider mounting area than M.2, it is possible to arrange an SoC and up to four or more memory chips without difficulty. For example, when the size of the SoC is 4.50 mm×4.85 mm and the memory size is 6.43 mm×5.30 mm, mounting them on an E1.S board may be sufficiently feasible in terms of space. The effect of this embodiment is that by utilizing the physical advantages of E1.S, the performance of the AI module (especially memory capacity and bandwidth) may be easily improved by integrating a large number of memories in a standard way without complex layout technology. This packaging technology may be applied with various semiconductor packaging methods such as fan-in, fan-out, package on package (POP), and 2.5D package methods, which can affect the integration and performance of the system.

Eighth Embodiment: Space-Optimized Packaging Through Rotated Multi-Chip Layout The eighth embodiment of the sixth example of the present disclosure is a modified embodiment, and for convenience of explanation, descriptions of overlapping content may be omitted.

The eighth embodiment aims to overcome the mounting limitations that occur in small form factors with extremely limited physical space, such as M.2 2230, and to integrate high-performance AI functions. The standard layout described in the seventh embodiment may face physical limitations when arranging a large number of chips on a small board such as M.2. To solve this, a placement method called "rotated multi-chip substrate layout" may be applied, as shown in FIG. 18. Referring to FIG. 18, the SoC and the plurality of memories (MEM) may be arranged in a diagonal direction by being rotated at a specific angle within the package 5100.

The progressive effect provided by this layout optimization is clear. For example, if an SoC of the same size as in the seventh embodiment and four memories are rearranged in this way, the size of the entire package is reduced to about 21 mm×21 mm. This miniaturized package makes it sufficiently possible to be mounted on an M.2 2230 circuit board with a width of 22 mm and a depth of 30 mm. As a result, this embodiment can provide a solution to effectively implement sophisticated and computationally intensive on-device AI functions even in devices with a power budget that had constraints on mounting AI accelerators with existing technology.

Seventh Example: Expansion and Integration of AI System for Specific Applications Hereinafter, a seventh example of the present disclosure relates to various embodiments of expanding or integrating the system with other functional units to build a system optimized for a specific application field, based on the AI system 10000 of the fifth example and the AI module 11000 of the sixth example. Each embodiment according to this example may have its own independent configuration, and for convenience of explanation, descriptions of overlapping content may be omitted. In addition, each embodiment may be modified and implemented to suit various purposes and performances by selectively combining or referencing the technical features of other examples.

First Embodiment: AI System Integrated with a Storage Unit

Figure 35:
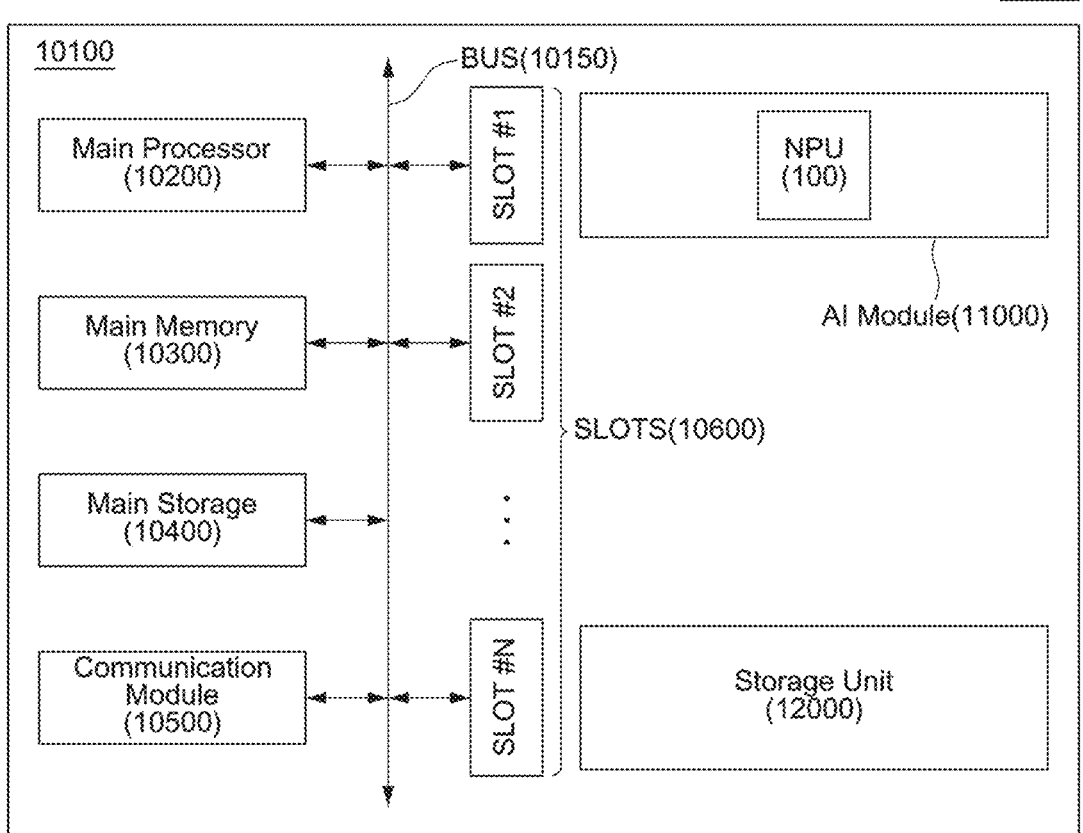
FIG. 35 is a diagram illustrating an AI system including a storage unit according to a first embodiment of a seventh example of the present disclosure.

FIG. 35 illustrates an AI system 10000 including a storage unit according to a first embodiment of a seventh example of the present disclosure.

The objective of this embodiment is to integrate AI processing functionality and large-capacity storage functionality efficiently within a unified system. Referring to FIG. 35, at least one storage unit 12000 having a standard form factor (e.g., M.2 or E1.S) may be installed together with at least one AI module 11000 in multiple slots 10600 provided on a main board 10100 of the AI system 10000.

This configuration is particularly advantageous for realizing a system architecture that integrates both an AI analytics server function and a network video recorder (NVR) function. In such an arrangement, a large number of CCTV video streams may be analyzed in real time by the AI module 11000 to perform AI-based tasks such as object detection or event detection, and both the analysis results (e.g., metadata) and the original video data may be stored immediately within the same system by the storage unit 12000. This enables a significant reduction in network load that would otherwise be caused by inter-system data transmission, and also allows for reduced system deployment and operational costs in comparison to conventional architectures in which AI servers and NVR servers are deployed separately.

The application of industry-standard form factors, such as M.2 or E1.S, to the AI module 11000 in accordance with the present disclosure is not merely a design preference but constitutes a technical innovation that facilitates the hyperconverged integration of AI computation, storage, and data processing functions. This integration delivers a synergistic effect by enabling new system architectures and improving operational efficiency-capabilities not attainable with conventional GPU-based systems that rely on proprietary or bulky form factors.

Traditional systems are configured to be separated by function. For example, an AI server is in charge of AI operations, an NVR (Network Video Recorder) server is in charge of video recording and storage, and a storage server is in charge of a database, and they are connected through a network. This can increase the complexity of the system configuration and cause network latency and bandwidth problems in the data transmission process. In addition, a high-power, large GPU card is difficult to share the same physical interface with storage devices (e.g., NVMe SSD) or other peripheral devices due to its proprietary form factor.

In contrast, the present disclosure addresses and overcomes these limitations by adopting the M.2 or E1.S form factor for the AI module 11000. These form factors are widely used in modern high-speed storage devices (e.g., NVMe SSDs) and offer electrical and mechanical compatibility across devices. By unifying the interface specifications of the AI accelerator and storage units, a plurality of identical slots 10600 may be provided on the main board 10100. This allows users to selectively populate the slots with AI modules 11000 and storage units 12000, respectively, depending on system requirements, as illustrated in FIG. 35.

This flexible configuration supports the construction of an "integrated data processing pipeline" entirely within a single system chassis. For example, a video stream received from an external source may be decoded by a dedicated decoder unit 13000 (see FIG. 37), processed in real time by an AI module installed in a first slot, and the corresponding metadata and video data stored by a storage unit installed in a second slot-all via the high-speed bus 10150 of the main board. This architecture not only minimizes latency by eliminating inter-server network transmissions, but also significantly reduces the physical footprint, power consumption, and overall management complexity of the system.

Second Embodiment: System Based on Main Processor Including Encoder/Decoder

Figure 36:
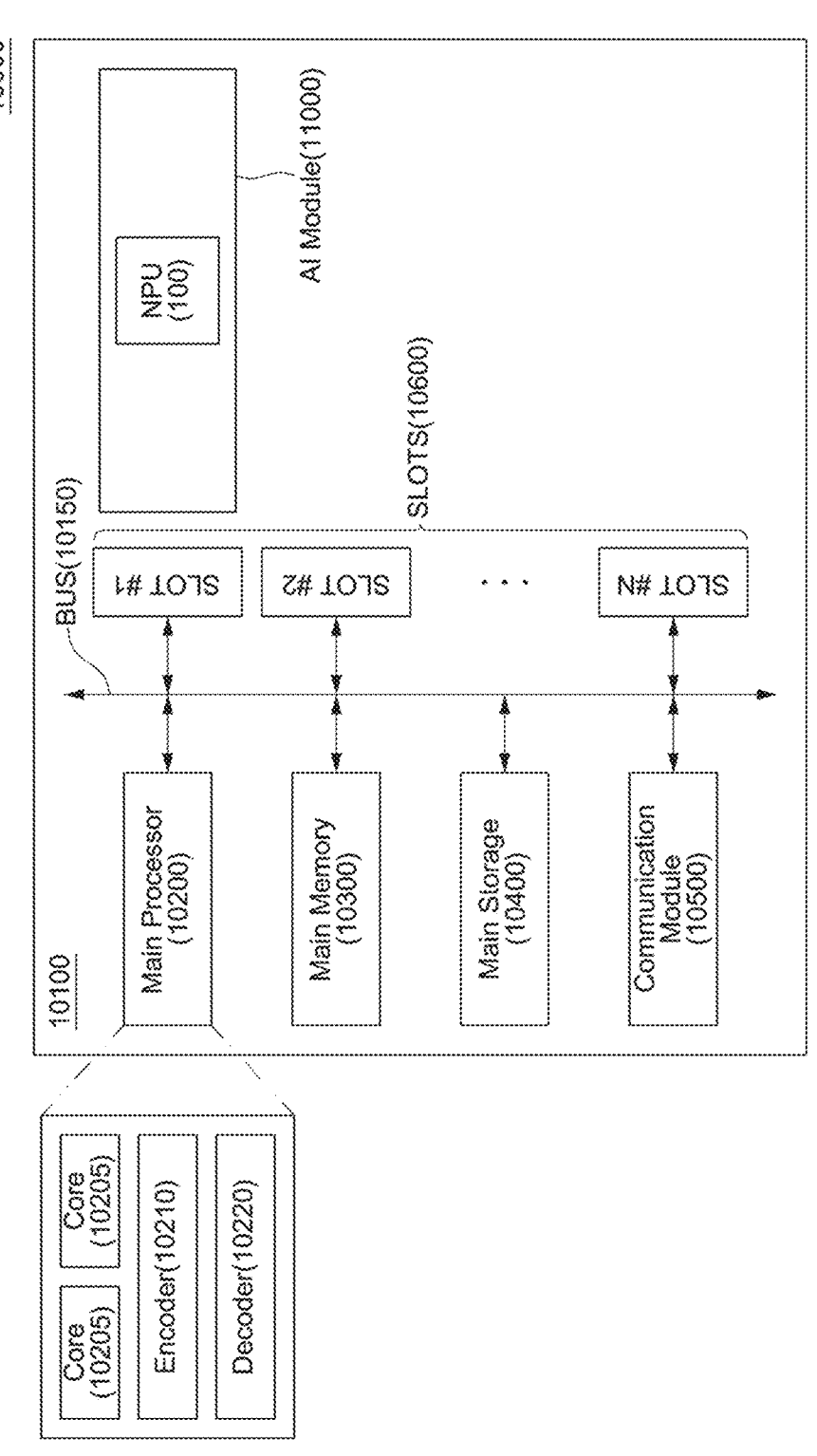
FIG. 36 is a diagram illustrating an AI system including a main processor that includes an encoder and a decoder unit according to a second embodiment of a seventh example of the present disclosure.

FIG. 36 illustrates an AI system 10000 according to a second embodiment of a seventh example of the present disclosure.

This embodiment is directed toward improving the efficiency of data pre-processing and post-processing associated with AI operations. In particular, it is characterized in that a main processor 10200 incorporates both an encoder 10210 and a decoder 10220 implemented as hardware accelerators. As shown in FIG. 36, this integration allows the main processor 10200 to support efficient data processing while simultaneously simplifying the system architecture by reducing the need for separate peripheral components.

For example, when the AI system 10000 receives a video stream encoded using a particular codec, the main processor 10200 may utilize the built-in decoder 10220 to decode the video frames rapidly and supply them directly to the AI module 11000. The decoder 10220 may be configured to support one or more of the following codecs: H.264, HEVC, JPEG, YUV, AV1, MP3, AAC-LC, HE-AAC, among others. With this configuration, the system can be constructed without requiring a separate external decoding device, thereby providing a cost-effective solution—especially suitable for deployments involving a limited number of AI modules 11000 or a small number of video channels to be processed.

Third Embodiment: System Including a Dedicated Decoder

Figure 37:
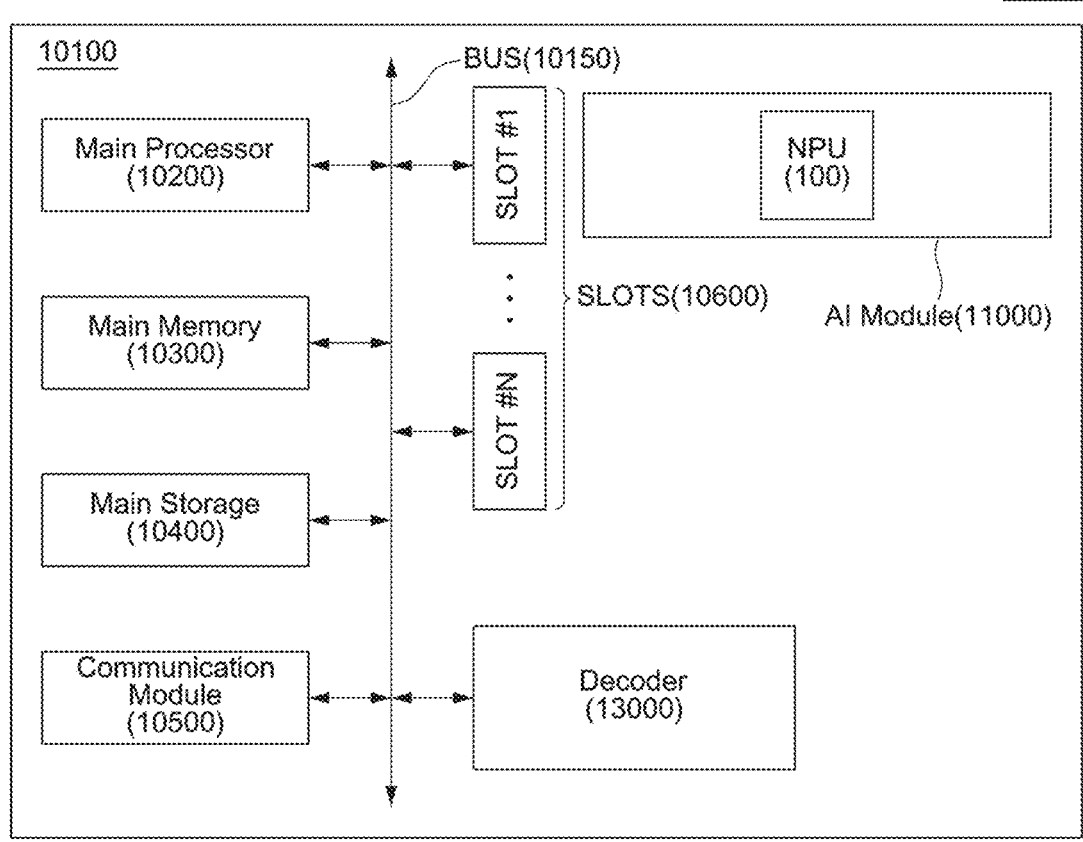
FIG. 37 is a diagram illustrating an AI system including a decoder unit according to a third embodiment of a seventh example of the present disclosure.

FIG. 37 illustrates an AI system 10000 according to a third embodiment of a seventh example of the present disclosure.

This embodiment is designed to support high-performance configurations in scenarios where the decoding workload exceeds the processing capabilities of the main processor 10200—for example, when the system must handle a large number of high-resolution video channels concurrently. As shown in FIG. 37, the AI system 10000 may include a dedicated decoder chip 13000 installed directly on the main board 10100 to offload such intensive decoding tasks.

The decoder chip 13000 is optimized for hardware-level processing of a variety of video codecs, including H.264, HEVC, and AV1. With this configuration, the chip can efficiently decode multiple high-resolution video streams in parallel, allowing the AI module 11000 to concentrate exclusively on neural network inference operations. This separation of responsibilities enables better utilization of system resources. Moreover, the number of decoder chips 13000 can be scaled according to the number of AI modules 11000 deployed in the system, providing a flexible and efficient path to increase the overall processing capacity without overloading any single component.

Fourth Embodiment: System Including a Dedicated Encoder/Decoder

Figure 38:
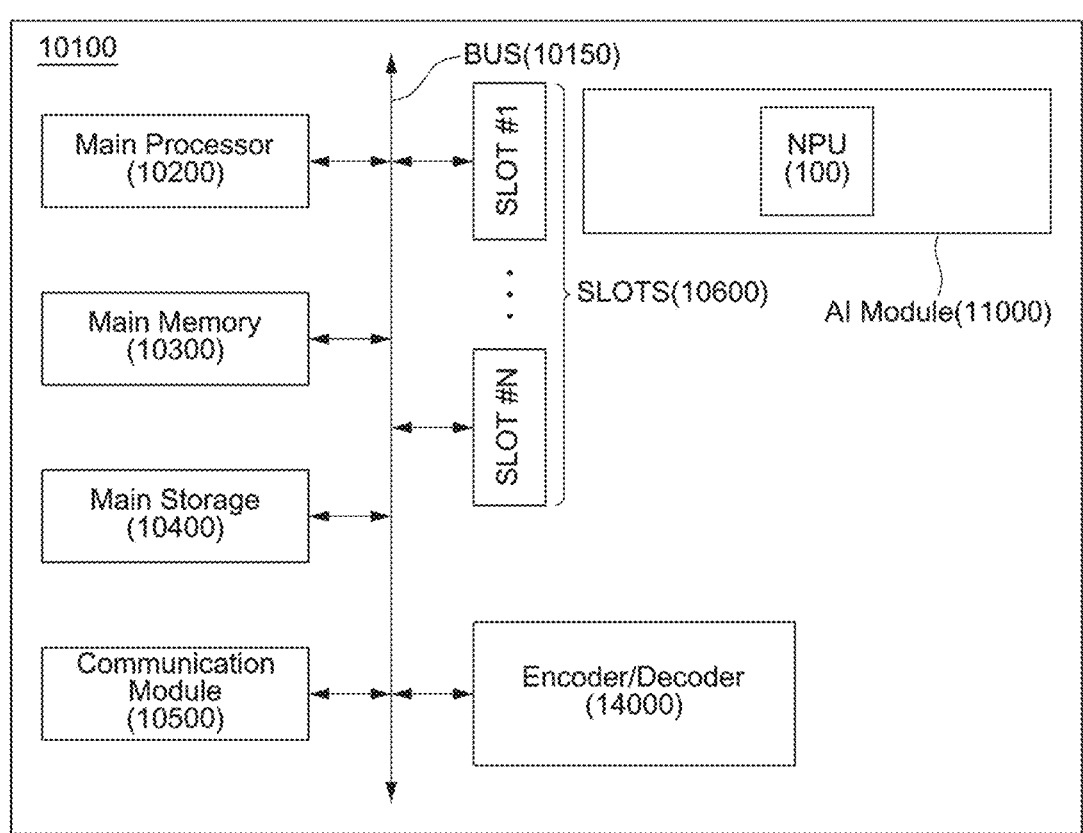
FIG. 38 is a diagram illustrating an AI system including an encoder and a decoder unit according to a fourth embodiment of a seventh example of the present disclosure.

FIG. 38 illustrates an AI system 10000 according to a fourth embodiment of a seventh example of the present disclosure.

This embodiment extends the architecture of the third embodiment by incorporating both decoding and encoding functionality into a single, dedicated hardware module. As shown in FIG. 38, the AI system 10000 may include a separate encoder/decoder chip 14000 mounted on the main board 10100. The encoder/decoder 14000 may support at least one or more of the following codecs: H.264, HEVC, JPEG, YUV, AV1, VP9, MP3, AAC-LC, and HE-AAC. This configuration enables the system to perform complete end-to-end processing—from decoding incoming video streams to encoding output data—all within the same board-level architecture.

Such a configuration is well suited to applications requiring real-time re-encoding of AI analysis results. For example, the AI module 11000 may output metadata such as bounding boxes or object tracking data, which can then be combined with the original video stream and re-encoded by the encoder/decoder 14000 using a specified codec. By dividing roles clearly—with the decoder handling input and the encoder managing output—the neural processing unit (NPU) 100 is freed to concentrate exclusively on AI operations. This separation improves system responsiveness, enhances processing efficiency, and supports scalable performance in high-demand environments.

Fifth Embodiment: High-Performance Vision System Integrated with a VPU

Figure 39:
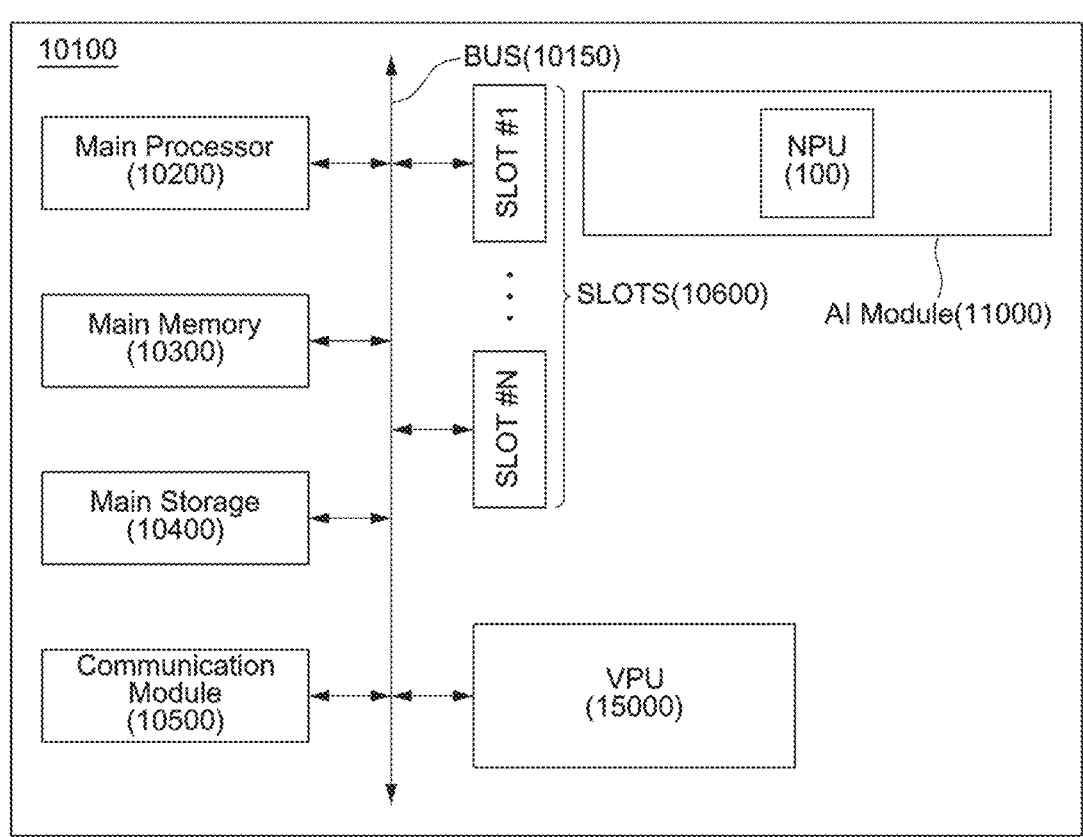
FIG. 39 is a diagram illustrating an AI system including a VPU according to a fifth embodiment of a seventh example of the present disclosure.

FIG. 39 illustrates an AI system 10000 according to a fifth embodiment of a seventh example of the present disclosure.

This embodiment is directed toward constructing a high-end AI vision system by further enhancing video processing capabilities. To achieve this, the system may incorporate a vision processing unit (VPU) 15000, as shown in FIG. 39. The VPU 15000 is a specialized processor designed not only to provide high-performance encoding and decoding, but also to handle a range of advanced video pre-processing and post-processing tasks, such as image scaling, noise reduction, and image quality enhancement. The set of supported codecs may include, but is not limited to, H.264, HEVC, JPEG, YUV, AV1, VP9, MP3, AAC-LC, and HE-AAC.

With the VPU 15000 integrated into the AI system 10000, nearly all tasks related to video input, output, and quality enhancement are delegated to this dedicated unit. As a result, the main processor 10200 and the NPU 100 are substantially relieved of video-related computational burdens, allowing them to concentrate on system management and core AI inference operations, respectively. This architecture enhances the overall processing throughput and system stability, and is particularly advantageous for advanced applications requiring premium video fidelity and high-performance inference, such as broadcast-grade vision systems or precision medical imaging analysis.

Sixth Embodiment: Hybrid AI System Integrated with a GPU

Figure 40:
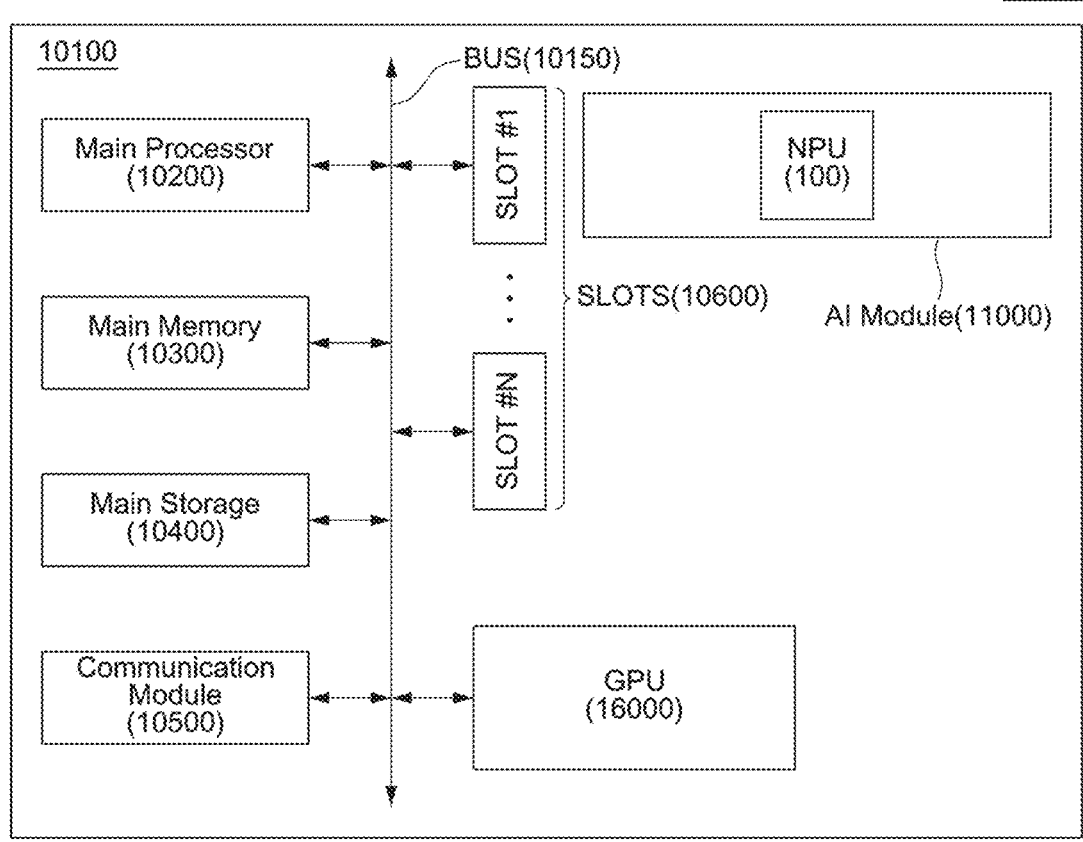
FIG. 40 is a diagram illustrating an AI system including a GPU according to a sixth embodiment of a seventh example of the present disclosure.

FIG. 40 illustrates an AI system 10000 according to a sixth embodiment of a seventh example of the present disclosure.

This embodiment is directed to a hybrid system architecture designed to support complex applications that demand both AI inference capabilities and general-purpose parallel processing or high-performance graphics processing. Referring to FIG. 40, the AI system 10000 may include a graphics processing unit (GPU) 16000 in addition to an AI module 11000 that is equipped with an NPU 100. The GPU 16000 may further support hardware acceleration for encoding and decoding a variety of video codecs, including H.264, HEVC, and AV1.

In such a hybrid system, processing tasks may be dynamically allocated to the most suitable processor based on the operational characteristics of each task. For instance, AI inference tasks may be assigned to the AI module 11000—specifically to the NPU 100—which is optimized for AI operations, thereby achieving superior power efficiency and processing speed. Conversely, tasks that benefit more from general-purpose parallelism or graphics acceleration—such as scientific simulations, large-scale data visualization, or 3D rendering—may be delegated to the GPU 16000. By assigning workloads to the most appropriate processing unit, the system can enhance overall efficiency, responsiveness, and usability across a wide range of application domains.

The technical features of the examples of the present disclosure may be described as follows.

An AI system according to an embodiment of the present disclosure may include: a plurality of slots provided on a main board; at least one AI module mounted in at least one of the plurality of slots and performing AI (artificial intelligence) operations; and at least one main processor configured to control the at least one AI module, wherein the maximum AI operation performance is configured to be scalable based on the number of the AI modules.

In another embodiment, the AI module may include at least one NPU (neural processing unit) specialized for AI operations.

In another embodiment, the AI module may further include at least one NPU dedicated memory used independently by the NPU, to minimize data bottleneck phenomena during AI operations and ensure stable processing performance.

In another embodiment, the AI system may further include at least one decoder configured to decode encoded data and supply it to the AI module, thereby increasing the efficiency of video or audio data processing.

In another embodiment, the AI module may be designed to operate at low power, for example, its power consumption is characterized by being 20 W or less, preferably 10 W or less, so that the overall power consumption of the system may be efficiently managed even when a plurality of modules are mounted.

Furthermore, in another embodiment, the AI system may further include a GPU configured to perform general-purpose parallel processing including scientific and technological calculations or 3D graphics rendering in addition to AI inference operations, and the main processor may selectively allocate tasks to the AI module or the GPU according to the characteristics of the operation.

In another embodiment, a storage unit for storing data may be mounted in at least another one of the plurality of slots where the AI module is not mounted.

In another embodiment, the AI system may have a hierarchical memory structure including a main memory located outside the AI module for storing large-capacity data, and an on-chip shared memory integrated inside a System on Chip (SoC) including the main processor for temporarily storing frequently used data at high speed.

In another embodiment, the main processor may control the NPU included in the AI module to perform speculative decoding using a first language model with a large number of parameters and a second language model with a small number of parameters.

An AI module according to another embodiment of the present disclosure may include: a printed circuit board of a standard specification; a connector formed on one side of the printed circuit board and electrically connected to a slot provided on a main board of an AI system; and at least one NPU (neural processing unit) mounted on the printed circuit board and processing AI operations.

In another embodiment, the AI module may further include an NPU dedicated memory mounted on the printed circuit board and used independently by the NPU during AI operations.

In another embodiment, the NPU dedicated memory may include a plurality of units to provide a dual-channel memory bandwidth to the NPU.

In another embodiment, the at least one NPU may include a plurality of units, and each of the plurality of NPUs may have an independent NPU dedicated memory.

In another embodiment, the NPU may include a processing core for integer-based matrix operations and a special function unit SFU for floating-point-based nonlinear function operations.

In another embodiment, the special function unit SFU may include a programmable function approximation circuit PAF that loads different pre-learned programmable parameter sets off-line to approximate a plurality of different nonlinear functions without hardware changes.

In another embodiment, the standard specification may be M.2 or E1.S.

A NPU according to another embodiment of the present disclosure may include: a processing core configured to process matrix operations in parallel based on integer data; a special function unit SFU configured to process special operations including nonlinear functions based on Floating-Point data; and a controller that controls the operation of the processing core and the special function unit based on compiled execution code.

In another embodiment, the special function unit SFU may include a programmable function approximation circuit PAF that approximates various activation functions using a pre-set plurality of programmable parameters.

In another embodiment, the programmable function approximation circuit PAF may include: a plurality of comparators that determine an interval to which an input value belongs; a selector that selects a programmable parameter corresponding to the determined interval; and an operation unit that performs a polynomial operation using the selected programmable parameter.

In another embodiment, the controller may control the processing core and the special function unit to perform speculative decoding by processing a first language model with a large number of parameters and a second language model with a small number of parameters in a time-division manner.

In another embodiment, the weights of the first language model and the second language model may reside together in the memory of an on-device environment.

In another embodiment, the controller may determine the validity of the operation processed in the processing core or the special function unit, and control the operation of the corresponding unit through clock gating or power gating for unnecessary operations.

An AI system according to an embodiment of the present disclosure may be configured by mounting a plurality of low-power AI modules, each having a power consumption of a first power threshold (e.g., 25 W) or less, in a plurality of slots on a main board. According to this configuration, the overall AI operation performance and power consumption are linearly scaled in proportion to the number of AI modules. As a result, a synergistic effect can occur where a high-performance AI system exceeding a second operation performance threshold may be built within a chassis of a standard air-cooling method, not an expensive liquid cooling method. This is one of the features of the present disclosure that achieves high efficiency and high performance through high-density integration of low-power modules.

As another modified example, the system can form an integrated data processing and storage pipeline. For example, an AI module and a storage unit may be mounted together in a plurality of slots supporting a standard interface on a main board, and the main processor can control the processing of a data stream from the AI module and then directly storing the result in the storage unit through a common bus. This can implement a hyper-convergence architecture that completes AI analysis and data storage within a single system, thereby fundamentally eliminating the network load and latency caused by data transmission with an external storage server.

In addition, the present disclosure may include a new method of flexibly providing AI performance. This method may include the steps of: providing a system equipped with a plurality of standard interface slots; mounting a first number of low-power AI modules according to initial demand; and then expanding the overall AI performance by additionally mounting a second number of AI modules without changing the power supply or cooling infrastructure of the system according to future performance increase demands. This can provide a business advantage that allows service providers to minimize initial investment risk and economically expand the system in line with business growth.

Meanwhile, the AI module may be configured to include a printed circuit board of a standard specification (e.g., M.2 or E1.S), a connector, and an NPU. The NPU may have a specialized internal structure to improve the efficiency of AI operations. As another embodiment, the NPU may be configured to form a sequential data processing path. Specifically, data is first converted from floating-point to integer format (quantization) and then processed in a processing core specialized for matrix multiplication. The result is converted back to floating-point format (dequantization) and transferred to a special function unit SFU dedicated to nonlinear function operations. The structure in which data sequentially passes through an integer operation unit and a floating-point operation unit for processing a single layer of a neural network is a core principle of the efficiency of the NPU of the present disclosure, which is distinguished from a general-purpose GPU architecture.

The programmable function approximation circuit PAF included in the special function unit SFU may be another characteristic embodiment. This PAF circuit is configured to receive a plurality of coefficients pre-calculated corresponding to a target nonlinear function from the outside, and to approximate the output value of the target function by performing a polynomial operation using a given input value and these coefficients. This is fundamentally different from a simple lookup table (LUT) method that stores final result values, and can provide future scalability that can flexibly respond to new functions without hardware changes simply by a software method of changing coefficients.

Furthermore, the present disclosure may include a new speculative decoding execution method that utilizes the hardware structure described above. This method may include the steps of: loading the parameters of a first language model with a large number of parameters and a second language model with a small number of parameters into the hierarchical memory of the system; repeatedly executing the second model on the NPU to generate a candidate token sequence; and executing the first model a single time on the NPU to verify the candidate sequence. In particular, the parameters of both models can reside together in memory during the generation and verification steps, thereby reducing data swapping with external storage and improving inference performance through the organic combination of hardware and software.

As an additional modified example, the modular expansion architecture of the present disclosure may be organically combined with a speculative decoding algorithm to dynamically optimize the overall performance of the system. For example, the operation allocation strategy may be applied differently depending on the number and available resources of the AI modules mounted on the system. In a system with a small number of AI modules, a single module or a plurality of modules can process the operations of a first language model with a large number of parameters (verification model) and a second language model with a small number of parameters (draft model) in a time-division manner. On the other hand, in a high-performance system with a large number of AI modules, the main processor can dedicate a specific AI module or module group to the verification operation of the first language model, and allocate the remaining AI modules to the candidate token generation of the second language model in parallel. This dynamic operation distribution structure, where the physical scalability of the hardware is directly linked to the throughput and efficiency of the speculative decoding algorithm, is another feature provided by the present disclosure.

As another modified example, the system of the present disclosure may be implemented as an intelligent video surveillance system that forms an integrated data processing and storage pipeline. For example, AI modules specialized for video processing and large-capacity storage units may be mounted together in a plurality of slots supporting a standard interface on a main board. In this configuration, the main processor can control the decoding of an incoming video stream from the outside in a dedicated video decoder unit within the system, and then distribute the resulting video frames to the AI modules to perform operations such as object detection or event detection in real time. Subsequently, the metadata generated as a result of the operation may be stored in a storage unit within the same system along with the original video frame. By having all these processes performed through the common bus of the main board, the network load and latency that occur when operating separate AI analysis servers and NVR servers may be reduced and the system can be simplified.

Furthermore, the modular system of the present disclosure can efficiently process complex multi-modal AI tasks by combining heterogeneous AI modules specialized for different types of AI models. For example, a first AI module optimized for video data processing may be mounted in some slots of the system, and a second AI module optimized for language data processing may be mounted in other slots. In this configuration, when receiving multi-modal data including video input and text input, the main processor can first instruct the first AI module to extract a feature vector from the video. Subsequently, it can control the generation of a final response, such as describing the content of the video or answering related questions, by providing the extracted video feature vector and the initial text input together to the second AI module. Flexibly combining and interworking heterogeneous AI modules optimized for specific domains within one system in this way is an embodiment provided by the scalable architecture of the present disclosure.

As an additional modified example, the modular expansion architecture of the present disclosure may be organically combined with a speculative decoding algorithm to dynamically optimize the overall performance of the system. For example, the main processor can check the available number of AI modules mounted on the system and apply a different operation allocation strategy according to that number. In a small-scale system where the number of available modules is less than a first threshold, it can control at least one AI module to process the operations of a first language model with a large number of parameters (verification model) and a second language model with a small number of parameters (candidate generation model) in a time-division manner. On the other hand, in a large-scale system where the number of available modules is equal to or greater than the first threshold, it can allocate a first group of AI modules to be dedicated to the verification operation of the first language model, and a second group to process the candidate token generation operation of the second language model in parallel. This dynamic operation distribution structure, where the physical scalability of the hardware is directly linked to the throughput and efficiency of the speculative decoding algorithm, is another embodiment provided by the present disclosure.

In addition, the system of the present disclosure may be applied to complex generative AI applications such as text-to-image generation. In this embodiment, the main processor may be controlled to receive a text prompt and convert it into an embedding vector containing semantic information. Subsequently, with the generated embedding vector as a condition, an AI module within the system may be configured to perform a repetitive denoising operation through a generative model such as a diffusion model, and thereby finally generate a high-quality image.

The examples of the present disclosure disclosed in this specification and drawings are presented as specific examples only to easily explain the technical content of the present disclosure and to help understand the present disclosure, and are not intended to limit the scope of the present disclosure. It is clear to those of ordinary skill in the art to which the present disclosure belongs that other modified examples based on the technical idea of the disclosure may be implemented in addition to the examples disclosed herein.

[National R&D Project Supporting this Invention]
    [Task Identification Number] 2710068324
    [Task Number] 00228938
    [Name of Ministry] Ministry of Science and ICT
    [Name of project Management (Specialized) Institution] Korea Information and Communication Planning and Evaluation Institute
    [Research Project Title] Artificial intelligence semiconductor SW integrated platform technology development (R&D)
    [Research Task Title] Commercial edge AI SoC semiconductor SW development platform technology development
    [Contribution rate] 1/1
    [Name of Organization Performing the Task] DEEPX CO., LTD.
    [Research period] 2025.01.01~2025.12.31

What is claimed is:

1. An artificial intelligence (AI) system comprising:
a plurality of slots provided on a main board;
at least one AI module mounted in at least one of the plurality of slots and configured to process AI operations, the at least one AI module comprising at least one neural network processing unit (NPU); and
at least one main processor configured to control overall operation of the AI system,
wherein the AI system has a total AI computation performance configured to be scalable based on a number of AI modules mounted in the plurality of slots,
wherein each of the at least one NPU comprises:
    a processing core configured to process matrix operations based on integer data; and
    a special function unit configured to approximate nonlinear activation functions using programmable parameters, the special function unit including a programmable function approximation circuit configured to
        determine an interval to which an input value belongs,
        select a programmable parameter corresponding to the determined interval, and
        perform a polynomial operation using the selected programmable parameter.

2. The AI system of claim 1, wherein the special function unit is further configured to perform special operations including nonlinear functions based on floating-point data.

3. The AI system of claim 1, further comprising a dedicated decoder configured to decode encoded video or audio data and to provide the decoded data to the at least one AI module.

4. The AI system of claim 1, further comprising a graphics processing unit (GPU) configured to perform general-purpose parallel processing calculations or 3D graphics rendering,
    wherein the at least one main processor is further configured to selectively allocate tasks to the at least one AI module or the GPU according to characteristics of a corresponding operation.

5. The AI system of claim 1, further comprising a storage unit for storing data,
    wherein the storage unit is mounted in one or more of the plurality of slots on the main board where the AI module is not mounted.

6. The AI system of claim 1, further comprising:
a hierarchical memory structure having a main memory that is located outside the at least one AI module and is configured to store large-capacity data; and
an on-chip shared memory that is integrated inside a system on chip (SoC) and is configured to temporarily store frequently used data at high speed,
wherein the SoC includes the at least one main processor.

7. The AI system of claim 1,
wherein the at least one main processor is further configured to control the at least one NPU to perform speculative decoding using a first language model with a large number of parameters and a second language model with a small number of parameters.

8. The AI system of claim 1, wherein each of the at least one AI module further comprises:
a printed circuit board of a standard specification; and
a connector formed on one side of the printed circuit board and electrically connected to the at least one of the plurality of slots,
wherein the at least one NPU is mounted on the printed circuit board and configured to process the AI operations.

9. The AI system of claim 8, wherein each of the at least one AI module further comprises an NPU-dedicated memory mounted on the printed circuit board and used independently by the at least one NPU during the AI operations.

10. The AI system of claim 9, wherein the NPU-dedicated memory comprises a plurality of memory units to provide a dual-channel memory bandwidth to the at least one NPU.

11. The AI system of claim 1, wherein the at least one NPU comprises a plurality of neural processing units, each of the plurality of neural processing units comprising an independent NPU dedicated memory.

12. The AI system of claim 1, wherein the programmable function approximation circuit loads different pre-learned programmable parameter sets off-line to approximate a plurality of different nonlinear functions without hardware changes.

13. The AI system of claim 8, wherein the standard specification is M.2 or E1.S.

14. The AI system of claim 1, wherein, in each of the at least one NPU, the processing core is further configured to process matrix operations in parallel based on integer data, and wherein the at least one NPU further comprises a controller configured to control the processing core and the special function unit based on compiled execution code.

15. The AI system of claim 1, wherein the programmable function approximation circuit approximates a plurality of different activation functions using a pre-set plurality of programmable parameters.

16. The AI system of claim 14, wherein the controller is further configured to control the processing core and the special function unit to perform speculative decoding by processing a first language model with a large number of parameters and a second language model with a small number of parameters in a time-division manner.

17. The AI system of claim 16, wherein weights of the first language model and the second language model reside together in a memory of an on-device environment.

18. The AI system of claim 14, wherein the controller is further configured to determine validity of an operation processed in the processing core or the special function unit, and control the operation processed in the processing core or the special function unit through clock gating or power gating for unnecessary operations.

* * * * *